US009916681B2

(12) United States Patent
James et al.

(10) Patent No.: US 9,916,681 B2
(45) Date of Patent: Mar. 13, 2018

(54) METHOD AND APPARATUS FOR SELECTIVELY INTEGRATING SENSORY CONTENT

(71) Applicant: Atheer, Inc., Mountain View, CA (US)

(72) Inventors: Greg James, Redwood City, CA (US); Allen Yang Yang, Richmond, CA (US); Sleiman Itani, Mountain View, CA (US)

(73) Assignee: Atheer, Inc., Mountain View, CA (US)

( * ) Notice: Subject to any disclaimer, the term of this patent is extended or adjusted under 35 U.S.C. 154(b) by 0 days.

(21) Appl. No.: 14/929,324

(22) Filed: Oct. 31, 2015

(65) Prior Publication Data

US 2016/0125644 A1     May 5, 2016

Related U.S. Application Data

(60) Provisional application No. 62/074,771, filed on Nov. 4, 2014.

(51) Int. Cl.
| | |
|---|---|
| *G06T 7/60* | (2017.01) |
| *H04N 5/225* | (2006.01) |
| *G06T 15/60* | (2006.01) |
| *G06T 19/00* | (2011.01) |
| *G02B 27/00* | (2006.01) |

(Continued)

(52) U.S. Cl.
CPC .......... *G06T 15/60* (2013.01); *G02B 27/0093* (2013.01); *G02B 27/0101* (2013.01); *G02B 27/0172* (2013.01); *G06F 3/013* (2013.01); *G06T 7/20* (2013.01); *G06T 7/60* (2013.01);

(Continued)

(58) Field of Classification Search
None
See application file for complete search history.

(56) References Cited

U.S. PATENT DOCUMENTS

| | | | | |
|---|---|---|---|---|
| 2008/0024523 | A1* | 1/2008 | Tomite | G06T 15/50 345/632 |
| 2010/0315413 | A1* | 12/2010 | Izadi | G06F 3/017 345/419 |

(Continued)

OTHER PUBLICATIONS

U.S. Appl. No. 14/929,322 of James, G. et al. filed Oct. 31, 2015.

*Primary Examiner* — Kee M Tung
*Assistant Examiner* — Yanna Wu
(74) *Attorney, Agent, or Firm* — Mohr Intellectual Property Law Solutions, PC

(57) ABSTRACT

To integrate a sensory property such as occlusion, shadowing, reflection, etc. among physical and notional (e.g. virtual/augment) visual or other sensory content, providing an appearance of similar occlusion, shadowing, etc. in both models. A reference position, a physical data model representing physical entities, and a notional data model are created or accessed. A first sensory property from either data model is selected. A second sensory property is determined corresponding with the first sensory property, and notional sensory content is generated from the notional data model with the second sensory property applied thereto. The notional sensory content is outputted to the reference position with a see-through display. Consequently, notional entities may appear occluded by physical entities, physical entities may appear to cast shadows from notional light sources, etc.

24 Claims, 30 Drawing Sheets

(51) Int. Cl.
*G02B 27/01* (2006.01)
*G06F 3/01* (2006.01)
*G06T 7/20* (2017.01)

(52) U.S. Cl.
CPC ........... *G06T 19/006* (2013.01); *H04N 5/225* (2013.01); *G02B 2027/014* (2013.01)

(56) References Cited

U.S. PATENT DOCUMENTS

2014/0204002 A1\* 7/2014 Bennet ................... G06F 3/011
    345/8
2016/0125656 A1   5/2016 James et al.

\* cited by examiner

METHOD AND APPARATUS FOR SELECTIVELY INTEGRATING SENSORY CONTENT

CLAIM OF PRIORITY

This application claims the benefit of U.S. Provisional Application No. 62/074,771, entitled "METHOD AND APPARATUS FOR SELECTIVELY INTEGRATING SENSORY CONTENT," filed Nov. 4, 2014. This application is related to U.S. application Ser. No. 14/929,322, entitled "METHOD AND APPARATUS FOR SELECTIVELY INTEGRATING SENSORY CONTENT," filed Oct. 31, 2015. These applications are incorporated herein in their entirety.

FIELD OF THE INVENTION

This invention relates to selectively integrating data models. More particularly, the invention relates to selecting a sensory feature of one data model and providing an analog of that sensory feature to another data model.

DESCRIPTION OF RELATED ART

A data model may exhibit sensory properties that apply mainly or only within that model, and that do not naturally propagate to other data models. For example, a data model reflecting a physical environment might include shadows cast from physical objects by a physical light source. However, another data model representing a notional environment (e.g. a virtual reality environment, an augmented reality environment, etc.) may not necessarily exhibit shadowing from the physical light sources in the physical data model, even if notional data model similarly includes shadows cast from notional objects by a notional light source.

It may in certain instances be desirable to integrate sensory properties from one data model to another. For example, notional objects might be made to case shadows corresponding to the illumination of physical light sources, or vice versa, as if the notional and physical objects and light sources were all part of a single environment. Such an arrangement may for example facilitate interaction with both data models simultaneously and/or in cooperation, without necessarily requiring the data models to be fully combined.

BRIEF SUMMARY OF THE INVENTION

This disclosure contemplates a variety of systems, apparatus, methods, and paradigms for facilitating data model interaction.

In one embodiment, a machine-implemented method is provided that includes, in a processor, establishing a reference position, establishing a physical data model at least substantially representing at least one physical entity, the physical data model being spatially dynamic in time, and establishing a notional data model at least substantially representing at least one notional entity, the notional data model being dynamic in time. The method includes determining an occlusion of the notional data model by the physical data model relative to the reference position, wherein a first distance along a first direction from the reference position to the physical data model is less than a second distance along a second direction from the reference position to the notional data model, the second direction being at least substantially similar to the first direction. The method also includes generating notional visual content representing at least a portion of the notional data model with at least a portion of the occlusion applied thereto, and outputting the notional visual content to the reference position with a see-through display.

The first distance along the second direction from the reference position to the physical data model may be substantially equal to the second distance along the second direction from the reference position to the notional data model.

The physical entity may include at least a portion of a viewer. The physical entity includes at least a portion of a hand of a viewer.

The notional entity may include a virtual reality entity. The notional entity may include an augmented reality entity.

The reference point may substantially correspond with an eye of a viewer.

The see-through display may be a wearable display. The see-through display may be a head mounted display. The see-through display may be may be an optical see-through display, such that optical physical content at least substantially passes therethrough. The see-through display may be a virtual see-through display, with the method including outputting to the reference position with the see-through display physical visual content.

The notional data model may be non-exclusive of spatial coincidence with the physical data model. The method may include outputting the notional visual content so as to be at least substantially registered with physical visual content.

In another embodiment, a machine-implemented method is provided that includes, in a processor, establishing a reference position, establishing a physical data model at least substantially representing at least one physical entity, the physical data model being spatially dynamic in time, and establishing a notional data model at least substantially representing at least one notional entity, the notional data model being spatially dynamic in time. The method includes establishing a first sensory property from one of the physical and notional data models, and determining a second sensory property, the second sensory property at least substantially corresponding with the first sensory property for another of the physical and notional data models. The method also includes generating notional sensory content representing at least a portion of the notional data model with at least a portion of the second sensory property applied thereto, and outputting to the reference position with a perceive-through display the notional sensory content.

The physical entity may be at least partially in line of sight from the reference position.

The first sensory property may include a visual property. The first sensory property may include an auditory property. The second sensory property may include a visual property. The second sensory property may include an auditory property.

The physical entity may include at least a portion of a viewer. The physical entity may include at least a portion of a hand of a viewer.

The notional entity may include a virtual reality entity. The notional entity may include an augmented reality entity.

The reference point may substantially correspond with an eye of a viewer.

The see-through display may be a wearable display. The see-through display may be a head mounted display. The see-through display may be an optical see-through display, such that optical physical content at least substantially passes therethrough. The see-through display may be a virtual see-through display, with the method including outputting physical visual content to the reference position with the see-through display.

The notional data model may be non-exclusive of spatial coincidence with the physical data model. The method may include outputting the notional visual content so as to be at least substantially registered with the physical visual content.

The method may include establishing the first sensory property from the physical data model, with the second sensory property at least substantially corresponding with the first sensory property for the notional data model.

The first sensory property may at least substantially represent a physical environmental phenomenon. The physical environmental phenomenon may include physical illumination. The physical environmental phenomenon may include physical shadowing. The physical environmental phenomenon may include a physical volumetric effect. The physical volumetric effect may be a function of the first distance between the reference point and the physical data model. The physical volumetric effect may include a falling element, a flying element, and or a suspended element. The physical volumetric effect may include ash, debris, dust, fog, gas, hail, heat distortion, insects, leaves, mist, rain, sleet, smoke, snow, spray, and/or steam. The physical environmental phenomenon may include an optical phenomenon. The physical environmental phenomenon may include diffraction, diffusion, focus, glory, haloing, lens flare, and/or reflection.

The second sensory property effect may at least substantially represents a physical environmental phenomenon. The physical environmental phenomenon may include physical illumination. The physical environmental phenomenon includes physical shadowing. The physical environmental phenomenon may include a physical volumetric effect. The physical volumetric effect may be a function of the first distance between the reference point and the physical data model. The physical volumetric effect may include at least one of a group consisting of at least one falling element, at least one flying element, and at least one suspended element. The physical volumetric effect may include at least one of a group consisting of ash, debris, dust, fog, gas, hail, heat distortion, insects, leaves, mist, rain, sleet, smoke, snow, spray, and steam. The physical environmental phenomenon may include an optical phenomenon. The physical environmental phenomenon may include at least one of a group consisting of diffraction, diffusion, glory, haloing, lens flare, and reflection.

The method may include establishing the first sensory property from the notional data model, with the second sensory property at least substantially corresponding with the first sensory property for the physical data model.

The second sensory property effect may at least substantially represents a physical environmental phenomenon. The physical environmental phenomenon may include physical illumination. The physical environmental phenomenon includes physical shadowing. The physical environmental phenomenon may include a physical volumetric effect. The physical volumetric effect may be a function of the first distance between the reference point and the physical data model. The physical volumetric effect may include at least one of a group consisting of at least one falling element, at least one flying element, and at least one suspended element. The physical volumetric effect may include at least one of a group consisting of ash, debris, dust, fog, gas, hail, heat distortion, insects, leaves, mist, rain, sleet, smoke, snow, spray, and steam. The physical environmental phenomenon may include an optical phenomenon. The physical environmental phenomenon may include at least one of a group consisting of diffraction, diffusion, glory, haloing, lens flare, and reflection.

The second sensory property may at least substantially represent the physical environmental phenomenon.

The second sensory property effect may at least substantially represents a physical environmental phenomenon. The physical environmental phenomenon may include physical illumination. The physical environmental phenomenon includes physical shadowing. The physical environmental phenomenon may include a physical volumetric effect. The physical volumetric effect may be a function of the first distance between the reference point and the physical data model. The physical volumetric effect may include at least one of a group consisting of at least one falling element, at least one flying element, and at least one suspended element. The physical volumetric effect may include at least one of a group consisting of ash, debris, dust, fog, gas, hail, heat distortion, insects, leaves, mist, rain, sleet, smoke, snow, spray, and steam. The physical environmental phenomenon may include an optical phenomenon. The physical environmental phenomenon may include at least one of a group consisting of diffraction, diffusion, glory, haloing, lens flare, and reflection.

In another embodiment, an apparatus is provided that includes a processor and a perceive-through display in communication with the processor. A reference position establisher including executable instructions is instantiated on the processor, the reference position establisher being adapted to establish a reference position. A physical data model establisher including executable instructions is instantiated on the processor, the physical data model establisher being adapted to establish a physical data model at least substantially representing at least one physical entity, the physical data model being spatially dynamic in time. A notional data model establisher including executable instructions is instantiated on the processor, the notional data model establisher being adapted to establish a notional data model at least substantially representing at least one notional entity, the notional data model being dynamic in time. An occlusion determiner including executable instructions is instantiated on the processor, the occlusion determiner being adapted to determine an occlusion of the notional data model by the physical data model relative to the reference position, wherein a first distance along a first direction from the reference position to the physical data model is less than a second distance along a second direction from the reference position to the notional data model, the second direction being at least substantially similar to the first direction. An occlusion applier including executable instructions is instantiated on the processor, the occlusion applier being adapted to apply the occlusion to the notional data model. An outputter including executable instructions is instantiated on the processor, the outputter being adapted to output to the reference position with the perceive-through display at least a portion of the notional data model with the occlusion applied thereto.

In another embodiment, an apparatus is provided that includes a processor and a see-through display in communication with the processor. A reference position establisher including executable instructions is instantiated on the processor, the reference position establisher being adapted to establish a reference position. A physical data model establisher including executable instructions is instantiated on the processor, the physical data model establisher being adapted to establish a physical data model at least substantially representing at least one physical entity, the physical data model being spatially dynamic in time. A notional data model establisher including executable instructions is instantiated on the processor, the notional data model establisher being adapted to establish a notional data model at least substantially representing at least one notional entity, the notional data model being dynamic in time. A first sensory property establisher including executable instructions is instantiated on the processor, the first sensory property establisher being adapted to establish a first sensory property from one of the physical and notional data models. A second sensory property determiner including executable instructions is instantiated on the processor, the second sensory property determiner being adapted to determine a second sensory property at least substantially corresponding with the first sensory property for another of the physical and notional data models. A second sensory property applier including executable instructions is instantiated on the processor, the second sensory property applier being adapted to apply the second sensory property to the notional data model so as to generate notional sensory content therefrom. An outputter including executable instructions is instantiated on the processor, the outputter being adapted to output to the reference position the notional sensory content with a perceive-through display.

In another embodiment, an apparatus is provided that includes means for establishing a reference position, means for establishing a physical data model at least substantially representing at least one physical entity, the physical data model being spatially dynamic in time, and means for establishing a notional data model at least substantially representing at least one notional entity, the notional data model being dynamic in time. The apparatus includes means for determining an occlusion of the notional data model by the physical data model relative to the reference position, wherein a first distance along a first direction from the reference position to the physical data model is less than a second distance along a second direction from the reference position to the notional data model, the second direction being at least substantially similar to the first direction. The apparatus also includes means for generating notional visual content representing at least a portion of the notional data model with at least a portion of the occlusion applied thereto, and means for outputting to the reference position with a see-through display the notional visual content.

In another embodiment, an apparatus is provided that includes means for establishing a reference position, means for establishing a physical data model at least substantially representing at least one physical entity, the physical data model being spatially dynamic in time, and means for establishing a notional data model at least substantially representing at least one notional entity, the notional data model being spatially dynamic in time. The apparatus includes means for establishing a first sensory property from one of the physical and notional data models, and means for determining a second sensory property, the second sensory property at least substantially corresponding with the first sensory property for another of the physical and notional data models. The apparatus also includes means for generating notional sensory content representing at least a portion of the notional data model with at least a portion of the second sensory property applied thereto, and means for outputting to the reference position with a perceive-through display the notional sensory content.

In another embodiment, a method is provided that includes establishing a reference position in a processor, establishing in the processor solids data representative of an environment, and establishing in the processor surfaces data representative of the environment. The method includes establishing a notional data model in the processor. The method also includes identifying in the processor at least one potential shadow in the surfaces data, identifying in the processor at least one light source in the surfaces data, locating the light sources from the surfaces data onto the solids data in the processor, and determining at least one anticipated shadow in the processor from the solids data and the light sources. If the potential shadow matches at least one of the anticipated shadows, the method includes identifying the potential shadow as an occluding shadow in the processor, applying the occluding shadow to the notional model in the processor, generating in the processor notional sensory content representing at least a portion of the notional data model with the occluding shadow applied thereto, and outputting the notional sensory content to the reference position with a see-through display.

Establishing the solids data may include obtaining with a depth sensor at least one depth measurement of the environment, communicating the depth measurement to the processor, and determining the solids data from the depth measurement in the processor. The depth sensor may include a depth camera, a stereo camera, a plenoptic camera, a time-of-flight sensor, an ultrasonic sensor, and/or a millimeter wave sensor.

Establishing the surfaces data may include obtaining with an image sensor at least one image of the environment, communicating the image to the processor, and determining the surfaces data from the image in the processor. The image sensor may include a color camera, a grayscale camera, a black-and-white camera, a digital camera, and/or an infrared camera.

The light source may be explicit in the surfaces data and/or may be implicit in the surfaces data.

A portion of the solids data casting anticipated shadow may be explicit in the solids data and/or implicit in the solids data.

A portion of the surfaces data may be persistent. A portion of the solids data may be persistent.

The method may include identifying potential shadows from a color feature in the surfaces data and/or a structure feature in the surfaces data. The method may include identifying potential shadows from an algorithm applied to the surfaces data.

The method may include identifying light sources from a color feature in the surfaces data and/or a structure feature in the surfaces data. The method may include identifying light sources from an algorithm applied to the surfaces data.

The method may include identifying potential shadows as not being occluding shadows from the solids data indicating solid structure to the potential shadow.

The method may include determining if the potential shadow matches an anticipated shadow, determining a shadow correction in the processor, applying the shadow correction to the notional model in the processor, and generating in the processor notional sensory content representing at least a portion of the notional data model with the shadow correction applied thereto.

In another embodiment, a method is provided that includes establishing a viewing position for a user in a digital processor, obtaining a digital depth image of an environment with a digital time-of-flight depth camera in communication with the processor, communicating the depth image to the processor, determining in the processor solids data representative of the environment from the depth image, obtaining a digital color image of the environment with a digital color camera in communication with the processor, communicating the color image to the processor, and determining in the processor surfaces data representative of the environment from the color image. The method includes generating an augmented reality data model in the processor. The method also includes identifying in the processor at least one potential shadow from a color distribution in the surfaces data, identifying in the processor at least one light source from the color distribution in the surfaces data, locating the light sources in the surfaces data onto the solids data in the processor, and determining at least one anticipated shadow in the processor from the solids data and the light sources. If the potential shadow matches at least one of the anticipated shadows, the method includes identifying the potential shadow as an occluding shadow and determining a shadow correction for the potential shadow in the processor, applying the occluding shadow and the shadow correction to the notional model in the processor, generating in the processor augmented reality graphical content representing at least a portion of the augmented reality data model with the occluding shadow and the shadow correction applied thereto, and outputting the notional graphical content to the viewing position with an optical see-through display in communication with the processor.

In another embodiment, an apparatus is provided that includes a processor, and a see-through display in communication with the processor. The apparatus includes a reference position establisher including executable instructions instantiated on the processor, the reference position establisher being adapted to establish a reference position. The apparatus includes a solids data establisher including executable instructions instantiated on the processor, the solids data establisher being adapted to establish solids data representing an environment. The apparatus includes a surfaces data establisher including executable instructions instantiated on the processor, the surfaces data establisher being adapted to establish surfaces data representing the environment. The apparatus includes a notional data model establisher including executable instructions instantiated on the processor, the notional data model establisher being adapted to establish a notional data model. a potential shadow identifier including executable instructions instantiated on the processor, the potential shadow identifier being adapted to identify at least one potential shadow in the surfaces data. The apparatus includes a light source identifier including executable instructions instantiated on the processor, the light source identifier being adapted to identify at least one light source in the surfaces data. The apparatus includes a light source locator including executable instructions instantiated on the processor, the light source locator being adapted to locate the light sources from the surfaces data onto the solids data. The apparatus includes an anticipated shadow determiner including executable instructions instantiated on the processor, the anticipated shadow determiner being adapted to determine at least one anticipated shadow from the light sources and the solids data. The apparatus includes a shadow matcher including executable instructions instantiated on the processor, the shadow matcher being adapted to match the potential shadows against the anticipated shadows, and to identify the potential shadows as occluding shadows if the potential shadows match at least one of the anticipated shadows. The apparatus includes an occluding shadow applier including executable instructions instantiated on the processor, the occluding shadow applier being adapted to apply the occluding shadows to the notional model. The apparatus includes a notional content generator including executable instructions instantiated on the processor, the notional content generator being adapted to generate notional content representing at least a portion of the notional data model with the occluding shadow applied thereto. The apparatus includes an outputter including executable instructions instantiated on the processor, the outputter being adapted to output notional content to the see-through display.

The apparatus may include a depth sensor in communication with the processor, the depth sensor being adapted to obtain at least one depth measurement of the environment, wherein the solids data establisher is adapted to determine the solids data from the depth measurement. The depth sensor may include a depth camera, a stereo camera, a plenoptic camera, a time-of-flight sensor, an ultrasonic sensor, and/or a millimeter wave sensor.

The apparatus may include an image sensor in communication with the processor, the image sensor being adapted to obtain at least one image of the environment, wherein the surfaces data establisher is adapted to determine the surfaces data from the image. The image sensor may include a color camera, a grayscale camera, a black-and-white camera, a digital camera, and/or an infrared camera.

The processor and/or the see-through display may be disposed on a head mounted display.

The apparatus may include a shadow correction applier including executable instructions instantiated on the processor, and being adapted to apply a shadow correction for the potential shadow to the notional model, wherein the notional content generator is adapted to generate notional content representing at least a portion of the notional data model with the occluding shadow and the shadow correction applied thereto.

In another embodiment, an apparatus is provided that includes means for establishing a reference position, means for establishing solids data representative of an environment, and means for establishing surfaces data representative of the environment. The apparatus includes means for establishing a notional data model. The apparatus also includes means for identifying at least one potential shadow in the surfaces data, means for identifying at least one light source in the surfaces data, means for locating the light sources from the surfaces data onto the solids data, and means for determining at least one anticipated shadow from the solids data and the light sources. The apparatus includes means for identifying the potential shadow as an occluding shadow if the potential shadow matches at least one of the anticipated shadows, means for applying the occluding shadow to the notional model, means for generating notional sensory content representing at least a portion of the notional data model with the occluding shadow applied thereto, and means for outputting the notional sensory content to the reference position in a see-through form.

BRIEF DESCRIPTION OF THE SEVERAL VIEWS OF THE DRAWINGS

Like reference numbers generally indicate corresponding elements in the figures.

FIG. 19 shows an example apparatus for integrating occlusion, shadowing, and/or shadow correction from a physical data model to a notional data model, in schematic form.

DETAILED DESCRIPTION OF THE INVENTION

Figure 1:
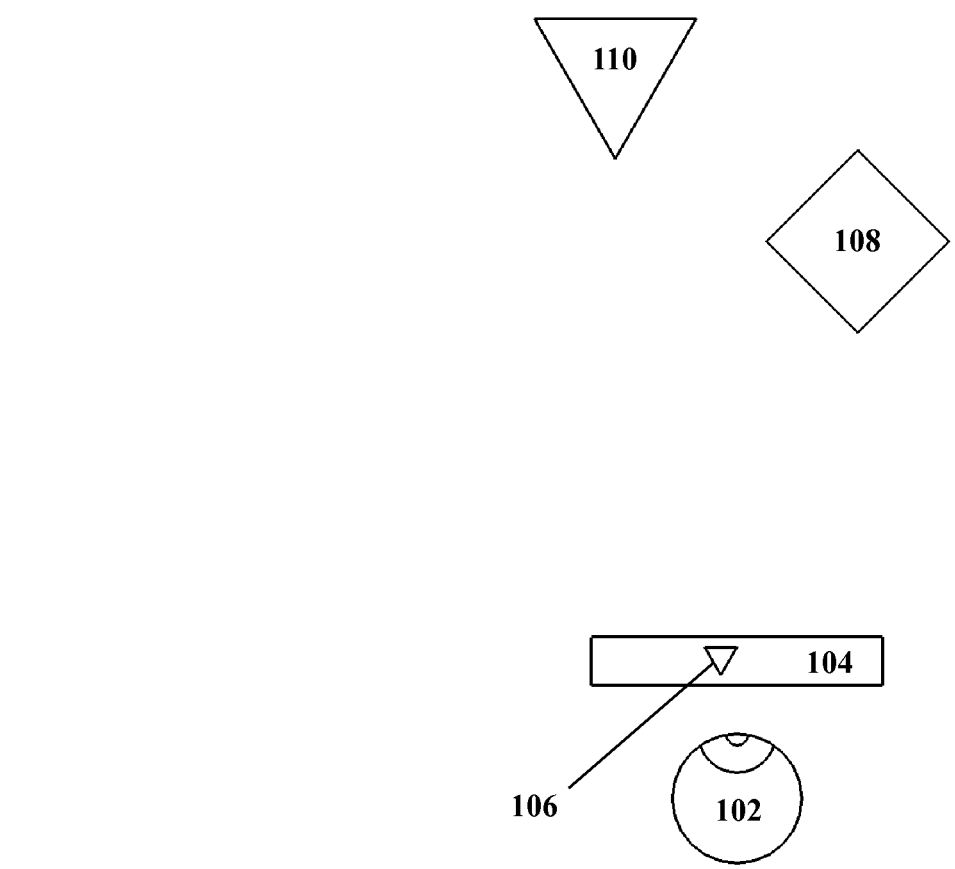
FIG. 1 shows an example arrangement of physical, displayed notional, and perceived notional entities with respect to a reference point, in a top-down view.

FIG. 1 shows an example arrangement of entities therein. A reference position 102 is represented by an eye of a viewer. Although shown as an eye for illustrative purposes, the reference position 102 is not limited only to eyes, nor even to sensors generally; the reference position 102 is a point of view, and while an eye, other sensory organ, electronic sensor, etc. may be disposed at the reference position 102 this is an example only, and other arrangements may be equally suitable.

A see-through display 104 is disposed proximate to and facing the reference position 102. As will be described in more detail later herein, for visual models and/or entities notional visual content may be outputted to the reference position 102 via a see-through display 104, and/or physical visual content may be outputted to the reference position 102 through a see-through display 104. However, the use of a see-through display in FIG. 1 is an example only, and other arrangements may be equally suitable.

The term "see-through display" 104 should be understood broadly herein. In a simple sense, a see-through display 104 may be a display that is physically transparent, such that notional content is actively displayed thereon (e.g. using phosphors, LEDs, etc.) while physical content (e.g. the physical environment) is visible therethrough via optical transmission. However, other arrangements may be equally suitable. For example, embodiments may also incorporate what might be referred to as a "virtual see-through display", wherein the physical environment is imaged in some fashion (e.g. with a video sensor) and then actively displayed.

Although for purposes of example embodiments may be described herein chiefly with regard to vision, embodiments are not limited only to visual phenomena. Other embodiments may enable cooperation of auditory models, for example, in which case an output device (if present) might not be commonly referred to as a "display" at all but perhaps rather as an audio speaker, etc. An example of such might be headphones deliver notional audio content while also passing physical audio content therethrough. So long as both the notional and physical sensory content are delivered to the reference position, the manner and/or systems utilized to do so may vary considerably. However for clarity the terms "display" and "see-through display" are used for at least certain examples herein.

Continuing in FIG. 1, a physical entity 108 is shown in a position so as to be visible through the see-through display 104 from the reference position 102. In such fashion, physical visual content (in this example a view of the physical entity) is delivered to the reference position 102.

A notional entity 106 also is shown displayed by the see-through display 104 from the reference position 102, such that notional visual content (in this example images on the display 104) is delivered to the reference position 102. An apparent notional entity 110 is shown as well. The apparent notional entity 110 represents the appearance of the notional entity 106 displayed by the see-through display 104. That is, although the actual output of the see-through display 104 typically is small in size and is within, on the surface of, or near to the surface of the display 104 (as represented in FIG. 1 by the notional entity 106) the see-through display 104 may produce the appearance of content being of a different size, at a different distance, etc. (as represented by the apparent notional entity 110). For simplicity, subsequent figures and description herein typically depict notional entities in their apparent positions, rather than as images displayed within the display 104. However, it should be kept in mind that although a notional entity may be given the appearance of being distant from the reference point 102, in practice notional entities typically are confined to being outputted at positions on, in, and/or or near the display 104.

The term "notional entity" is used herein broadly, to refer collectively to any entity that lacks concrete physical existence but that may nevertheless be sensed and/or otherwise manipulated. For example, a computer generated 2D image, 3D object, wireframe model, audio clip, etc. might be argued as not being "real" in the sense of being physical objects, but may nevertheless be seen, heard, felt as solid (e.g. with haptic inputs), etc. The term "notional entity" is applied herein because such entities typically (though not necessarily) may exist primarily or entirely as data, rather than physical matter or energy. Notional entities include, but are not limited to, virtual reality entities and augmented reality entities.

Figure 2A:
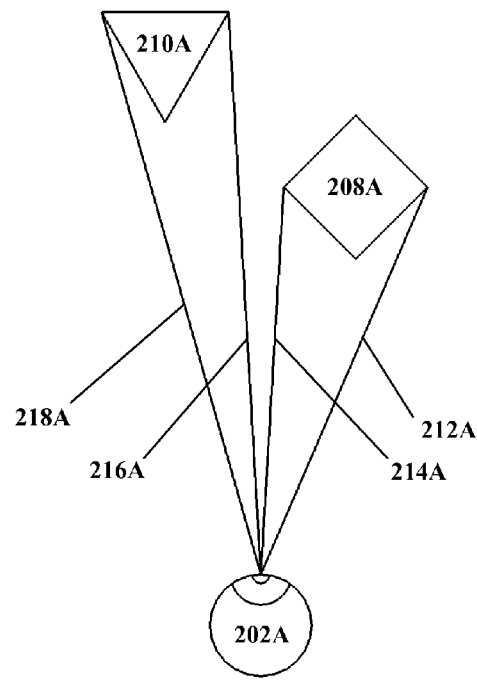
FIG. 2A shows an example arrangement of physical and notional entities without occlusion with respect to a reference point, in a top-down view.

Now with reference to FIG. 2A, another arrangement of a physical entity 208A and a notional entity 210A relative to a reference position 202A is shown therein. (As noted previously with regard to FIG. 1, the notional entity as outputted by a display is not shown, in favor of the apparent notional entity referred to herein as 210A. Further, again for simplicity the display itself is not shown in at least certain figures herein, though in practice the display typically will be present.)

In addition, FIG. 2A includes sight lines 212A and 214A indicating the visible extents of the physical entity 208A relative to the reference position 202A, and sight lines 216A and 218A indicating the visible extents of the notional entity 210A relative to the reference position 202A. (Strictly speaking, if the reference position is considered to be the point of view for an actual eye, the reference position may be inside the eye, e.g. at or near the surface of the retina thereof where the images are focused by the eye's lens. For simplicity, issues regarding internal structure and operation of the eye are not addressed; the precise location of the reference position may vary within the scope of embodiments depending on particulars thereof.)

As may be observed with regard to FIG. 2A, sight lines 212A and 214A for the physical entity 208A are not interrupted by the notional entity 210A, nor are sight lines 216A and 218A for the notional entity 210A interrupted by the physical entity 208A. Thus, the physical entity 208A does not occlude the notional entity 210A, nor does the notional entity 210A occlude the physical entity 208A.

Figure 2B:
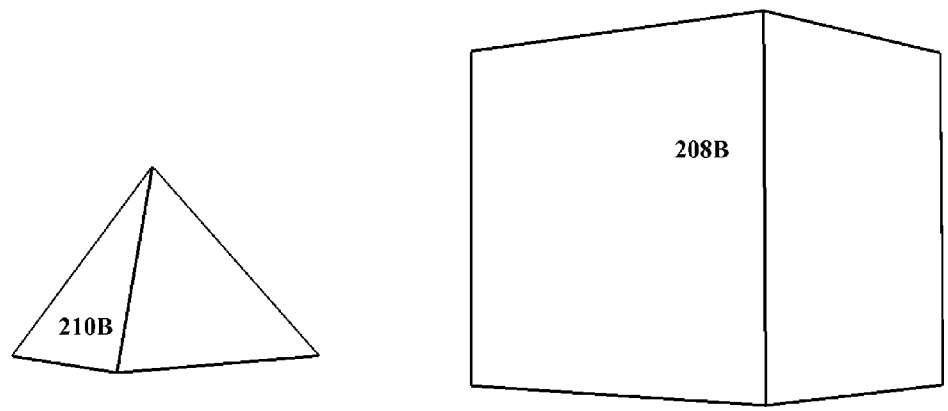
FIG. 2B shows an example arrangement of physical and notional entities without occlusion as viewed from a reference point.

Turning now to FIG. 2B, therein an arrangement with a physical entity 208B and a notional entity 210B is also shown. The arrangement in FIG. 2B is at least somewhat similar to the arrangement in FIG. 2A, although where FIG. 2A shows a top-down arrangement FIG. 2B shows a perspective view as might be visible from a reference position (the reference position not being itself illustrated in FIG. 2B). As may be seen perhaps more directly in FIG. 2B, the arrangement therein exhibits neither occlusion of the physical entity 208B by the notional entity 210B nor occlusion of the notional entity 210B by the physical entity 208B.

The arrangements shown in FIG. 2A and FIG. 2B correspond with what may be exhibited when a notional entity (e.g. a virtual image) is outputted to a see-through display through which a physical entity also is visible, with no overlap in position. That is, in the arrangements shown the notional and physical entities are visually separated by some distance, and so no occlusion is apparent. This may be considered a baseline case; no occlusion considerations arise since there is no overlap that would be expected to result in occlusion.

Figure 3A:
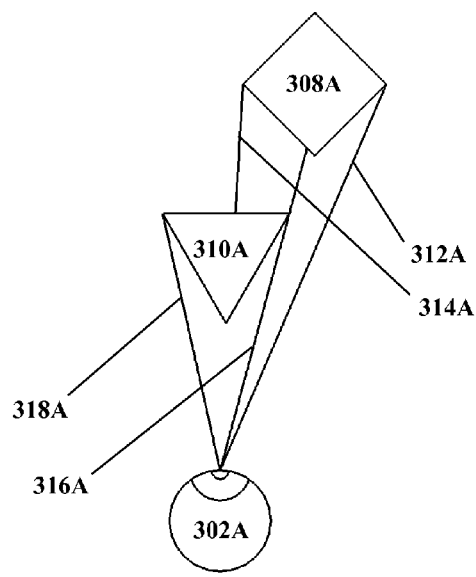
FIG. 3A shows an example arrangement of a notional entity occluding a physical entity with respect to a reference point, in a top-down view.

With reference to FIG. 3A, an arrangement of a physical entity 308A and a notional entity 310A relative to a reference position 302A is shown therein. FIG. 3A also includes sight lines 312A and 314A indicating the visible extents of the physical entity 308A relative to the reference position 302A, and sight lines 316A and 318A indicating the visible extents of the notional entity 310A relative to the reference position 302A.

As may be observed in FIG. 3A, sight lines 316A and 318A for the notional entity 310A are not interrupted by the physical entity 308A. However, although sight line 312A for the physical entity 308A is not interrupted by the notional entity 310A, sight line 314A is interrupted by the notional entity 310A. Thus, as viewed from the reference position 302A the portion of the physical entity 308A between sight lines 316A and 318A would be occluded by the notional entity 310A.

Figure 3B:
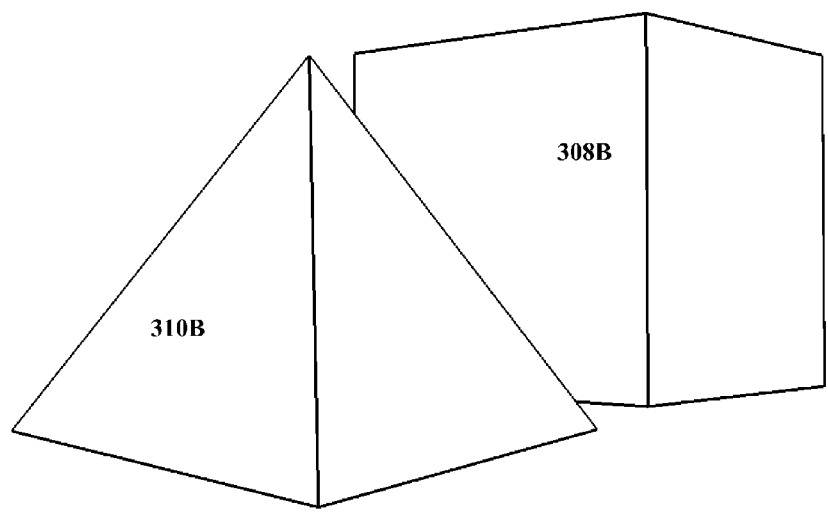
FIG. 3B shows an example arrangement of a notional entity occluding a physical entity as viewed from a reference point.

Now with reference to FIG. 3B, therein an arrangement with a physical entity 308B and a notional entity 310B is also shown. The arrangement in FIG. 3B is at least somewhat similar to the that of FIG. 3A although FIG. 3B shows a perspective view as might be visible from a reference position. As may be seen in FIG. 3B, the arrangement therein exhibits occlusion of the physical entity 308B by the notional entity 310B. More colloquially, the notional entity 310B appears to be closer to the point of view (e.g. reference position) than the physical entity 308B, and the notional entity 310B also appears to overlap part of the physical entity 308B so as to block part of the physical entity 308B from view.

The arrangements shown in FIG. 3A and FIG. 3B correspond with what may be exhibited when a notional entity (e.g. a virtual image) is outputted to a see-through display through which a physical entity also is visible, with the notional entity overlapping the physical entity so that the physical entity is partially occluded by the notional entity. Considering, for example, an arrangement wherein a virtual reality object is displayed with a see-through display, and a physical object is visible through such a display, typically the virtual reality object may overlap the physical object, occluding some or all of the physical object. This is similar to what may be seen in FIG. 3A and FIG. 3B.

Although FIG. 3A and FIG. 3B show an arrangement wherein the notional entity is solid and opaque, and thus completely obscures that portion of the physical entity that the notional entity overlaps, this is an example only. If the notional entity were transparent, were an open wire frame, etc., the physical entity might be partially visible through the notional entity. However, even in such instance, whatever visibility the notional entity exhibits may still appear overlaid upon the physical entity, and thus the notional entity may still be considered to occlude the physical entity. The particular appearance may vary from what is shown in the example arrangements of FIG. 3A and FIG. 3B (e.g. some portion of the physical entity may be visible as a "ghost" through a transparent notional entity), but the state of occlusion as shown and described nevertheless may still apply.

Figure 4A:
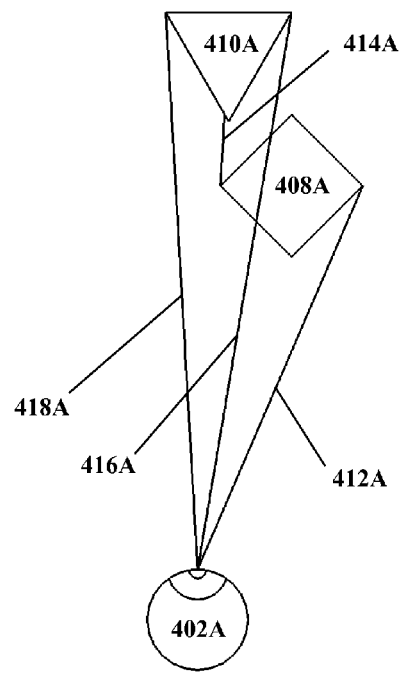
FIG. 4A shows an example arrangement of a notional entity non-geometrically occluding a physical entity with respect to a reference point, in a top-down view.

With reference to FIG. 4A, another arrangement of a physical entity 408A and a notional entity 410A relative to a reference position 402A is shown therein. FIG. 4A again includes sight lines 412A and 414A indicating the visible extents of the physical entity 408A relative to the reference position 402A, and sight lines 416A and 418A indicating the visible extents of the notional entity 410A relative to the reference position 402A.

As may be observed in FIG. 4A, sight lines 416A and 418A for the notional entity 410A are not interrupted by the physical entity 408A. However, sight line 416A passes through the physical entity 408A, even though the physical entity 408A is closer to the reference position 402A than is the notional entity 410A. In addition, even though the notional entity 410A is farther from the reference position 402A than is the physical entity 408A, sight line 414A is interrupted by the notional entity 410A; thus the portion of the physical entity 408A between sight lines 414A and 416A is occluded by the notional entity 410A, and only the portion of the physical entity 408A between sight lines 412A and 416A is visible at the reference position 402A without obstruction.

This arrangement may be viewed as counter-intuitive given the geometry shown in FIG. 4A. Namely, a more distant feature (the notional entity 410A) appears in FIG. 4A to occlude a less distant feature (the physical entity 408A). However, as noted previously with regard to FIG. 1, it should be kept in mind that the notional entity 410A may be displayed on a see-through display that is in fact closer to the reference position 402A than is the physical entity 408A.

Figure 4B:
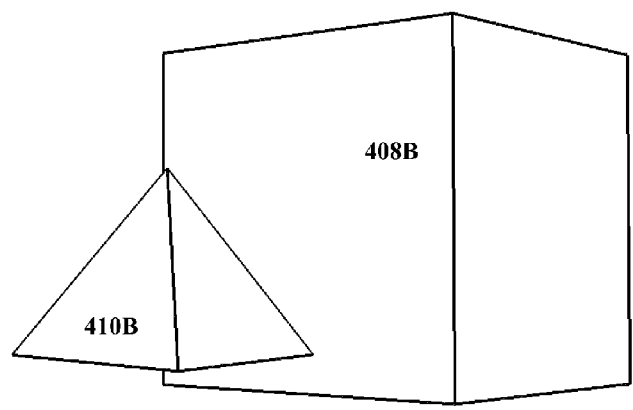
FIG. 4B shows an example arrangement of a notional entity non-geometrically occluding a physical entity as viewed from a reference point.

With regard to FIG. 4B, therein an arrangement with a physical entity 408B and a notional entity 410B is shown. The arrangement in FIG. 4B is at least somewhat similar to the that of FIG. 4A although FIG. 4B shows a perspective view as might be visible from a reference position. As may be seen in FIG. 4B, the arrangement therein exhibits occlusion of the physical entity 408B by the notional entity 410B. It is emphasized the notional entity 410B partially occludes the physical entity 408B even though the notional entity 410B appears to be more distant than the physical entity 408B, as also noted previously with regard to FIG. 4A.

An arrangement such as that in FIG. 4A and FIG. 4B, though counter-intuitive, is possible in at least certain circumstances. As noted, a see-through display outputting a notional entity such as a virtual image may be closer to a point of view (or other reference position) than a physical object viewed through such a display.

One example of such arrangement would be a head mounted display using optically transparent screens, wherein the screens are disposed as close as a few millimeters from the eyes but physical objects many meters distant may be observed through the screens. For such an arrangement, the actual display output for notional entity might be only a few millimeters from the viewer's eyes, even when apparent position of the notional entity is many meters distant.

When the display output for a notional entity is closer than a physical object, and the two overlap, then typically (absent other considerations) the closer notional entity may occlude the more distant physical entity, regardless of the perceived distance of the notional entity based on other cues.

This may result in the counter-intuitive arrangements shown in FIG. 4A and FIG. 4B, wherein the appearance is given of a closer physical entity being occluded by a more distant notional entity. (The apparent paradox is, as noted, due to the notional entity actually being closer despite appearances.)

However, although possible and geometrically explainable, an arrangement such as that in FIG. 4A and FIG. 4B may be problematic. For example, a notional entity may appear by some visual cues (focal distance, stereo distance, etc.) to be at one distance, while simultaneously appearing by visual occlusion to be at a different distance. One possible result of such dissonance among visual cues may be interruption of "suspension of disbelief": if the notional entity is portrayed with the expectation that it be seen as "real", but does not behave as a real object, then a viewer's ability and/or willingness to act as though the notional entity were a real object may be impaired. Other issues that might manifest may include, but are not limited to, viewer discomfort or difficulties such as disorientation, dizziness, nausea, eyestrain, headache, etc. Given the complexity of visual processes and (in both the eye and the brain) precise prediction of difficulties is itself problematic; some individuals may exhibit some such issues, others entirely different issues, still others no difficulties at all. Regardless, in at least certain instances it may be desirable to avoid such dissonant cues.

Figure 5A:
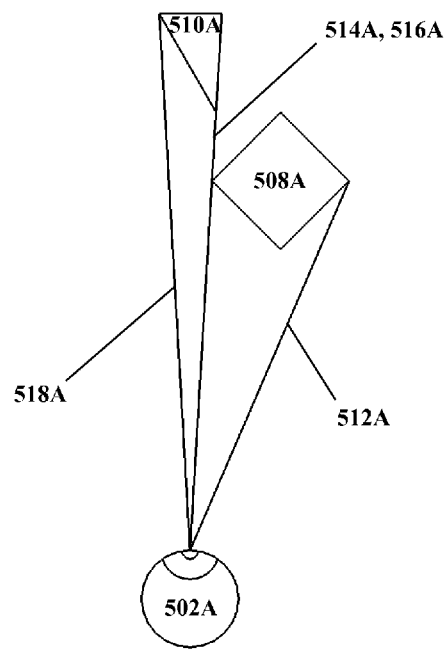
FIG. 5A shows an example arrangement of a physical entity occluding a notional entity with respect to a reference point, in a top-down view.

Now with reference to FIG. 5A, another arrangement of a physical entity 508A and a notional entity 510A relative to a reference position 502A is shown therein. FIG. 5A again includes sight lines 512A and 514A indicating the visible extents of the physical entity 508A relative to the reference position 502A, and sight lines 516A and 518A indicating the visible extents of the notional entity 510A relative to the reference position 502A.

As may be observed in FIG. 5A, sight lines 514A and 516A are at least substantially similar. In addition, a portion of the notional entity 510A in FIG. 5A has been removed as compared with the notional entity 410A in previously described FIG. 4A. More particularly, considering in FIG. 4A the portion of the notional entity 410A that occluded the physical entity 408A therein, the corresponding portion of notional entity 510A does not appear in FIG. 5A.

Arrangements for carrying out such removal as may be understood from FIG. 5A are described in more detail subsequently herein. However, in essence the degree to which the physical entity 508A would occlude the notional entity 510A based on the apparent position of the notional entity 510A relative to the reference location 502A and the position of the physical entity 508A relative to the reference location 502A is determined, and a geometrically suitable occlusion of the notional entity 510A is then applied to the notional entity. More colloquially, the portion of the notional entity 510A that should be blocked from view by the physical entity 508A is removed from display.

Figure 5B:
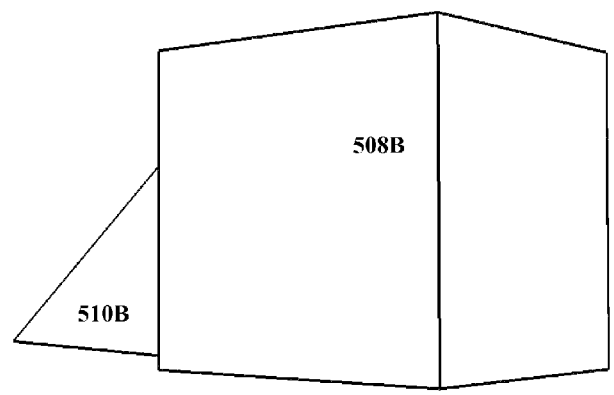
FIG. 5B shows an example arrangement of a physical entity occluding a notional entity as viewed from a reference point.

Now with reference to FIG. 5B, therein an arrangement with a physical entity 508B and a notional entity 510B is shown. The arrangement in FIG. 5B is at least somewhat similar to the that of FIG. 5A although FIG. 5B shows a perspective view as might be visible from a reference position. As may be seen in FIG. 5B, the arrangement therein appears to exhibit occlusion of the notional entity 510B by the physical entity 508B. However, the occlusion may be understood (with reference to FIG. 5A) to be not a physical occlusion, but an applied occlusion. That is, the notional entity 510B may be physically closer to a viewer than the physical entity 508B (e.g. if a display that is outputting the notional entity 510B is physically closer than the physical entity 508B), but the portion of the notional entity 510B that should be behind the physical entity 508B is not displayed.

As a result, even though the overall arrangements in FIG. 5A and FIG. 5B are otherwise similar to those in FIG. 4A and FIG. 4B, by applying geometrically suitable occlusion to the notional entity 510A and 510B in FIG. 5A and FIG. 5B the dissonant visual cues in FIG. 4A and FIG. 4B are not present in FIG. 5A and FIG. 5B. Again more colloquially, and particularly with reference to FIG. 5B, the notional entity "looks right" from the reference position.

FIG. 1 through FIG. 5B show example physical visual content and notional visual content in combination. In particular, FIG. 5A and FIG. 5B show an arrangement wherein physical visual content and notional visual content are integrated together, such that at least certain properties that are exhibited within each data model—such as occlusion of distant objects by closer objects—are maintained among the data models. That is, where occlusion may in at least certain circumstances be exhibited by a physical object interacting with another physical object, or by a notional object interacting with another notional object, the arrangement in FIG. 5A and FIG. 5B shows occlusion exhibited by a physical object interacting with a notional object. The feature of occlusion thus is shown to be maintained when physical visual content and notional visual content are integrated together.

Figure 6:
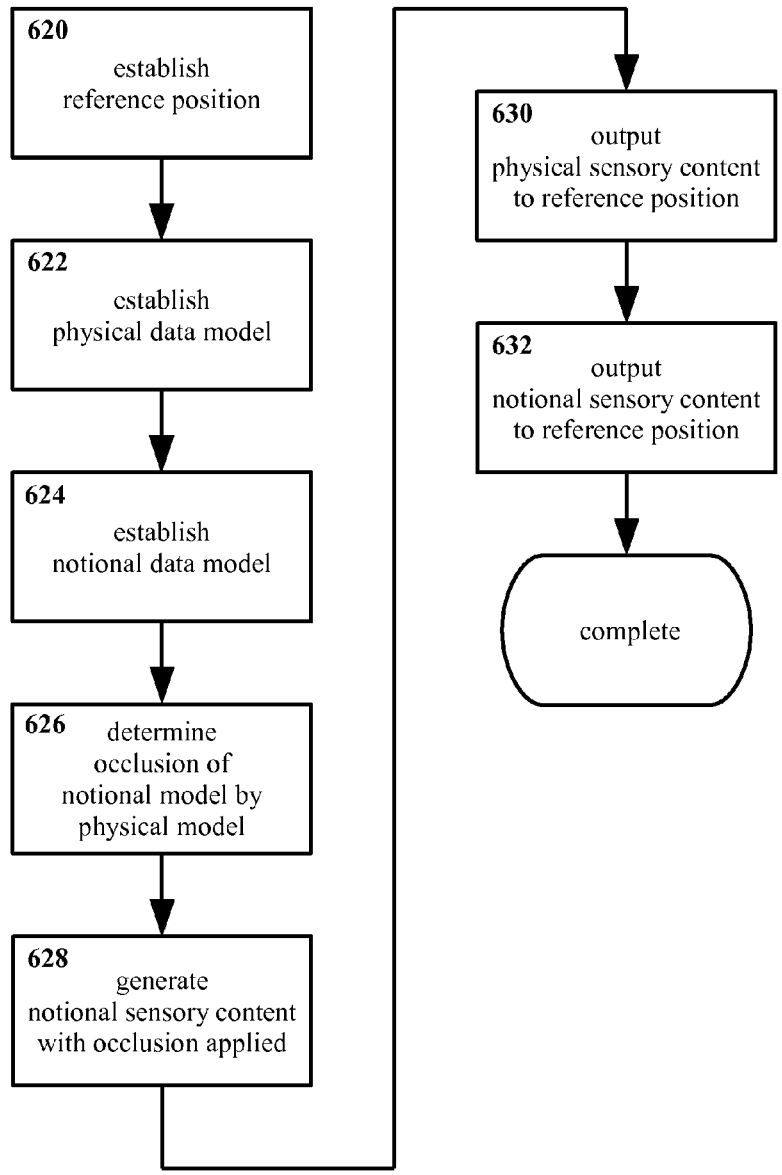
FIG. 6 shows an example method for integrating occlusion from a physical data model to a notional data model, in flow-chart form.

With reference now to FIG. 6, an example arrangement is presented wherein physical and notional visual content may be integrated, again with reference to occlusion as an example. However, as will be described in greater detail subsequently herein, embodiments are not limited only to exhibiting occlusion among integrated sensory content, and other arrangements may be equally suitable.

Typically, though not necessarily, most or all steps in FIG. 6 (and similarly in other method figures herein) may be partially or entirely carried out by and/or in cooperation with one or more processors. In such instance, the processor or processors may carry out method steps through the execution of executable instructions instantiated thereon. A variety of processors may be suitable for such tasks, and embodiments are not limited with respect thereto.

In the method shown in FIG. 6, a reference position is established 620. In considering occlusion, one object, phenomenon, etc. typically is disposed on a similar line of sight as that leading to some other object, phenomenon, etc. The reference position serves as an indication of the base for the line of sight. More colloquially, in order to consider whether one object obscures another, the point of view also must be considered. Thus the reference position may in some sense be considered to be a point of view. It is emphasized however that the reference position is not limited only to visual sensing, nor is a viewer necessarily required.

With regard to establishing the reference position 620, the term "establishing" is used broadly herein. It is noted that to "establish" something may, depending on particulars, refer to either or both the creation of something new (e.g. establishing a business, wherein a new business is created) and the determination of a condition that already exists (e.g. establishing the whereabouts of a person, wherein the location of a person who is already present at that location is discovered, received from another source, etc.). Similarly, establishing a reference position may encompass several potential approaches, such as selecting or computing the reference position (e.g. through the use of executable instructions instantiated on a processor), obtaining the reference position from a data store such as a hard drive or solid state drive, receiving the reference position via communication with some external device, system, etc., and so forth. Other arrangements also may be equally suitable, and embodiments are not limited with regard to how the reference position is established 620.

Continuing in FIG. 6, a physical data model is established 622. The physical data model is an assembly of data, typically though not necessarily instantiated on a processor, that describes at least one parameter of at least one physical entity. For the particular example of occlusion as described previously with regard to FIG. 1 through FIG. 5B, a physical data model may include information describing the position, dimensions, orientation, etc. of one or more physical entities such as solid material objects. However, as will be discussed subsequently herein in more detail embodiments are not limited only to features related to occlusion when facilitating data model interaction, and other information than position, dimension, and/or orientation may be equally suitable.

The term "physical entity" is used broadly herein. For simplicity at certain points physical entities may be considered herein as being physical objects and/or surfaces, such as a hand, a wall, etc. However, substantially any object, phenomenon, or feature may serve as a physical entity. For example, light sources and/or light therefrom, shadows, fog, smoke, heat haze, optical effects such as lens flare within an optical system, etc. may for at least certain embodiments be considered and treated as physical entities.

The physical data model is not limited only to reflecting physical entities. Rules or patterns that describe behavior of physical objects and phenomena, which may not necessarily be considered to be entities unto themselves, may nevertheless be part of a physical data model. For example, a description of or rules for Newtonian mechanical behavior might be included within a physical data model (e.g. to assist in accurate modeling of moving physical objects), even if Newtonian mechanical behavior were not considered to be a physical entity unto itself.

As noted with regard to establishing the reference position 620, the term "establish" is used broadly with regard to establishing the physical data model 622. Establishing the physical data model 622 may encompass several potential approaches. For example, one or more sensors may collect information, with that information then being utilized for construction of a data model. As a more concrete example, a depth camera or a pair of cameras in a stereo configuration might collect data regarding the presence, shape, size, position, orientation, etc. of physical objects and phenomena in some area. Such information may then be used to construct a physical data model, for example through carrying out image processing and/or other calculations within a processor. However, other arrangements, including but not limited to obtaining a physical data model (or information for constructing such) from a data store such as a hard drive or solid state drive, and receiving a physical data model (or information for constructing such) via communication with some external device, system, etc. Other arrangements also may be equally suitable, and embodiments are not limited with regard to how the physical data model is established 622.

Also with regard to terminology, it is noted that the term "physical" with regard to the physical data model does not indicate that the model itself is a physical object or necessarily has physical substance. Typically though not necessarily, the physical model exists only as data and/or executable instructions; the term "physical" should not be taken to imply or require that the physical data model has some physical solidity, but rather to indicate the subject matter of the model (i.e. being reflective of one or more physical entities), and to distinguish from the notional data model.

The physical data model may be dynamic in time. That is, the physical data model may be adapted to change as time progresses, for example in response to changes in the physical environment such as objects moving, the reference position changing with respect to the physical model, new physical objects or features being added, physical objects or features being modified, etc. Change may be continuous, periodic, and/or or sporadic; for certain embodiments it may be useful to update the physical model at regular intervals to produce an appearance of continuous change, at least somewhat similarly to the manner in which a series of still frames of film may produce the appearance of a continuously moving picture, but this is an example only and other arrangements may be equally suitable.

Proceeding in FIG. 6, a notional data model is established 624. The notional data model is an assembly of data, typically though not necessarily instantiated on a processor, that describes at least one parameter of at least one notional entity. For the particular example of occlusion as described previously with regard to FIG. 1 through FIG. 5B, a notional data model may include information describing the position, dimensions, orientation, etc. of one or more notional entities such as 3D virtual objects. However, embodiments are not limited only to features related to occlusion when facilitating data model interaction, and other information than position, dimension, and/or orientation may be equally suitable.

As noted previously with regard to FIG. 1, the term "notional entity" is used broadly herein, to refer collectively to any entity that lacks concrete physical existence but that may nevertheless be sensed and/or otherwise manipulated. Notional entities thus include but are not limited to computer generated 2D images, 3D objects, audio clips, and other virtual reality and/or augmented reality objects and phenomena.

As noted with regard to establishing the physical data model 622, the term "establish" is used broadly with regard to establishing the notional data model 624. Establishing the physical data model 624 likewise may encompass several potential approaches. For example, a notional model and/or information for constructing such may be generated internally within a processor, obtained from a data store such as a hard drive or solid state drive, received via communication with some external device, system, etc. Other arrangements also may be equally suitable, and embodiments are not limited with regard to how the notional data model is established 624.

Like a physical data model, a notional data model may include content other than notional data entities, including but not limited to rules describing behavior thereof.

However, unlike a physical data model, a notional data model may literally be or include the notional entity or entities in question, rather than being a reflection of one or more notional entities. If the notional entities in question and the notional data model are both informational constructs, as may be true for at least certain embodiments, then the notional entities themselves (possibly including rules for behavior of such entities, etc.) may serve as the notional data model. However, this is not required, and other arrangements may be equally suitable.

As noted with regard to the physical data model, the notional data model also may be dynamic in time. The notional data model thus may be adapted to change as time progresses, for example in response to changes in the notional environment such as objects moving, the reference position changing with respect to the notional model, new notional objects or features being added, notional objects or features being modified, etc. Change may be continuous, periodic, and/or or sporadic.

Thus, having completed steps 620, 622, and 624 a reference position, a model depicting at least one physical entity, and a model of at least one notional entity are established. Such an arrangement may in at least some embodiments resemble the examples presented with regard to FIG. 1 through FIG. 5B.

Continuing in FIG. 6, an occlusion of the notional model by the physical model is determined 626 relative to the reference position. That is, the notional model, the physical model, and the reference position are considered together, to determine whether some portion of the physical model obstructs or should obstruct sight lines between the reference position and the notional model. Occlusion of the notional model by the physical model might also be considered in terms of distances, e.g. is the distance along a direction from the reference position to the physical data model less than the distance along that direction to the notional data model?

As noted previously with regard to FIG. 4A and FIG. 4B, if a notional entity is displayed as visual output while a physical entity also is visible, the displayed notional entity may overlap onto (i.e. occlude) the visible physical entity even if the nominal distance to the notional entity according to the notional data model is greater than the distance to the physical entity according to the physical data model. This may occur, for example, if the notional entity is made visible on a display that is closer to the viewer than is the physical entity. In such instance, conflicting visual cues may be provided.

However, through comparison of the reference position, the data model for the physical entity, and the data model of the notional entity, a determination may be made as to what portion of the notional entity (if any) should be occluded by the physical entity. For example, geometrical analysis of distances along lines of sight from the reference position to the physical data model and the notional data model may indicate whether some portion of the notion model is behind (i.e. more distant than) some portion of the physical model, from the point of view of the reference position.

For purposes of discussion, the portion of the notional entity in the notional data model that is behind (more distant than) the physical entity in the physical data model is referred to herein in at least some places as "an occlusion" and/or "the occlusion", i.e. as a noun.

In determining the occlusion 626, at least for the example in FIG. 6 what is being determined is a "thing" unto itself. While the occlusion may not have physical substance, the occlusion nevertheless may be a data entity unto itself. For example, for certain embodiments the occlusion might be a two-dimensional geometric object in the form of a mask, which may be applied to the notional data model if and when the notional model is displayed in some fashion. However, an occlusion having such form is an example only, and other arrangements may be equally suitable.

Continuing in FIG. 6, notional sensory content is generated 628 from the notional data model with the occlusion applied thereto. To continue the example above, if the occlusion is a data entity in the form of a two dimensional geometric mask, that mask corresponding to the portion of the notional data model that is occluded by the physical data model relative to the reference position, then a visual representation of the contents of the notional data model would then be generated (e.g. for output with a display), but with the occlusion applied thereto such that the occluded portion of the notional data model is not a visible part of such a visual representation.

More colloquially, with regard to steps 626 and 628, the portion of the notional data model that is occluded by the physical data model (and that thus should appear to be occluded by the physical entity) is determined, and that portion of the notional data model is excluded from being displayed.

Applying the occlusion to the notional data model for purposes of generating 628 notional sensory content should not be taken as necessarily indicating that the occlusion and the notional data model are combined in any sense except as sufficient to generate visual content with suitable occlusion of the notional data model. In particular, the occluded portion of the notional data model is not necessarily deleted from the notional model, even though the occluded portion may not be visible in the sensory content as delivered to a viewer.

As noted previously herein with regard to step 626, for at least certain embodiments it may be useful to consider occlusion as a "thing" unto itself, whether that thing is a mask, a map, a defined area of space, etc. Such an arrangement may facilitate efficient execution of a method for certain embodiments.

As a more concrete example, consider an arrangement with a three-dimensional augmented reality environment and occlusion thereof with respect to a three dimensional physical environment, as outputted to a viewer using an optically transparent head mounted display. In such case, physical visual content passes through the optically transparent head mounted display. However, augmented reality content may be rendered frame by frame, producing two dimensional rendered augmented reality images from the three dimensional augmented reality environment (with those images then being outputted to the viewer). Typically a physical model is generated, for example through the use of a depth camera disposed on the head mounted display, to provide information regarding the physical environment so as to facilitate occlusion of the augmented reality environment.

It may be useful for certain embodiments to combine the physical and notional data models into a single model, or to treat the two data models together in rendering image output. In such instance, each frame of augmented reality imagery may be rendered based on analysis of the full three dimensional augmented reality environment and the full model of the three dimensional physical reality environment.

Such an approach might be referred to as a "pixel by pixel" process. That is, renders are generated considering both models in their entirety (or at least in substantial part), so as to produce two dimensional images of a simultaneous intersection of two three dimensional (or higher dimensional) data models.

However, for at least some embodiments treating occlusion as an object unto itself (as noted previously herein with regard to step 626) may be advantageous. Rather than necessarily executing a full render of two three dimensional models as described above, or combining two models and rendering the resulting combination, in generating and applying an occlusion as a distinct (or at least semi-distinct) feature from the models themselves, generating graphical output may be made simpler and more efficient.

Rather than necessarily generating occlusion within a render pixel-by-pixel, the image changes—in the example of occlusion, the portions of the augmented reality environment that would be occluded by the physical environment— may be rendered separately. The portions of the augmented reality environment that are to be excluded may be determined by segmenting nearby physical objects, through geometric analysis, or through other approaches. Such an approach may, for the example currently under consideration, generate an occlusion in the form of a two-dimensional mask frame that may be overlaid onto an augmented reality render frame, with areas under the mask not being outputted to the head mounted display.

Regardless of such particulars however, with the occlusion generated, the occlusion may be applied to, combined with, etc. the augmented reality visual content that is to be delivered to the viewer.

Thus, as noted previously, for at least certain embodiments it may be useful to treat occlusion as a "thing" unto itself. However, this is an example only, and other arrangements may be equally suitable.

In addition, with reference to step 628, in the example embodiment of FIG. 6 the occlusion is applied in generating content from the notional data model. However, for at least certain embodiments it may be equally suitable to apply the occlusion in generating content from the physical data model, and/or in generating content from both models. The occlusion also may be used to generate occlusion content entirely separately, and delivered as a third "stream" of content. Embodiments are not limited to the manner in which the occlusion is made to appear as visual content. However, since at least certain embodiments may utilize an optical see-through display, wherein no physical visual content is generated (rather, light reflecting from physical objects in such case being passively transmitted through the optical see-through display), for purposes of clarity the occlusion is described chiefly herein as being applied to content generated from the notional data model (i.e. because content is not necessarily generated from the physical data model).

Continuing in FIG. 6, physical sensory content is outputted 630 to the reference position. For an embodiment addressed to an optical see-through display, outputting 630 the physical sensory content may be a passive step, i.e. what physical objects exist are allowed to pass through the see-through display so as to be visible therethrough. However, as has been noted at least certain embodiments may address virtual see-through displays, wherein the physical environment is imaged with for example a camera and outputted to a display that is physically opaque. For such embodiments, outputting 630 physical sensory content may for example include outputting such images of the physical environment to the display as an active step (e.g. outputting images of the physical environment on an LED screen, OLED screen, using a scanning laser, etc.).

Thus, for at least certain embodiments step 630 may be optional, at least insofar as being an active step. (Light passing through an optically transparent display may still in some sense constitute "output", but may not require active execution as part of a method.) Step 630 is included in FIG. 6 for completeness, but not all embodiments may require such a step.

The notional sensory content is also outputted 632 to the reference position. As noted with regard to step 628, the occlusion is applied to the notional sensory content therein. Thus, the notional sensory content as outputted 632 to the reference position may not include a visual representation of that portion of the notional data model that is occluded by the physical data model.

Thus, if some portion of the physical data model occludes some portion of the notional data model, then as shown in FIG. 6 the notional sensory content is displayed with the appearance that the actual physical environment occludes the relevant portion of the notional environment. (As noted previously, for portions of the notional data model that may occlude the physical data model, the notional sensory content may occlude the relevant portion of the physical environment naturally, without modification being required.)

In other words, where notional content has a nominal distance (based on notional and physical data models) that is "behind" physical content, that notional content is not displayed. Thus an intuitively correct appearance is provided wherein, the notional content appears to be behind the physical content. As previously noted, for certain embodiments such intuitively correct appearance may be enabled even though in terms of physical geometry the notion content is displayed in front of the physical environment (e.g. because the notional content is displayed on a head-mounted display that is disposed near a viewer's eyes).

Typically, the notional content as outputted is registered with the physical content. That is, for example a virtual reality shadow output so as be (or appear to be) cast by a physical object may be aligned with the physical object in similar fashion to a real shadow. Registration may consider factors including but not limited to position (whether in two dimensions, three dimensions, etc.), scale, shape, etc. Perfect registration may not be necessary; for example, some degree of mismatch between the aforementioned virtual shadow and physical object may be acceptable, e.g. if registration is sufficient that the mismatch does not distract the viewer, or produce imaging artifacts, or cause other issues, etc., though the precise degree of mismatch and the degree(s) to which negative side effects may be acceptable may vary among embodiments.

Although FIG. 6 shows the method therein as being complete following step 632, other steps, other functions, etc. may be incorporated into the method, and/or other methods may be executed in combination with the method (and this applies likewise to other example methods shown herein, and to the method generally). Notably, for at least certain embodiments at least some portion of the method may repeat. For example, an ongoing loop may accommodate changes in the physical data model and/or notional data model which as stated previously may be dynamic over time. Thus the physical and notional sensory content likewise may be dynamic in time.

Figure 7:
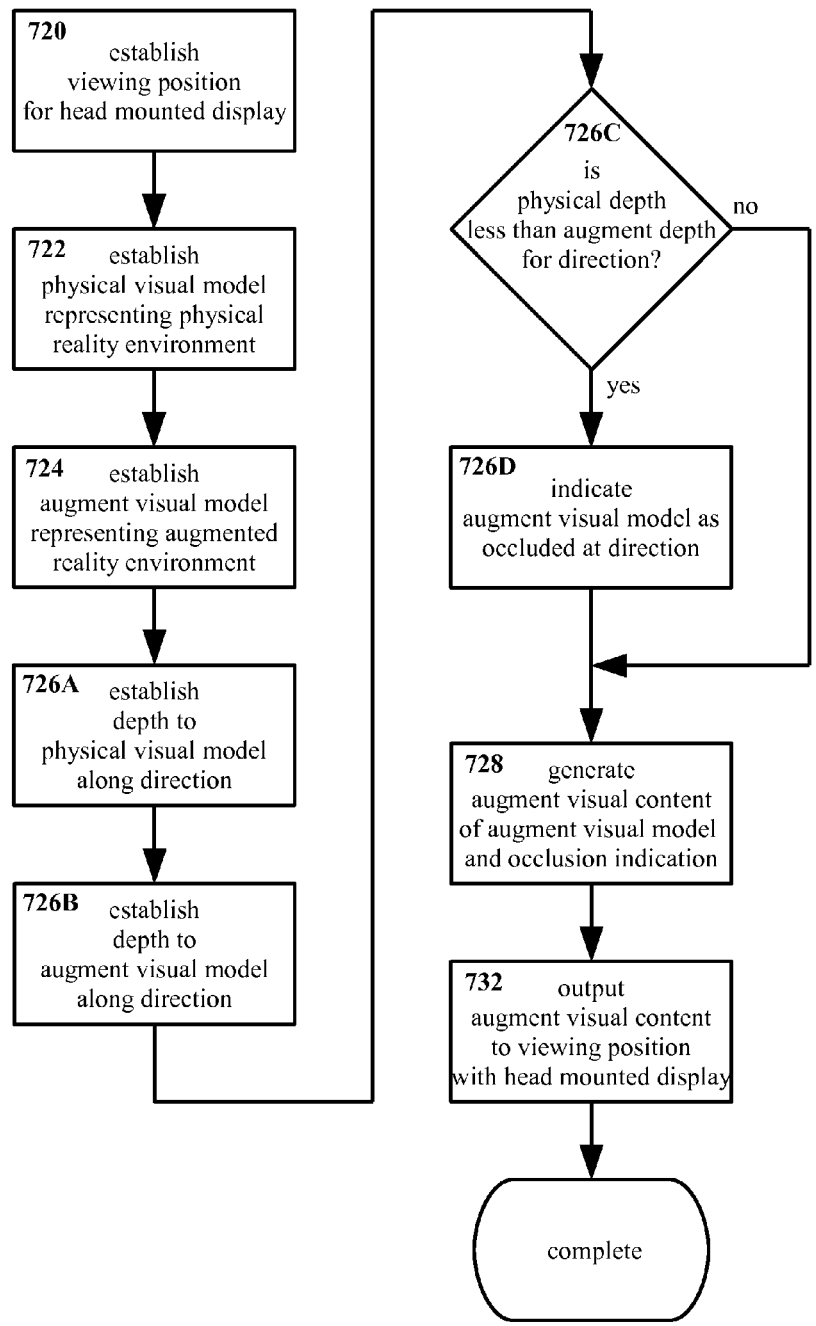
FIG. 7 shows another example method for integrating occlusion from a physical data model to a notional data model with an emphasis on occlusion determination, in flow-chart form.

Now with reference to FIG. 7, another example arrangement is presented whereby physical and notional visual content may be integrated, again with reference to occlusion as an example. However, where the example method in FIG. 6 showed a general method, the example method in FIG. 7 provides an example of more particular approaches for certain steps within the method, and also addresses the method to use with a specific form of apparatus, namely an optically transparent head mounted display adapted for augmented reality output. It is emphasized that embodiments are not limited only to such an apparatus, and that other arrangements may be equally suitable.

In FIG. 7, a viewing position is established 720 for the head mounted display. In the example of FIG. 7, the viewing position typically corresponds to an anticipated position of a viewer's eye or eyes, e.g. his or her retina(s), relative to the head mounted display. For purposes of simplicity the method shown in FIG. 7 addresses only a single such viewing position. However, this is an example only, and other arrangements may be equally suitable. For example, an arrangement wherein two distinct viewing positions are considered having a stereo arrangement, with occlusion determined for each one and corresponding changes to visual content as delivered to each viewing position, may be suitable for at least certain embodiments. Such an arrangement may support the appearance of three dimensionality for visual content delivered to a viewer, and/or provide other advantages, but such a stereo arrangement is not required. Alternately, multiple non-stereo viewing positions may be utilized, for example one for an infrared depth camera and one for an RGB camera, or some other arrangement.

Typically though not necessarily, the viewing position is established 720 at least in preliminary form in advance, based on the configuration of the head mounted display and the anticipated position of the head mounted display relative to the viewer. For example, given a head mounted display in the form of a pair of glasses and adapted to be worn in similar fashion, viewing positions suited for delivering visual content to a wearer may be at least approximated.

However, also typically though not necessarily, the viewing position may be established 720 in part through adjustment and/or calibration of the head mounted display. For example, the physical configuration of the head mounted display may be adjusted based on the particulars of an individual wearer's anatomy, preferences, etc. (e.g. extending arms, adjusting a nose support, etc.). Other adjustments, including but not limited to optical adjustments such as altering the focus of the display(s), likewise may be suitable.

Step 720 does not necessarily include such manipulations (though such manipulations also are not necessarily excluded). Rather, establishing 720 the viewing position for the head mounted display addresses acquiring information as to where the desired viewing position is in space, and providing such information to a processor (e.g. a processor controlling determination of occlusion, output of visual content, etc. for the head mounted display) if such information is not inherently present (as may be the case if the processor itself calculates the viewing position using executable instructions instantiated thereon).

Continuing in FIG. 7, a physical visual model is established 722, the physical visual model typically representing at least a portion of the physical reality environment proximate the head mounted display. That is, the physical visual model represents the visual appearance of "the real world" in the region around the head mounted display. Such a model may be constructed for example through evaluating stereographic images, depth maps, etc. as may be acquired through cameras, depth cameras, and/or other sensors (e.g. sensors on or in the head mounted display). However, other arrangements may be equally suitable.

The physical visual model may be dynamic over time.

An augment visual model is established 724, the augment visual model representing an augmented reality environment, the augmented reality environment typically though not necessarily being proximate the head mounted display. An augmented reality environment typically provides information, emphasis, etc. relating to physical reality. For example, an augmented reality environment might include direction arrows overlaid onto a sidewalk indicating a path to some destination, blinking boxes around relevant street signs to draw attention thereto, a floating indicator displaying the time until the next bus arrives at some position, etc. An augmented reality typically is constructed within a processor, including but not limited to a processor in the head mounted display, using executable instructions instantiated thereon and/or data accessible thereto. As has been noted previously, an augment visual model (or another notional model) may in fact be the augmented reality content itself; that is, where a processor typically could not contain a physical reality environment, an augmented reality environment may be contained within a processor. Thus, establishing 724 the augment visual model may not imply creating such a model, but rather identifying a suitable model, accessing a model, etc.

The augment visual model also may be dynamic over time.

Still with reference to FIG. 7, the depth from the viewing position to the physical visual model is established 726A along a direction. Typically though not necessarily, the depth to the physical visual model may be measured and/or calculated from the physical visual model and the reference position. For example, if the reference position is known, and the geometry of the physical visual model with respect to the reference position is known, then the distance from the reference position to the physical visual model along any direction (and thus to any point in the physical visual model) may be determined through geometric analysis, e.g. as performed in a processor using executable instructions instantiated thereon. However, other arrangements may be equally suitable. For example, if the physical visual model is established 722 as a depth map (e.g. by utilizing a depth camera), then the depth to various points in the visual model may already be substantially or entirely known. (For certain embodiments a correction may be applied to account for the depth camera being disposed some distance and direction from the viewing position.) That is, the depth along one or more directions may already be part of the physical visual model, or even the basis for establishing 722 the physical visual model. Thus for at least certain embodiments the step of establishing 726A the depth to the physical visual model along a direction may be implicit in step 722 (and/or other steps), and may or may not be a completely distinct step. Nevertheless, so long as the depth to the physical model is in some manner established 726A, embodiments are not limited with regard to how such depth is established.

Again typically but not necessarily, the depth to the physical visual model may be established 726A along a plurality of directions. For example, depth might be established 726A in particular along directions at which physical content and augmented reality content begin or end a region of overlap. Alternately, a grid or other arrangement of many directions from the viewing position to the physical visual model may be used to determine depth thereto over areas or even the entirety of the physical visual model. Other also arrangements may be equally suitable.

Continuing in FIG. 7, the depth from the viewing position to the augment visual model along the direction(s) is established 726B. For arrangements wherein depth is so established 726B along only a single direction, the direction in step 726B may be at last substantially similar to the direction in step 726A.

However, in particular when many depths along many directions are established in steps 726A and/or 726B, a one-to-one correspondence between directions for steps 726A and 726B is not required (though such correspondence also is not prohibited). Depths may be established along some directions in step 726A but not along substantially similar or otherwise corresponding directions in step 726B, or vice versa.

In similar fashion as noted with regard to step 726A, the depths established in step 726B may be established through geometric analysis or other calculation with a processor (e.g. with executable instructions instantiated thereon), may be inherent in the augment visual model as established in step 724, or may be established in some other fashion.

Continuing in FIG. 7, a determination is made 726C as to whether the depth to the physical visual model (which may be referred to as the physical depth) is less than the depth to the augmented visual model (which may be referred to as the augment depth) along substantially similar direction(s) as established in steps 726A and 726B. This may be carried out for example through scalar comparison of the depths established in steps 726A and 726B, e.g. in a processor with executable instructions instantiated thereon. However, other arrangements may be equally suitable.

If the determination in step 726C is positive—if the physical depth is less than the augment depth—then the method continues to step 726D (below). If the determination in step 726C is negative—if the physical depth is not less than the augment depth—then the method skips step 726D and continues with step 728.

Continuing in FIG. 7, the augment visual model is indicated 728D as being occluded by the physical visual model along the direction in question. Typically, though not necessarily, multiple such directions will be evaluated, thus producing a "map" of what portion(s) of the augment visual model are to be indicated 728D as occluded. However, other arrangements, including but not limited to indicating 728D as occluded entire regions and/or features of the augment visual model, entities within the augment visual model, or even the entirety of the augment visual model, etc. on the basis of a single direction wherein the determination in step 726C is that the physical depth is less than the augment depth.

Indication may vary considerably between embodiments. One example arrangement for indication might be to apply a digital "tag" to pixels, entire entities, etc. indicating a state of occlusion, so that output of such tagged pixels, entities, etc. may be excluded. Another example arrangement might be to define a geometric region of the augment visual model and similarly apply a tag to that region, tagged regions likewise being excluded from output. However, these are examples only, and other arrangements may be equally suitable.

Steps 726A, 726B, 726C, and 726D may be considered collectively as being at least somewhat comparable to step 626 in FIG. 6 wherein occlusion of a notional model by a physical model is determined.

Again with reference to FIG. 7, augment visual content is generated 728, using as source material the augment visual model and the occlusion indications. Thus, at least a portion of the augment visual model is configured as data suitable for visual output, with those portions indicated for occlusion (e.g. tagged) as in step 726D being excluded from visual output. Typically, though not necessarily, the augment visual content may be two-dimensional so as to be adapted for output using a two-dimensional display (even though the augment visual model and/or the indication(s) of occlusion may be three-dimensional or of some other form).

Also typically though not necessarily, the augment visual content may be generated within a processor, such as one having suitable executable instructions instantiated thereon. For example, a graphical engine might render a frame (or series of frames) showing the contents of the augment visual model in visible form as would be seen from the viewing position and bounded within some field of view. However, other arrangements may be equally suitable.

As previously noted, the example method of FIG. 7 is presented as specific to use with an optically transparent head mounted display. Thus, for the particular example of FIG. 7 physical visual content may be considered to pass through the display to the viewing position without an active step in the example method. This passive optical transmission may be in some sense analogous to step 630 in FIG. 6, though as noted the method does not require action.

Continuing in FIG. 7, the augment visual content is outputted 732 to the viewing position with the head mounted display. For example, for a head mounted display utilizing one or more LED screens, the augment visual content may be displayed as an arrangement of pixels forming a visible image. To continue the example presented with regard to step 728, such a visible image may depict the contents of the augment visual model as seen from the viewing position and bounded within a field of view (e.g. a field of view substantially corresponding with the edges of the LED screen). However, this is an example only, and other arrangements may be equally suitable.

Although FIG. 7 shows the method therein as being complete following step 732, other steps, other functions, etc. may be incorporated into the method, and/or other methods may be executed in combination with the method. For example, as noted with regard to FIG. 6 for at least certain embodiments at least some portion of the method may repeat. Each repetition may yield a new still image displayed on the head mounted display, so that the visual augment content as visible to a viewer may be dynamic in time. A sufficiently rapid rate of update may for example produce the appearance of continuous change and motion in the visual augment content, presenting at least the impression of a smoothly variable, interactive, responsive visual experience for the viewer.

Figure 8:
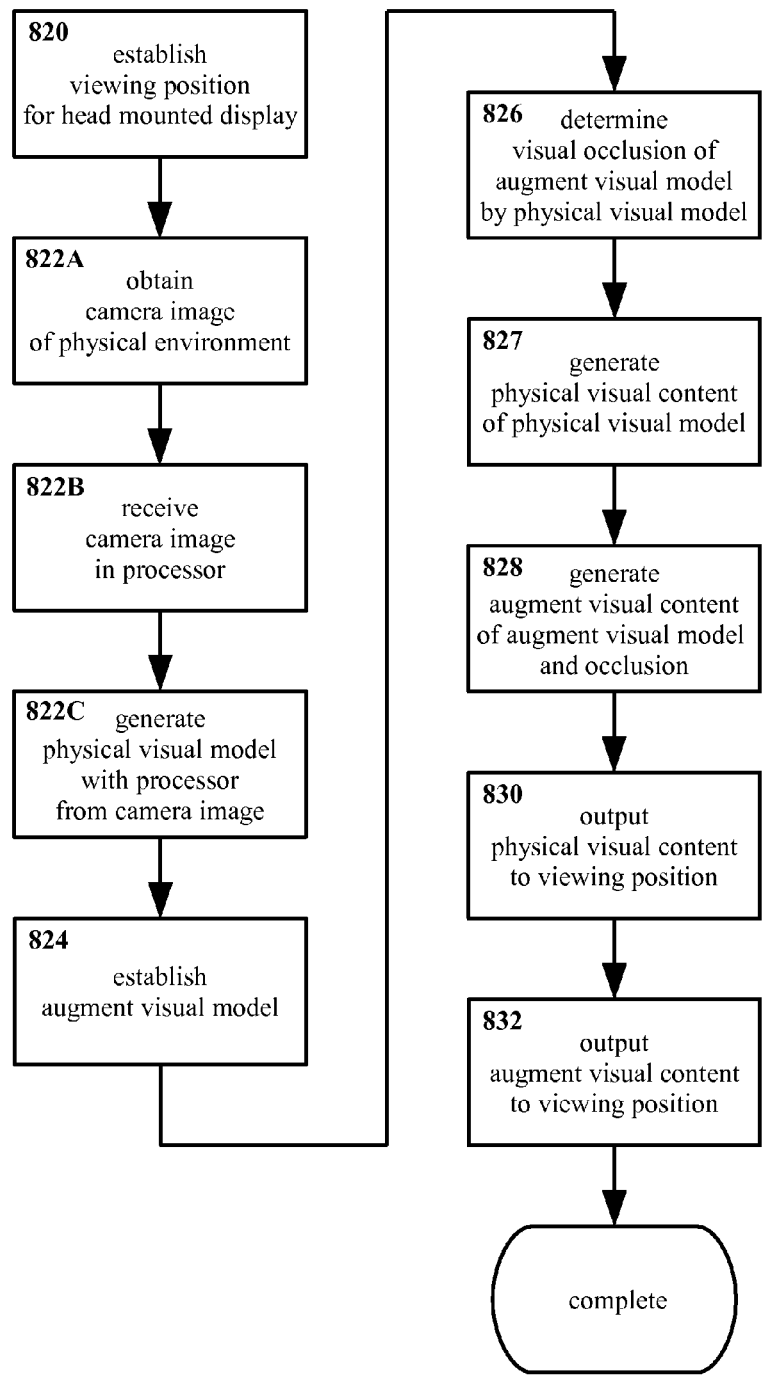
FIG. 8 shows another example method for integrating occlusion from a physical data model to a notional data model with an emphasis on establishing the physical model, in flow-chart form.

Now with reference to FIG. 8, another example arrangement is presented whereby physical and notional visual content may be integrated, again with reference to occlusion as an example. The example method in FIG. 8 provides an example at least somewhat similar to that of FIG. 6 but again having more particular approaches for certain steps within the method, and also addresses the method to use with a specific form of apparatus, namely a virtually transparent head mounted display adapted for augmented reality output.

In FIG. 8, a viewing position is established 820 for the head mounted display. As noted with regard to FIG. 7, for the example embodiment of FIG. 8 the viewing position typically corresponds to an anticipated position of a viewer's eye or eyes, e.g. his or her retina(s), relative to the head mounted display. Establishing a viewing position, and certain features and options with regard thereto, were previously described with respect to FIG. 7.

Continuing in FIG. 8, at least one camera image is obtained 822A, the camera image depicting at least a portion of a physical environment. Such images may be obtained for example from one or more cameras disposed on the head mounted display, such that the field of view of the cameras at least substantially aligns with the field of view of the viewer. Typically the images will in some fashion include information regarding depth to the physical environment. For example, two cameras disposed in a stereo arrangement on the head mounted display may support obtaining stereo pairs of images, which together may incorporate three dimensional data therein (even if the images themselves are two dimensional). Alternately, a depth camera may capture both an image and depth data within the image. These are examples only, and other arrangements also may be equally suitable.

The camera image is received 822B in a processor. Typically though not necessarily this processor will be disposed on the head mounted display. However, other arrangements including but not limited to external cameras or some combination of cameras on the head mounted display and elsewhere may be equally suitable. Embodiments are not limited with regard to how the images are received in the processor; wireless communication, direct wired connection, or some other route may be equally suitable.

A physical visual model is generated 822C with the processor from the camera images and/or data therein. The physical visual model typically represents at least a portion of the physical reality environment proximate the head mounted display. That is, the physical visual model represents the visual appearance of "the real world" in the region around the head mounted display. However, other arrangements, including but not limited to physical visual models that represent distant physical environments, or physical visual models generated from images stored at a previous time, may be equally suitable.

The physical visual model may be generated 822C from the camera images for example through stereographic analysis of stereo image pairs, through considering depth data from a depth camera image to construct a three dimensional model, etc. Other arrangements also may be equally suitable.

The physical visual model may be generated 822C so as to be dynamic in time. For example, the model may be generated 822C such that if and when new camera images are received, the physical visual model is modified or replaced so as to reflect the new state of the physical environment as reflected by the new camera images.

Steps 822A, 822B, and 822C may be considered collectively as being at least somewhat comparable to step 622 in FIG. 6 wherein a physical depth model is established.

Proceeding in FIG. 8, an augment visual model is established 824, the augment visual model representing an augmented reality environment that is typically though not necessarily proximate the head mounted display. The augment visual model may be dynamic over time. An augment visual model has been previously described herein with regard to FIG. 7.

A determination is made 826 of the visual occlusion (if any) of the augment visual model by the physical visual model. That is, for example based on the geometry, arrangement, etc. of the physical data model and augment data model, it is determined whether and to what degree some or all of the augment visual model is behind (i.e. visually obstructed by) some or all of the physical visual model. Portions of the augment visual model that are occluded by the physical visual model may be identified in some fashion, or the occlusion may be otherwise noted for further consideration in subsequent steps.

Still with reference to FIG. 8, physical visual content is generated 727, using as source material the physical visual model. Typically, though not necessarily, the physical visual content may be two-dimensional so as to be adapted for output using a two-dimensional display (even though the physical visual model may be three-dimensional or of some other form).

Also typically though not necessarily, the physical visual content may be generated within a processor, such as one having suitable executable instructions instantiated thereon. For example, a graphical engine might render a frame (or series of frames) showing the contents of the physical visual model in visible form as would be seen from the viewing position and bounded within some field of view. However, other arrangements may be equally suitable.

Augment visual content also is generated 828, using as source material the augment visual model and the occlusion. Thus, at least a portion of the augment visual model is configured as data suitable for visual output, with occlusions of the augment visual model being excluded from visual output.

Physical visual content is outputted 830 to the viewing position. For example, for a head mounted display utilizing one or more LED screens, the physical visual content may be displayed as an arrangement of pixels forming a visible image. Such a visible image may depict the contents of the physical visual model as seen from the viewing position and bounded within a field of view (e.g. a field of view substantially corresponding with the edges of the LED screen). However, this is an example only, and other arrangements may be equally suitable.

As previously noted, the example method of FIG. 8 is presented as specific to use with a virtually (rather than an optically) transparent head mounted display. Thus, for the particular example of FIG. 8 the display may not be optically transparent and indeed may be entirely opaque, but physical visual content is outputted thereto in a manner at least substantially corresponding to how physical visual content may be arranged if the head mounted display were optically transparent. More colloquially, the head mounted display actively outputs physical visual content so as to provide the visual appearance of being optical transparent. This is distinct from the arrangement in FIG. 7, wherein output of physical visual content was passive, relying on the optical transparency of the head mounted display.

The augment visual content also is outputted 832 to the viewing position with the head mounted display. As with step 830, for a head mounted display utilizing one or more LED screens, the augment visual content may be displayed as an arrangement of pixels forming a visible image. Such a visible image may depict the contents of the augment visual model as seen from the viewing position and bounded within a field of view (e.g. a field of view substantially corresponding with the edges of the LED screen). However, this is an example only, and other arrangements may be equally suitable.

Although FIG. 8 shows the method therein as being complete following step 832, other steps, other functions, etc. may be incorporated into the method, and/or other methods may be executed in combination with the method. For example, as noted with regard to FIG. 6 and FIG. 7 for at least certain embodiments at least some portion of the method may repeat. With such an arrangement, each repetition may yield a new still image displayed on the head mounted display, so that the physical augment content and/or visual augment content as visible to a viewer may be dynamic in time. A sufficiently rapid rate of update may produce the appearance of continuous change and motion in the physical and/or visual augment content, presenting at least the impression of a smoothly variable, interactive, responsive visual experience for the viewer.

At this point, some additional comments regarding certain features of various embodiments may be illuminating. As noted, certain examples described and illustrated thus far have focused on occlusion as an example feature to be supported through integrating physical and notional content. Although individual features have been explained thus far, a more complete understanding may benefit from consideration of overall functionality.

According to various embodiments some property of two different forms of content is integrated across the two forms of content. In certain examples presented thus far herein, the property in question is occlusion, the tendency of one object or feature to be "in the way" of another object or feature, so as to obscure some or all of more distant features. Similarly, in certain examples presented thus far herein, one form of content is notional (virtual reality, augmented reality, etc.) while the other form of content is physical ("real world" objects and features).

As has been described, properties of one data model do not necessarily apply to another data model. By default, an augmented reality object displayed on a head mounted display may appear overlaid onto (e.g. projected over) a physical object even if the augmented reality object is nominally more distant than the physical object (for example due to the manner by which the notional object is displayed); that is, the more distant augmented reality object will not be occluded by the physical object. This may be the case even though a distant physical object may be occluded by a closer physical object, and/or a distant augmented reality object may be occluded by a closer augmented reality object. Occlusion of distant objects by near objects applies within both the augmented reality and physical models, but does not necessarily apply between the two models.

By contrast, according to various embodiments occlusion (or some other property) is made to apply consistently between the two models, such that any entity in one model may (if desired) be made to occlude any entity in the other model. Occlusion thus may be said to be integrated as a property across the two data models.

It may be worth drawing a distinction between certain embodiments and an approach that might be considered as in some manner superficially similar: so-called "green screen" imaging.

In green screen imaging, a single narrow band of color (typically green or blue) is defined as identified within an image and replaced with other content. Considering as an example a weather forecaster standing in front of a green screen, the green may be selectively identified by color and replaced with a satellite image showing weather over an area. The visual effect is that the weather forecaster remains visible in the foreground, blocking a portion of the satellite image behind him or her. It might be argued that this in some sense constitutes integration, in that the weather forecaster—a close physical entity—blocks sight to a portion of a projected satellite image (which might be compared, though perhaps not correctly, to a notional entity). However, the approach and functionality of green screen differs from that of various embodiments.

First, green screen does not distinguish based on distance, and in fact makes no consideration of distance. In various embodiments, occlusion of distant notional entities by close physical entities is brought about. By contrast, the effect in a green screen is not produced because the weather forecaster (to continue the example above) is in front of the screen, but because the weather forecaster is a different color than the screen. Distance is of no consequence; if the forecaster were to wear a jacket of the proper shade of green, the area of the jacket in images would be replaced with the satellite image just as the green screen is, even though the green screen is more distant than the forecaster and the jacket is not.

That is, green screen considers color, not on distance, and distance is not a factor. Green screen thus does not integrate occlusion between data models, since occlusion depends at least in part on distance. Also, green screen is thus limited only to considering objects in a very narrow color range, where embodiments are not necessarily color limited. (In principle an embodiment might be made that, for whatever reason, only considers entities of a certain color for purposes of determining occlusion, but this is not required.)

Second, as may be implicit in the first point, green screen depends on having a physical object representing the region onto which an image is projected, and in front of which some foreground entity may be left visible. The "screen" in green screen is a physical requirement, necessary for the green screen visual effect; a physical object (specifically, a physical object in the proper shade of green) must be directly associated with any viewed image. The viewed image in a green screen system thus is not necessarily even similar to a notional entity; a notional entity may have no physical substance, and need not be represented by a physical object.

As a result of the features noted in the first and second points above, green screen typically is limited to being a studio effect. Green screen is poorly suited for "free range" applications, such as those associated with head mounted displays and other portable devices, since in general environments may not be relied upon to have suitable physical objects in suitable shades of green present when and where necessary.

Also, as may be understood from the first and second points above, green screen relies on physical occlusion of one physical object by another, namely, the forecaster occluding the green screen. In practice green screen occlusion is not integrated across a physical data model and a notional model.

Third, green screen does not support change in apparent relative distance. That is, the weather forecaster must always appear in front of the satellite image. A change in position cannot put the forecaster midway through the satellite image, with (say) only one arm extending through the satellite image. A change in position likewise cannot enable the forecaster to pass through the satellite image. Objects in front of a green screen are fully in front of the screen, or fully behind the screen; while in principle multiple green screens could be arranged so that some such are in front of a target object and others behind the target object, each such green screen is itself fully in front of or fully behind the target object.

This behavior of green screens is at least in part due the fact that the green screen is required to be a physical object, physically present, as noted above. A forecaster cannot walk through a satellite image because he or she could not walk through the required physical green screen.

This is entirely different from various embodiments described herein. In various embodiments, a physical entity may pass through a notional entity or vice versa, and a physical entity may extend partway out of a notional entity or vice versa. Thus, what is occluded and what is not occluded varies, based on the distances as those distances change.

In sum, embodiments provide functionality not present in green screen, and operates in a different manner and along different principles.

As a further comment, it is pointed out that where green screen is limited only to supporting some limited visual effects that may superficially resemble (but does not equate to) integrated occlusion between notional and physical data models, embodiments are not limited only to integrating occlusion among data models.

Rather, embodiments may enable substantially any sensory property to be integrated among data models.

Figure 9:
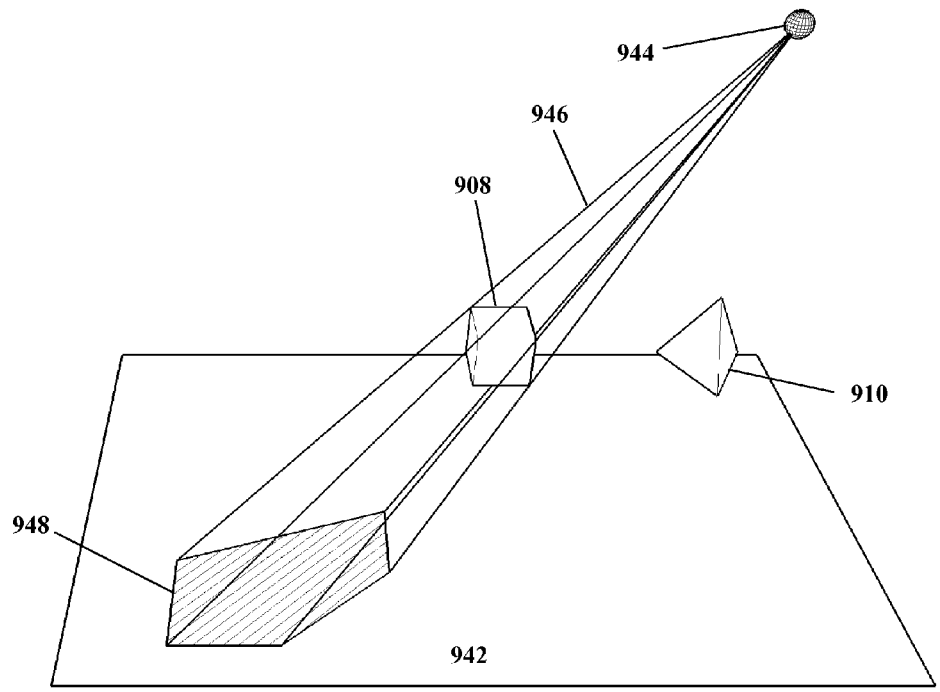
FIG. 9 shows an example arrangement of physical and notional entities and shadows thereof from a notional light source.

Now with reference to FIG. 9, therein and in certain subsequent figures another example of a property integrated among notional and physical data models is provided therein. More particularly, beginning in FIG. 9 the property of shadowing from light sources is shown to be integrated among notional and physical entities and light sources.

In FIG. 9, a physical entity 908 is shown therein represented by a cube, and a notional entity 910 represented by a tetrahedron. A flat plane 942 of limited dimension is shown for purposes of illustrating projected shadows, though this is a convenience done for clarity and other arrangements may be equally suitable.

Also in FIG. 9, a physical light source 944 is shown therein represented by a wireframe sphere. The physical light source 944 may be substantially any "real life" object or feature that emits light, such as an LED, incandescent bulb, etc. In addition, a shadow 948 is cast by the physical entity 908 from the physical light source 944. Radial lines 946 extending outward from the physical light source 944 past the vertices of the physical entity 908 indicate the shape of the shadow 948; the radial lines 946 are visual guides only, and are not necessarily present.

The shadow 948 in FIG. 9 may be referred to herein more specifically as a physical-physical shadow 948, wherein the use of the word "physical" before the dash references a physical light source 944, and the use of the word "physical" after the dash references a physical entity 908. Thus, the physical-physical shadow 948 in FIG. 9 is the product of a physical light source and a physical entity.

As may also be observed from FIG. 9, no shadow is shown to be cast by the notional entity 910 from the physical light source 944.

Figure 10:
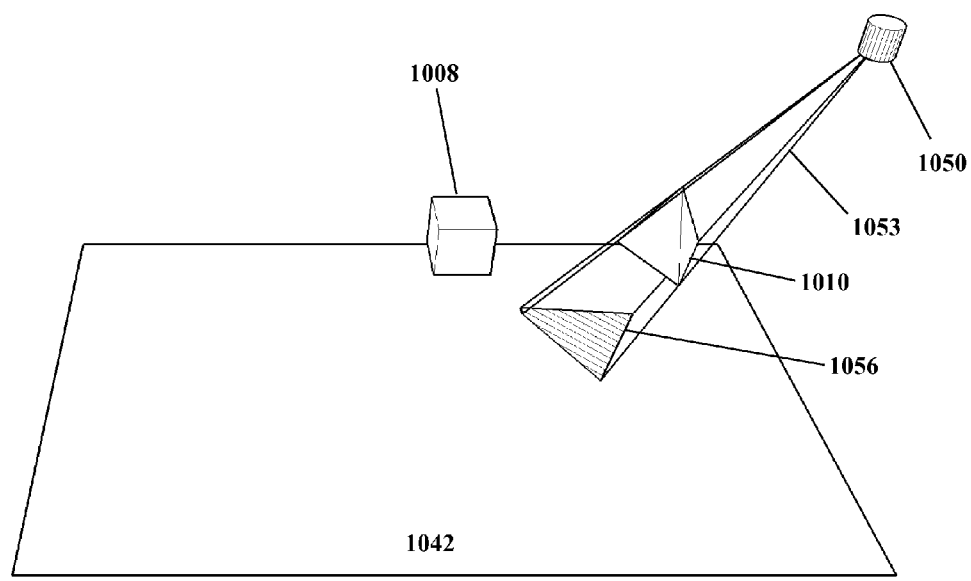
FIG. 10 shows an example arrangement of physical and notional entities and shadows thereof from a notional light source.

Turning now to FIG. 10, a physical entity 1008 is shown therein represented by a cube, and a notional entity 1010 represented by a tetrahedron. A notional light source 1050 is shown therein represented by a wireframe cylinder. The notional light source 1050 may be any notional construct that emits light, or that behaves for purposes of other notional entities as though emitting light. For example, notional light sources may include but are not limited to a virtual or augmented reality sun, moon, torch, lamp, etc. In addition, a shadow 1056 is cast by the notional entity 1010 from the notional light source 1050, as visible on the plane 1042. Radial lines 1053 extending outward from the notional light source 1050 past the vertices of the notional entity 1010 indicate the shape of the shadow 1056; as noted with regard to FIG. 9, the radial lines 1053 in FIG. 10 also are visual guides only, and are not necessarily present.

The shadow 1056 in FIG. 10 may be referred to herein more specifically as a notional-notional shadow 1056, wherein the use of the word "notional" before the dash references a notional light source 1050, and the use of the word "notional" after the dash references a notional entity 1010. Thus, the notional-notional shadow 1056 in FIG. 10 is the product of a notional light source and a notional entity.

As may again be observed from FIG. 10, no shadow is shown to be cast by the physical entity 1008 from the notional light source 1050.

Figure 11:
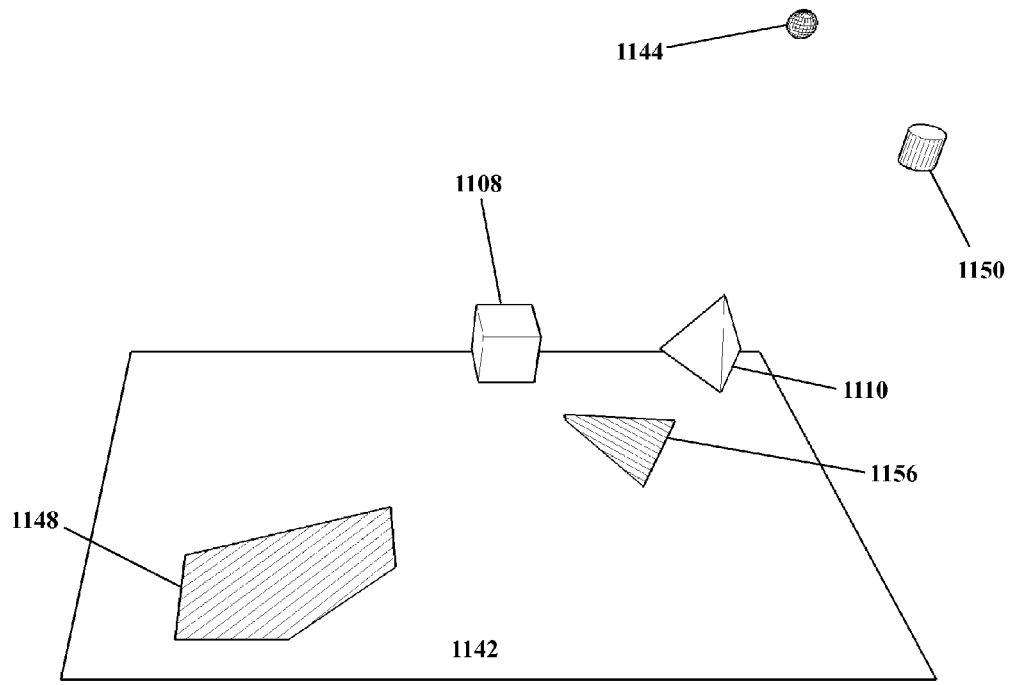
FIG. 11 shows an example arrangement of physical and notional entities and shadows thereof from physical and notional light sources.

Now with reference to FIG. 11, a physical entity 1108 is shown therein represented by a cube, and a notional entity 1110 represented by a tetrahedron. A physical light source 1144 is shown represented by a wireframe sphere, and a notional light source 1150 represented by a wireframe cylinder. As may be observed, a physical-physical shadow 1148 is cast by the physical entity 1108 from the physical light source 1144 as visible on the plane 1142, and a notional-notional shadow 1156 is cast by the notional entity 1110 from the notional light source 1150 as visible on the plane 1142.

As may also be observed, no shadow is shown cast by the physical entity 1108 from the notional light source 1150, nor a shadow cast by the notional entity 1110 from the physical light source 1144.

To summarize with respect to FIG. 9 through FIG. 11, it may be observed that a physical light source may cast a shadow from a physical object, and a notional light source may cast a shadow from a notional object. However, in the examples of FIG. 9 through FIG. 11 a physical light source does not cast a shadow from a notional object, nor a notional light source from a physical object. As a more concrete example, a real-world lamp may not cast shadows from virtual reality objects depicted on a head mounted display, and likewise a virtual reality light source as depicted by a head mounted display may not cast shadows from physical objects.

This may be understood in that shadowing in a physical environment is an automatic physical process, a result of the natural behavior of light. However, where no physical object is present (e.g. for the case of a notional object), physical shadowing may not occur. Conversely, shadowing in a notional environment typically is a computationally determined process, with shadows produced based on constructed algorithms that apply only within the notional environment. Thus, shadowing from objects not part of the notional environment (e.g. a physical object) also may not occur.

Even though both the physical and notional content both exhibit shadowing from light sources, the two data models are not integrated with regard to the property of shadowing.

However, in various embodiments a sensory property such as a visual feature effect may be found present in one such data model, and a second analogous sensory property determined for the other data model, that second sensory property then being outputted to a viewer e.g. by applying the second sensory property to the notional sensory content to be outputted therewith.

More concretely with regard to the examples of FIG. 9 through FIG. 11, although typically (without integration through various embodiments) physical light sources generate shadows only from physical objects, and notional light sources generate shadows only from notional objects, shadowing may be integrated between the two data models.

Figure 12:
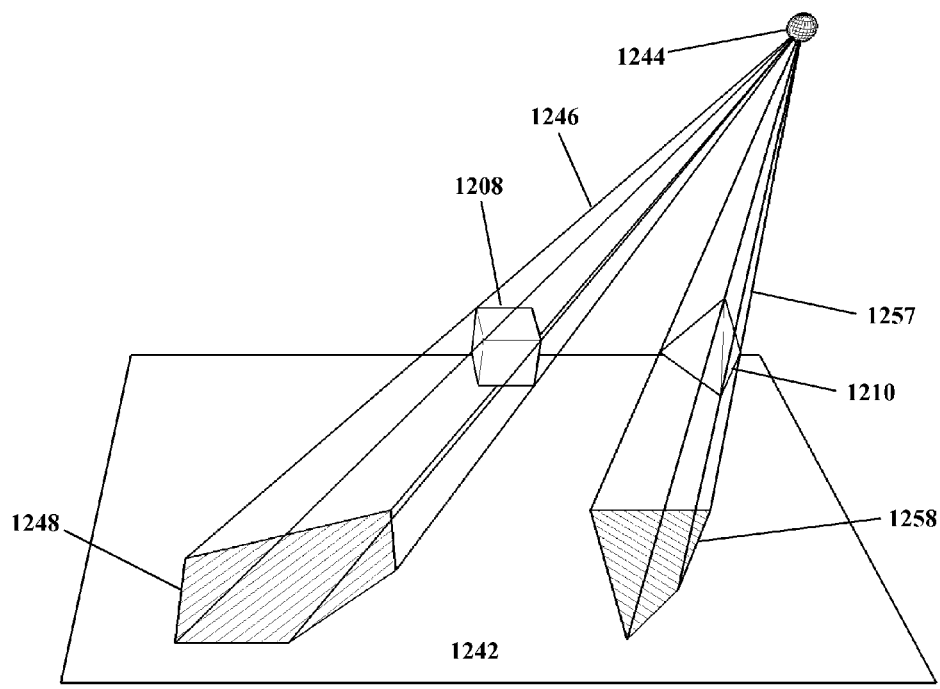
FIG. 12 shows an example arrangement of physical and notional entities, a physical light source, a physical-physical shadow and a physical-notional shadow.

Now with reference to FIG. 12, an example arrangement of integrating shadowing between physical and notional data models according to various embodiments is shown therein.

In FIG. 12, a physical entity 1208 is shown therein represented by a cube, and a notional entity 1210 represented by a tetrahedron. A physical light source 1244 is shown represented by a wireframe sphere. A physical-physical shadow 1248 is cast by the physical entity 1208 from the physical light source 1244 as visible on the plane 1242, with radial lines 1246 marking the vertices thereof.

In addition, as may be observed a physical-notional shadow 1258 is also cast by the notional entity 1210 from the physical light source 1244 as visible on the plane 1242, with radial lines 1257 marking the vertices thereof.

The arrangement in FIG. 12 shows an arrangement as may be viewed through the use of various embodiments. A description of how such results may be implemented is presented subsequently herein; initially, with regard to FIG. 12 (and likewise FIG. 13 and FIG. 14) an appearance of an example embodiment is presented, for purposes of clarity.

Figure 13:
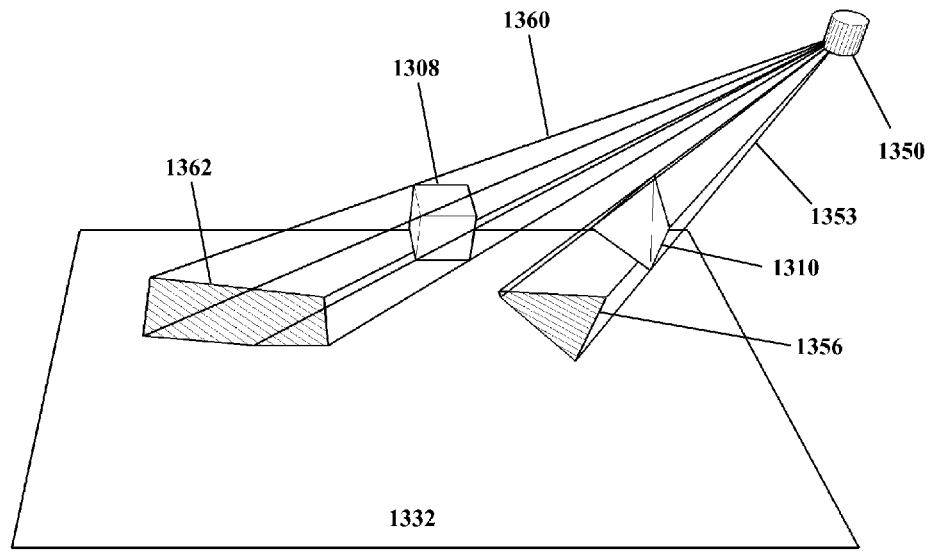
FIG. 13 shows an example arrangement of physical and notional entities, a notional light source, a notional-physical shadow and a notional-notional shadow.

In FIG. 13, a physical entity 1308 is shown therein represented by a cube, and a notional entity 1310 represented by a tetrahedron. A notional light source 1350 is shown represented by a wireframe cylinder. A notional-notional shadow 1356 is cast by the notional entity 1310 from the notional light source 1350 as visible on the plane 1342, with radial lines 1353 marking the vertices thereof.

In addition, as may be observed a notional-physical shadow 1362 is also cast by the physical entity 1308 from the notional light source 1350 as visible on the plane 1342, with radial lines 13607 marking the vertices thereof.

Figure 14:
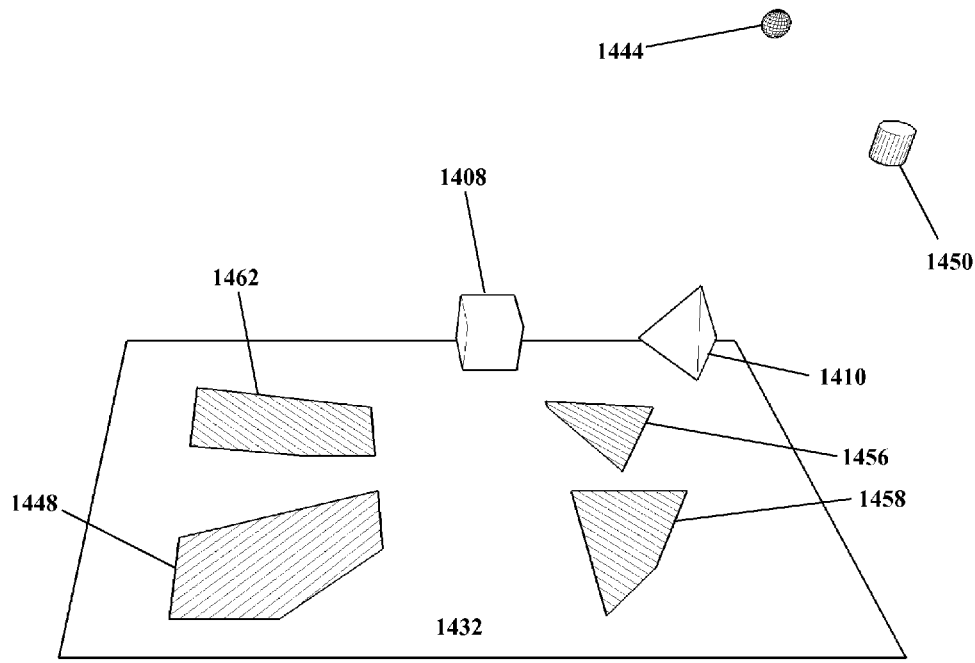
FIG. 14 shows an example arrangement of physical and notional entities, physical and notional light sources, and physical-physical, physical-notional, notional-physical, and notional-notional shadows.

Turning to FIG. 14, a physical entity 1408 is shown therein represented by a cube, and a notional entity 1410 represented by a tetrahedron. A physical light source 1444 is shown represented by a wireframe sphere, and a notional light source 1450 represented by a wireframe cylinder.

A physical-physical shadow 1448 is cast by the physical entity 4108 from the physical light source 1444 as visible on the plane 1442. A physical-notional shadow 1458 is cast by the notional entity from the physical light source 1444 as visible on the plane 1442. A notional-notional shadow 1456 is cast by the notional entity 1410 from the notional light source 1450 as visible on the plane 1442. A notional-physical shadow 1462 is cast by the physical entity 1408 from the notional light source 1450 as visible on the plane 1442.

Thus, as is visible in the example of FIG. 14, insofar as a person viewing the combined physical and notional visual content is concerned, shadows appear from both physical and notional entities illuminated by physical light sources, and shadows also appear from both physical and notional entities illuminated by notional light sources. With regard to the property of shadowing, the physical and notional visual content thus is integrated.

For purposes of explanation, terminology in certain previous examples has referred to a notional or a physical light source, and a notional or a physical entity. Thus, a notional-physical shadow would be one cast by a physical entity from a notional light source (the term being of the form "light-object"). However, a further possibility also may be considered, namely whether the surface onto which a shadow is cast likewise is either physical or notional. Given a notional surface, even the combination of a physical light source and a physical object may not inherently result in a projected shadow without active integration. More colloquially, a real light and a real object still will not automatically produce a shadow on a virtual object.

Typically, though not necessarily, a shadow cast on a notional surface may be a notional entity regardless of whether the light and/or the shadowing entity are themselves physical or notional. That is, the notional surface "isn't there" for a shadow to be generated thereon by a physical light source and/or a physical entity.

Thus although in certain instances entities are referred to herein with two terms, e.g. "notional-physical" for a shadow cast by a physical entity from a notional light source, a broader approach may be to refer to entities with three terms, e.g. "notional-physical-notional" (of the order "light-object-surface" for a shadow cast by a physical entity from a notional light source onto a notional surface.

Given such an arrangement, a total of eight different classes of shadow may be considered, abbreviated PPP, PPN, PNP, PNN, NPP, NPN, NNP, and NNN. PPP shadows—produced by physical lights, entities, and surfaces—occur naturally due to the physics of light. NNN shadows—produced by notional lights, entities, and surfaces—occur entirely within notional environments, e.g. being determined computationally within and as part of a virtual reality. For the remaining six classes, shadows are applied through integration according to various embodiments. However, for those six classes—PPN, PNP, PNN, NPP, NPN, and NNP—shadows typically are themselves notional entities (as is a shadow for NNN, though in the case of NNN this may be less notable because all of the entities are notional). More colloquially, shadows must be "artificial", such as virtual or augmented reality objects, because physical lights, objects, and surfaces may not naturally exhibit shadows when combined with virtual/augment lights, objects, and surfaces. It is through integration according to various embodiments that such shadows are provided.

More regarding a specific example of such notional shadowing, and with consideration of a virtual surface, is said later herein beginning with FIG. 23.

Figure 15:
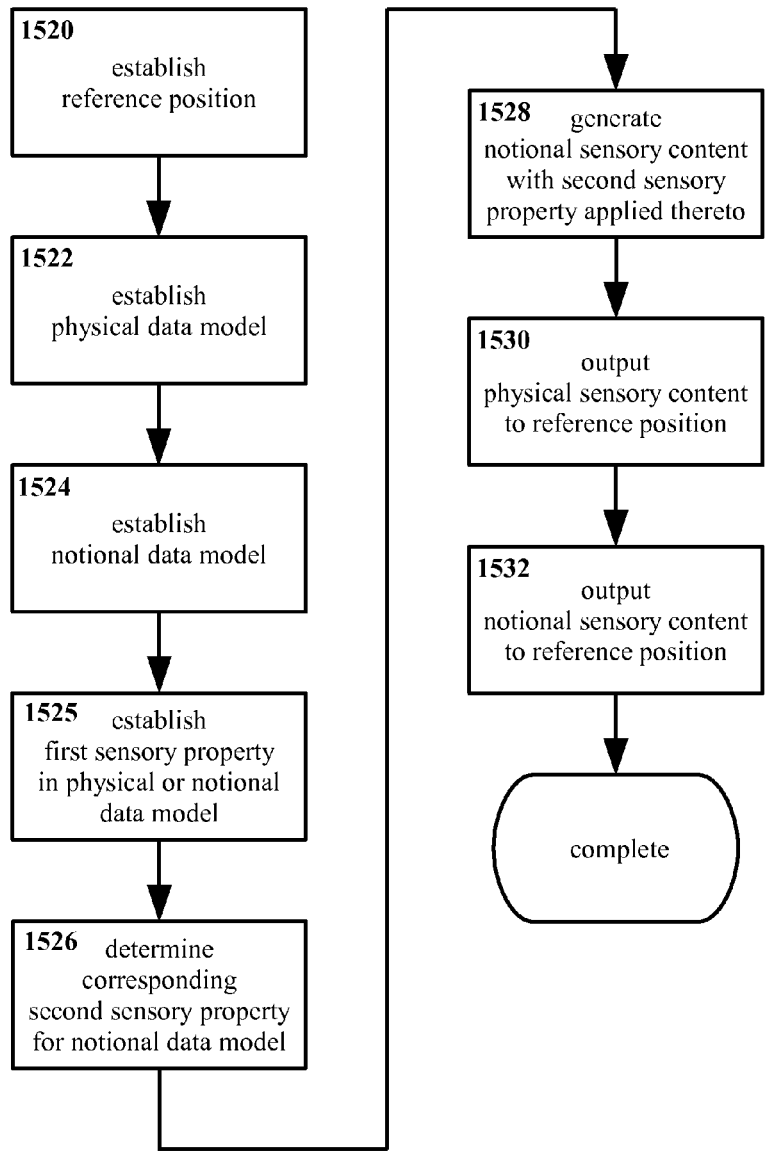
FIG. 15 shows an example method for integrating a general sensory property among a physical data model and a notional data model, in flow-chart form.

Moving on, with reference to FIG. 15, therein is shown an example method wherein physical and notional sensory content may be integrated. The example in FIG. 15 is not specific to any particular property, nor to any particular sensory content, and embodiments likewise are not limited with regard to property or sensory content. However, it is noted that the method shown in FIG. 15 bears at least some similarity to the method shown in FIG. 6, wherein a property of occlusion for visual content is considered; likewise, FIG. 16 (described subsequently) presents a method wherein a property of shadowing for visual content also is considered. Occlusion and shadowing are examples of properties, and visual content is an example of sensory content, but embodiments are not limited only thereto.

In FIG. 15, a reference position is established 1520. The reference position serves as a positional baseline with regard to integrating sensory content for certain embodiments. For example, for purposes of visual content, the reference position may be a viewing position (e.g. possibly corresponding with a known or anticipated position of a person's eye), while for auditory content the reference position may be a listening position (e.g. possibly corresponding with a known or anticipated position of a person's ear), etc.

A physical data model is established 1522. The physical data model is an assembly of data that describes at least one parameter of at least one physical entity. Typically the physical data model addresses to at least some degree factors that may affect the sensory content and/or property under consideration. That is, for visual content, the physical data model may include and/or represent visual information regarding physical entities. Likewise, shadowing as a property the physical data model may include and/or represent information regarding sources of illumination, the position and size of physical entities, the degree of transparency (if any) of physical entities, etc.

Continuing in FIG. 15, a notional data model is established 1524. The notional data model is an assembly of data that describes at least one parameter of at least one notional entity. As with the physical data model, typically the notional data model addresses to at least some degree factors that may affect the sensory content and/or property under consideration.

The physical and/or notional data models may be dynamic in time.

A first sensory property is established 1525 in the physical data model or the notional data model. Embodiments are not limited with regard to the sensory property, and substantially any effect, phenomenon, behavior, etc. that may be sensed may be suitable. Previously with regard to FIG. 1 through FIG. 8, occlusion has been described herein as an example property. However, many other properties may be established as the first sensory property.

For example, as described with regard to FIG. 9 through FIG. 14 herein, shadowing may serve as a first sensory property. Similarly, other properties such as illumination may serve as a first property. (With comparison to FIG. 9 through FIG. 14, just as typically a physical light source may not naturally produce an appearance of shadowing for a notional object and a notional light source may not produce an appearance of shadowing for a physical object, likewise a physical light source naturally may not produce an appearance of illumination upon a notional object and a notional light source may not produce an appearance of illumination upon a physical object.)

Suitable properties may include, but are not limited to, optical properties such as diffraction, diffusion, focus (e.g. being "out of focus"), "glory", haloing, lens flare, and reflection.

Suitable properties may also be volumetric in nature, affecting a region of space (whether physical or notional space) rather than a more concrete entity such as an object. For example, the presence of smoke within a volume of the physical or notional environment (and represented within the physical or notional model) may be suitable as a first sensory property. With regard particularly to smoke, such a property may represent a reduction of visual detail, a decrease in color saturation and/or an overlay of gray, decreased illumination, etc. Indeed, such more abstract notions—e.g. reduction of visual detail—may themselves serve as first sensory properties, without necessarily correlating directly with any concrete phenomenon. Some, though not necessarily all, volumetric properties may be spatially varying, e.g. having an effect that is a function of the distance from the reference point (for example, the effects of fog on visibility tend to become more pronounced at greater distances).

Other suitable volumetric properties may include, but are not limited to, ash, debris, dust, fog, gas, hail, heat distortion, insects, leaves, mist, rain, sleet, snow, spray, and steam. Volumetric properties may take the form of falling, flying, and/or suspended elements, but also (as noted above) may be abstractions without any concrete substance.

It is emphasized that the first sensory property may be established 1525 from, and/or present in, either the physical data model (and typically though not necessarily the physical environment) or the notional data model (and typically though not necessarily the notional environment).

In addition, it is noted that if a first sensory property is pre-determined, step 1525 may be implicit, rather than necessarily being performed as an active part of a method. For example, for an embodiments wherein a single, specific property is to be addressed—such as occlusion in FIG. 6 through FIG. 8—that property may be considered to be established without specifically referencing such a step.

Moving on in FIG. 15, a second sensory property is determined 1526 for the notional model, the second visual effect at least substantially corresponding with the first sensory property. That is, if the first sensory property is shadowing (whether in the physical data model or notional data model), the second sensory property at least substantially corresponds to shadowing as well.

Continuing to consider shadowing as an example, and to describe the relationship in more concrete terms, if the first sensory property is shadowing of physical objects from physical light sources, then the second sensory property may represent shadowing of notional objects from physical light sources. The first sensory property (physical-physical shadowing) already exists, in this example within the physical data model (typically as a representation of shadowing within the physical environment); the second sensory property (physical-notional shadowing) is then determined 1526 so as to substantially correspond to the first sensory property, e.g. so as to present the appearance of shadows for notional objects from physical light sources that are similar or even identical to shadows for physical objects from physical light sources.

Possibly, though not necessarily, the method shown in FIG. 15 and/or certain steps thereof, including but not limited to step 1526, may be performed multiple times, determining 1526 corresponding second sensory properties for several different first sensory properties. One example of such an arrangement is a "two way" correspondence: physical-notional shadows may be generated that correspond with physical-physical shadows, and notional-physical shadows likewise may be generated that correspond with notional-notional shadows. This result of such an arrangement may be similar to that shown in FIG. 14, with both notional-physical shadow 1462 visible therein (e.g. as if being determined to correspond with notional-notional shadow 1456 such that both shadows 1456 and 1462 appear to cast from notional light source 1450) and physical-notional shadow 1458 visible therein (e.g. as if being determined to correspond with physical-physical shadow 1448 such that both shadows 1448 and 1458 appear to be cast from physical light source 1444). Thus, a property—in this example, shadowing—may be integrated in both directions between two data models.

However, certain embodiments may integrate only one first property in one "direction". With reference to occlusion as shown in FIG. 1 through FIG. 5B, a second property of occlusion for the notional data model is determined as corresponding with occlusion in the physical data model, but not the other way around.

More colloquially, notional objects are made to appear occluded by physical objects, but no particular effort is made to occlude physical objects appear occluded by notional objects. As may be understood, for at least certain circumstances such as the use of certain head mounted displays, occlusion of physical objects by notional objects displayed on the head mounted display is a natural effect, manifesting without active intervention.

However, regardless of whether such properties manifest naturally or not, embodiments do not require that sensory properties be integrated "in both directions" (though such also is not prohibited, as may be seen with regard to FIG. 14).

Again with reference to step 1526 in FIG. 15, it is noted that regardless of whether the first property under consideration is originally present in the physical data model or the notional data model, the second sensory property is determined for notional data model. Modifications, additions, subtractions, etc. in the appearance of a notional environment typically may be executed in a processor, such as one with executable instructions instantiated thereon, where modifications, additions, subtractions, etc. in a physical environment typically may not be. Again more colloquially, a virtual or augmented reality world may be changed in a processor, where the real world typically cannot.

A distinction may be made for purposes of clarity and understanding between which data model the second sensory property is addressed to, and which data model the second sensory property is aimed for. The second sensory property is always addressed to the notional data model, in so far as (as noted) the notional data model is and/or represents a notional environment, that may be readily modified within a processor. However, the second sensory property may be aimed for either the physical data model or the notional data model. That is, the second sensory property may give the appearance of an effect within the physical world, or within the notional world. As a more concrete example, a second sensory property may contribute to producing the appearance of fog in the physical world, i.e. obscuring physical objects (as perceived by a viewer), and/or may contribute to producing the appearance of fog in the notional world, i.e. obscuring virtual objects, augmented reality objects, etc. (again as perceived by the viewer).

The determination 1526 of the corresponding second sensory property typically is carried out in a processor, such as a processor having executable instructions instantiated thereon. Embodiments are not limited to the manner in which the determination 1526 is made. For purposes of shadowing, the determination might consider the position, size, orientation, optical properties, etc. of objects, light sources, etc. as represented in the physical data model and/or the notional data model, and determine a second sensory property substantially corresponding to the first sensory property (shadowing) based on optical principles, geometric analysis, etc. However, this is an example only, and other arrangements may be equally suitable.

Substantial correspondence between properties may be considered with regard to physical, functional, and/or other features. For example, for a first sensory property relating to the presence of fog within the physical or notional data models, the second sensory property may include modeling of the presence, distribution, size, behavior, etc. of water droplets or similar, thus corresponding physically with the first sensory property. However, the second sensory property may also include modeling of a decrease in visibility over distance as a feature of fog, with no consideration given to the physical nature of fog. Other arrangements also may be equally suitable.

Continuing in FIG. 15, notional sensory content is generated 1528 from the sensory data model with the second sensory property applied thereto. Thus, shadows determined as a second sensory property may be applied when generating notional sensory content. Likewise fog, smoke, falling leaves, being "out of focus", etc. may be applied when generating notional sensory content.

Physical sensory content is outputted 1530 to the reference position. As noted above with regard to FIG. 6, this may be a passive step, such as when an optical see-through display passes visual appearances of a physical environment therethrough. Thus, step 1530 may for at least certain embodiments be optional. However, as also noted with regard to FIG. 6, for other embodiments outputting physical sensory content 1530 may be an active step, as well.

The notional sensory content is also outputted 1532 to the reference position. As noted with regard to step 1528 the second sensory property is applied thereto, the second sensory property at least substantially corresponding with the first sensory property. For example, for a see-through head mounted display, and considering shadows generated by physical light sources and physical objects to be the first sensory property, and shadows generated by physical light sources and notional objects to be the substantially corresponding second sensory property, as viewed with the head mounted display notional objects may exhibit the appearance of having shadows as cast from physical light sources.

Thus, in colloquial terms, some visual, auditory, or other sensory property present in one of the physical and notional worlds may be made to appear to be present in the other of the physical and notional worlds. Where shadowing from physical light sources is present for physical objects, notional objects also may be made to exhibit the appearance of shadowing from those physical light sources; wherein shadowing from notional light sources is present for notional objects, physical objects also may be made to exhibit the appearance of shadowing from those notional light sources.

In addition, with reference to step 1528, in the example embodiment of FIG. 15 the occlusion is applied in generating content from the notional data model. However, for at least certain embodiments it may be equally suitable to apply the occlusion in generating content from the physical data model, and/or in generating content from both models. The occlusion also may be used to generate occlusion content entirely separately, and delivered as a third "stream" of content. Embodiments are not limited to the manner in which the occlusion is made to appear as visual content. However, since at least certain embodiments may utilize an optical see-through display, wherein no physical visual content is generated (light reflecting from physical objects in such case being passively transmitted through the optical see-through display), for purposes of clarity the occlusion is described chiefly herein as being applied to content generated from the notional data model (i.e. because content is not necessarily generated from the physical data model).

Furthermore, although shadowing and occlusion are described herein as examples (in FIG. 15 and FIG. 6 respectively), as noted already embodiments are not limited only to such properties. Through various embodiments, reflective physical objects may be made to exhibit the appearance of reflections of notional objects, or vice versa; notional objects may be made to exhibit the appearance of being obscured by the presence of physical fog, or vice versa.

As has been noted, occlusion and shadowing may be so integrated among physical and notional data models through various embodiments. In addition, illumination, optical effects such as diffraction, diffusion, focus, glory, haloing, lens flare, and reflection, and volumetric effects such as ash, debris, dust, fog, gas, hail, heat distortion, insects, leaves, mist, rain, sleet, smoke, snow, spray, and steam may be integrated among physical and notional data models through various embodiments.

As an example of a specific application of such examples, consider an arrangement wherein a person is wearing a see-through head mounted display while playing a mixed-reality game (i.e. a game wherein changes to the appearance of the physical environment, additions, subtractions, etc. are made via virtual reality, augmented reality, etc.). If, for example, a game-generated dragon were to fly overhead, a shadow (or at least visual content substantially corresponding with shadows) of that dragon could be overlaid onto the appearance of the physical world. If real-world fog were present in the vicinity of the player, artificial game elements (e.g. the aforementioned dragon) could be obscured through the application of an appearance of fog within the artificial game world. Thus, through various embodiments, the two "worlds" may be integrated in their appearance.

As also noted previously, embodiments are not limited only to visual sensory properties. To continue the example immediately above, if the player is in an enclosed space in the physical world, such as an alley, such that sounds made within that space generate audible echoes, substantially corresponding echoes may be generated and outputted the player (e.g. through audio outputs on the head mounted display) for the in-game sounds as well.

Again with reference to FIG. 15, the example method shown therein may be considered to be a broad method, applicable to substantially any sensory property or properties, and substantially any sense; the examples of occlusion and shadowing as presented previously herein may be considered to be more specific examples, but embodiments are not limited only thereto.

Figure 16A:
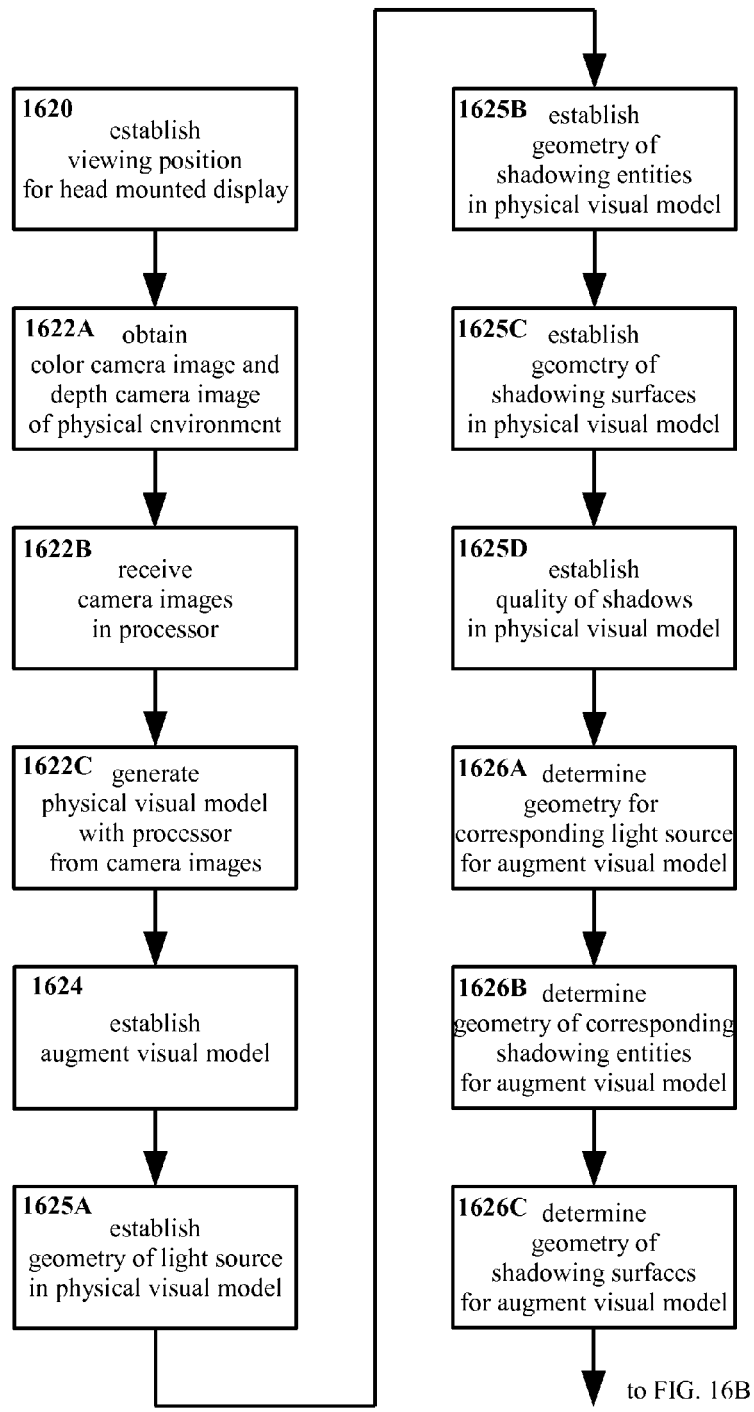
FIG. 16A and FIG. 16 B show an example method for integrating a shadowing among a physical data model and a notional data model, in flow-chart form.
Figure 16B:
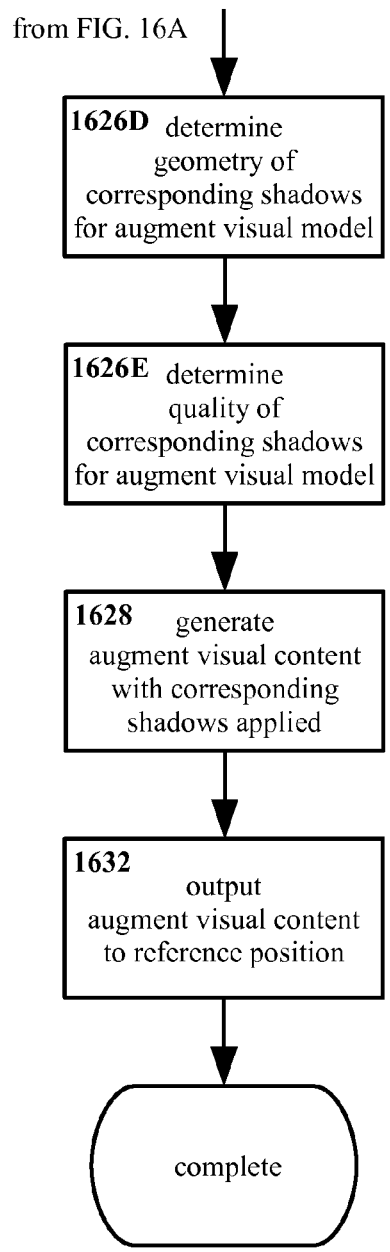

Now with reference to FIG. 16A and FIG. 16B, another example arrangement is presented whereby physical and notional sensory content may be integrated, again with reference to shadowing as an example. However, where the example method in FIG. 15 showed a general method, the example method in FIG. 16A and FIG. 16B provides an example of more particular approaches for certain steps within the method, and also addresses the method to use with a specific form of apparatus, namely an optically transparent head mounted display adapted for augmented reality output. It is emphasized that embodiments are not limited only to such an apparatus, and that other arrangements may be equally suitable.

In FIG. 16A, a viewing position is established 1620 for a head mounted display. For example, given a head mounted display in the form of a pair of glasses, a viewing position may be established 1620 at or near the anticipated position of a wearer's eye and/or eyes.

Continuing in FIG. 16A, camera images are obtained 1622A, in the specific example of FIG. 16A a color camera image and a depth camera image. A color image, such as an RGB color image (though other images may be equally suitable) provides information regarding illumination, color, transparency, etc. of a physical environment. A depth camera image, such as an infrared time-of-flight depth image (though again other images may be equally suitable) provides information regarding three dimensional shape, position, and orientation of the physical environment. While an color camera image and depth camera image may be suitable for certain embodiments, this is an example only, and other arrangements also may be equally suitable.

The camera images are received 1622B in a processor, such as a processor disposed on or in the head mounted display.

A physical visual model is generated 1622C with the processor from the camera images and/or data therein. The physical visual model typically (though not necessarily) represents at least a portion of the physical reality environment proximate the head mounted display. For the specific example in FIG. 16A, a three dimensional visual model of a physical environment may be generated by combining information regarding color, surface texture, transparency, etc. from the color camera image with information regarding shape, orientation, distance, etc. from the depth camera image. However, other arrangements also may be equally suitable. The physical visual model may be dynamic over time.

Steps 1622A, 1622B, and 1622C may be considered collectively as being at least somewhat comparable to step 1522 in FIG. 15 wherein a physical sensory model is established, though the arrangement in FIG. 16A presents a more specific example as opposed to the more broad general arrangement in FIG. 15.

Still with reference to FIG. 16A, an augment visual model is established 1624, the augment visual model representing an augmented reality environment that is typically though not necessarily proximate the head mounted display. The augment visual model may be dynamic over time.

The geometry of one or more light sources in the physical model is established 1625A. The geometry of light sources refers to where those light sources are in space, where the light sources are aimed, and so forth. As noted above, for the particular example in FIG. 16A the position, orientation, size, etc. of physical light sources may be determined for example through analysis of data from the depth camera image and/or color camera image, though information from other sources also may be utilized instead or in addition.

The geometry of shadowing entities in the physical visual model is established 1625B. The geometry of shadowing entities refers to where objects adapted to cast shadows (including but not limited to solid opaque physical objects) appear within the physical visual model, the size and shape of such objects, etc. As noted above, for the particular example in FIG. 16A the position, orientation, size, etc. of physical shadowing entities may be determined for example through analysis of data from the depth camera image and/or color camera image, though information other sources also may be utilized instead or in addition.

The geometry of shadowing surfaces in the physical visual model is established 1625C. The geometry of shadowing surfaces refers to the position, shape, orientation, etc. of the surface or surfaces on which a shadow is cast in the physical visual model. For example, in FIG. 9 through FIG. 14 shadows therein are projected onto a flat plane. However, in practice shadows may be projected onto more complex geometry, thus for at least some embodiments the shadowing surface geometry may be significant. However, not all embodiments necessarily will benefit from or require data regarding shadowing surface geometry in order to determine corresponding shadows (as in subsequent steps herein), and other arrangements may be equally suitable. Again as noted above, for the particular example in FIG. 16A the position, orientation, size, etc. of physical shadowing surfaces may be determined for example through analysis of data from the depth camera image and/or color camera image, though information other sources also may be utilized instead or in addition.

Continuing in FIG. 16A, the quality of shadows in the physical visual model is established 1625D. The quality of shadows refers to such factors as darkness, contrast between lit and shadowed regions, color, diffusion, etc. This may be considered alternately in terms of qualities of the light sources themselves, e.g. the color of the light emitted, the brightness, etc. Either or both approaches may be suitable, or some other approach. For purposes of the example in FIG. 16A, the shadow quality is established 1625D, though other arrangements may be equally suitable.

Steps 1625A, 1625B, 1626C, and 1625D may be considered collectively as being at least somewhat comparable to step 1625 in FIG. 15 wherein a first sensory property is established in the physical or notional data model, though the arrangement in FIG. 16A presents a more specific example for a first sensory property (shadowing in the physical model from physical light sources) as opposed to the more broad general arrangement in FIG. 15.

Moving on in FIG. 16A, the geometry for one or more light sources for the augment visual model at least substantially corresponding with the physical light sources is established 1626A. For example, the position, size, orientation, etc. of a light source within the augment visual model adapted to contribute to shadows for the augment entities that substantially correspond with the shadows already established (in steps 1625A through 1625D) for the physical entities in the physical visual model may be established 1626A. This may be determined for example through analysis of the information regarding the geometry of the light sources in the physical model as established 1625A previously herein, though other arrangements may be equally suitable.

The geometry for shadowing entities within the augment visual model is established 1626B. Typically though not necessarily this may be established through analysis of the augment visual model, e.g. which augment objects are in positions as to cast shadows, how those augment objects are positioned and oriented, etc. However other arrangements also may be equally suitable.

The geometry of shadowing surfaces within the augment visual model is established 1626C. Again, typically though not necessarily this may be established through analysis of the augment visual model, e.g. which augment objects are in positions as to receive shadows projected thereon, how those augment objects are positioned and oriented, etc. However other arrangements also may be equally suitable.

Now with reference to FIG. 16B, the geometry of shadows is determined 1626D, for shadows of augment objects from physical light sources at least substantially corresponding with shadows of physical objects from physical light sources. (That is, physical-notional shadows, or for this particular example physical-augment shadows.) The geometry of shadows refers to the shape, size, position, etc. of shadows of augment objects as are determined to be projected from physical light sources (or data constructs corresponding to physical light sources). Typically though not necessarily the geometry of physical-augment shadows may be determined computationally, through analysis of data regarding light sources, shadowing objects, etc. in view of properties of light propagation.

The quality of substantially corresponding shadows is determined 1626E. As with the quality of physical shadows established in step 1625D, quality refers to factors such as color, darkness, contrast, etc. Again as noted with regard to step 1625D such factors may be considered with regard to light sources in addition to and/or instead of with regard to the shadows themselves.

Steps 1626A, 1626B, 1626C, 1626D, and 1626E may be considered collectively as being at least somewhat comparable to step 1626 in FIG. 15 wherein a sensory property is established with respect to the notional data model, though the arrangement in FIG. 16A and FIG. 16B presents a more specific example for a second sensory property (shadowing in the notional model as if from physical light sources) as opposed to the more broad general arrangement in FIG. 15.

It is emphasized that although FIG. 16A and FIG. 16B show particular arrangements of method steps for (in the example given) establishing shadowing within a physical data model, determining substantially corresponding shadowing for an augment model, and delivering as output that substantially corresponding shadowing, embodiments are not limited only to these steps in integrating shadowing between physical and notional models. Likewise, in integrating other sensory properties, embodiments are not limited only to the steps shown in FIG. 16A and FIG. 16B (and indeed depending on the particular sensory property, suitable steps may vary considerably).

Still with reference to FIG. 16B, augment visual content is generated 1628, using as source material the augment visual model and the shadows as determined in steps 1626A through 1626E. Thus, at least a portion of the augment visual model is configured as data suitable for visual output, with those portions determined for shadowing (e.g. tagged areas, masks, etc., though other arrangements may be equally suitable) being included therein. Typically, though not necessarily, the augment visual content may be two-dimensional so as to be adapted for output using a two-dimensional display (even though the augment visual model and/or the indication(s) of occlusion may be three-dimensional or of some other form).

As previously noted, the example method of FIG. 16A and FIG. 16B is presented as specific to use with an optically transparent head mounted display. Thus physical visual content may be considered to pass through the display to the viewing position without an active step in the example method. This passive optical transmission may be in some sense analogous to step 1530 in FIG. 15, though as noted the method does not require action.

Continuing in FIG. 16B, the augment visual content is outputted 1632 to the viewing position with the head mounted display. For example, for a head mounted display utilizing one or more LED screens, the augment visual content—including physical-augment shadows therein—may be displayed as an arrangement of pixels forming a visible image.

Figure 17:
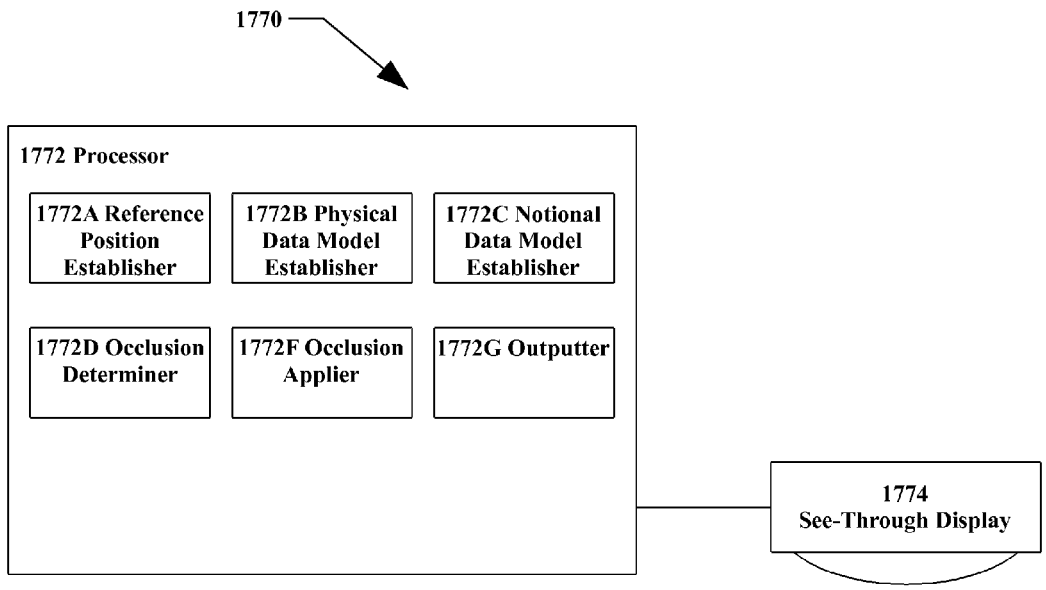
FIG. 17 shows an example apparatus for integrating occlusion, in schematic form.

Now with reference to FIG. 17, although previously herein various embodiments have been described mainly with regard to examples in the form of methods, embodiments also may take the form of an apparatus. FIG. 17 shows an example apparatus 1770.

The apparatus 1770 includes a processor 1772, the processor 1772 being adapted to execute executable instructions. Embodiments are not limited with regard to the processor 1772. A range of general-purpose, special-purpose, and embedded systems may be suitable for use as a processor 1772 for various embodiments. Moreover, it may be equally suitable for the processor 1772 to consist of two or more physical or logical processor components, or to be a "virtual" processor. Other arrangements also may be equally suitable.

A see-through display 1774 is in communication with the processor 1772. The see-through display may be optically see-through (so as to pass sensory information such as light from the physical environment therethrough), virtually see-through (so as to actively display sensory information regarding the physical environment therefrom), or some other arrangement. (As noted previously, embodiments are not limited only to visual sensory content, thus audio "displays" and other output elements may be equally suitable. For purposes of clarity the term "see-through display" is used in certain places herein.)

A variety of see-through displays (and/or other perceive-through outputs) may be suitable, and embodiments are not limited with regard thereto. Suitable visual see-through-displays may include, but are not limited to, LED, OLED, LCD, and laser projection displays. Other arrangements, including but not limited to audio outputs (e.g. hear-through speakers), may be equally suitable.

The example apparatus 1770 in FIG. 17 also includes several data entities 1772A, 1772B, 1772C, 1772D, 1772F, and 1772G, disposed on the processor 1772. The data entities 1772A, 1772B, 1772C, 1772D, 1772F, and 1772G may include executable instructions instantiated on the processor, non-executable data, some combination thereof, etc. In the example shown the data entities 1772A, 1772B, 1772C, 1772D, 1772F, and 1772G are described as including executable instructions, but other arrangements may be equally suitable.

With regard individually to the data entities 1772A, 1772B, 1772C, 1772D, 1772F, and 1772G in FIG. 17, the reference position establisher 1772A is adapted to establish a reference position. The physical data model establisher 1772B is adapted to establish a physical data model representing at least a portion of at least one physical entity (and typically though not necessarily a physical environment with multiple physical entities therein). The notional data model establisher 1772C is adapted to establish a physical data model representing at least a portion of at least one notional entity (and typically though not necessarily a notional environment with multiple notional entities therein).

The occlusion determiner 1772D is adapted to determine an occlusion of at least a portion of the notional data model by at least a portion of the physical data model (e.g. based on whether the distance along a direction from the reference position to the physical data model is less than the distance along a similar direction from the reference position to the notional data model). The occlusion applier 1772F is adapted apply an occlusion (as determined by the occlusion determiner 1772D) to the notional data model for purposes of output. The outputter is adapted to deliver sensory content representing at least a portion of the notional data model with the occlusion applied thereto to the see-through display 1774.

For certain embodiments, including but not limited to embodiments utilizing a virtual see-through display 1774, the outputter 1772G also may be adapted to deliver sensory content representing at least a portion of the physical data model.

Reference positions, physical data models, notional data models, occlusion determination, occlusion application, and output of sensory content with occlusion applied thereto have been previously described herein.

Figure 18:
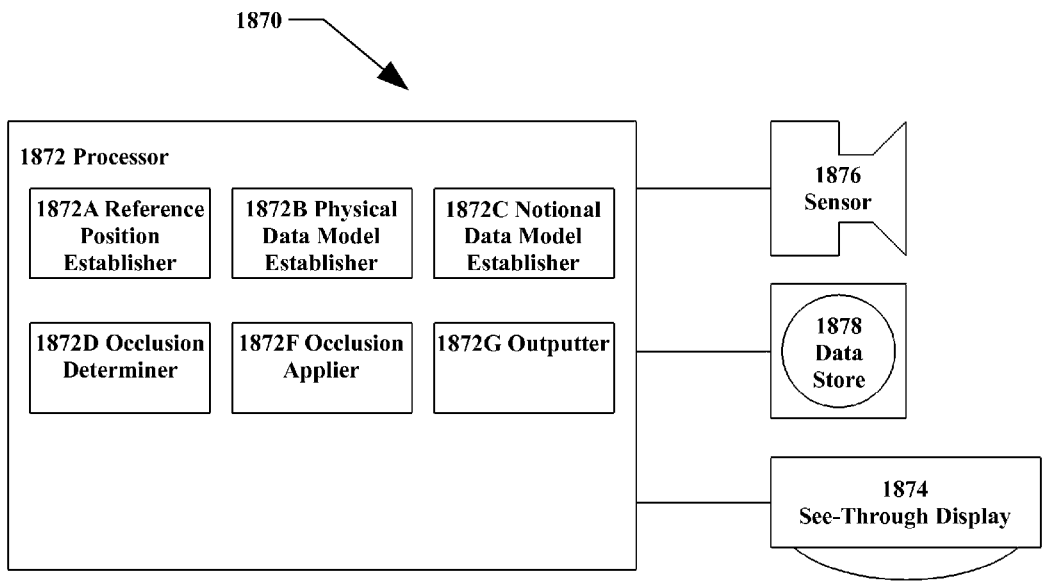
FIG. 18 shows another example apparatus for integrating occlusion in schematic form, with additional elements.

Now with regard to FIG. 18, another example apparatus 1870 according is shown therein.

The apparatus 1870 includes a processor 1872, the processor 1872 being adapted to execute executable instructions. A see-through display 1874 is in communication with the processor 1872. In addition, the example apparatus in FIG. 18 includes a sensor 1876 in communication with the processor, and a data store 1878 in communication with the processor.

As has been previously noted, input from a sensor 1876 including but not camera images such as color images and depth images may be utilized by various embodiments. For example, images of the physical environment may help establish a physical data model, images of a person wearing a head mounted display (e.g. from a rearward facing camera aimed at the wearer's eyes) may help establish a viewing position or other reference position, etc. Information in a data store 1878 also may be utilized by various embodiments. For example, information regarding a notional environment may be stored on a data store 1878, as may rules and/or data for determining occlusion, etc. In addition, executable instructions that are to be instantiated on the processor (including but not limited to data entities 1872A, 1872B, 1872C, 1872D, 1872F, and 1872G shown in FIG. 18) may be stored on a data store 1878.

Embodiments are not limited with regard to the sensor 1876 and/or the data store 1878, nor are such elements necessarily required for all embodiments. Where a sensor 1876 is present, suitable sensors 1876 may include but are not limited to monochrome cameras, color cameras, infrared cameras, depth cameras, and stereo cameras. Where a data store 1878 is present, suitable data stores 1878 may include but are not limited to hard drives and solid state drives.

In addition, although the example of FIG. 18 shows only a processor 1872, see-through display 1874, sensor 1876, and data store 1878, embodiments are not limited only to such elements, and other hardware and non-hardware elements (including but not limited to communicators, physical frameworks or bodies, etc.) also may be present in certain embodiments.

The example apparatus 1870 in FIG. 18 also includes several data entities 1872A, 1872B, 1872C, 1872D, 1872F, and 1872G, disposed on the processor 1872. The reference position establisher 1872A is adapted to establish a reference position. The physical data model establisher 1872B is adapted to establish a physical data model representing at least a portion of at least one physical entity. The notional data model establisher 1872C is adapted to establish a notional data model representing at least a portion of at least one notional entity. The occlusion determiner 1872D is adapted to determine an occlusion of at least a portion of the notional data model by at least a portion of the physical data model. The occlusion applier 1872F is adapted to apply an occlusion (as determined by the occlusion determiner 1872D) to the notional data model for purposes of output. The outputter 1872G is adapted to deliver sensory representing at least a portion of the notional data model with the occlusion applied thereto to the see-through display 1874 (and for certain embodiments also being adapted to deliver sensory content representing at least a portion of the physical data model).

Figure 19:
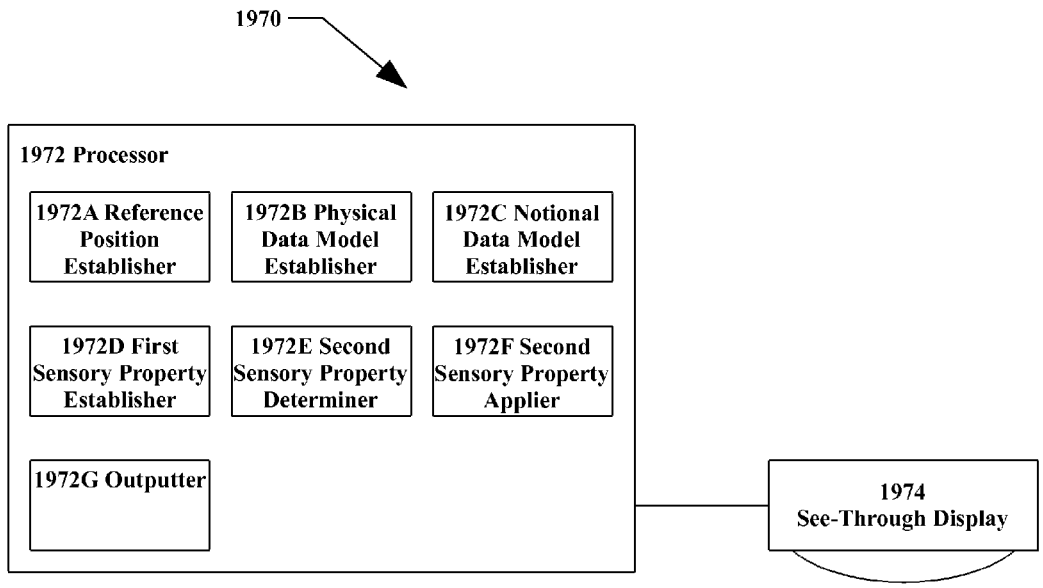
FIG. 19 shows an example apparatus for integrating a general sensory property, in schematic form.

Now with reference to FIG. 19, as has been noted occlusion may be considered to be an example or subset of sensory properties more generally that may be integrated across a physical and notional data model. FIG. 19 presents another example apparatus 1970, referring to sensory properties more generally.

The apparatus 1970 includes a processor 1972, the processor 1972 being adapted to execute executable instructions. A see-through display 1974 is in communication with the processor 1972. The example apparatus 1970 in FIG. 19 also includes several data entities 1972A through 1972G disposed on the processor 1972. The data entities 1972A through 1972G may include executable instructions instantiated on the processor, non-executable data, some combination thereof, etc.

With regard individually to the data entities 1972A through 1972G, the reference position establisher 1972A is adapted to establish a reference position. The physical data model establisher 1972B is adapted to establish a physical data model representing at least a portion of at least one physical entity. The notional data model establisher 1772C is adapted to establish a physical data model representing at least a portion of at least one notional entity. The first sensory property determiner 1972D is adapted to determine a first sensory property in one of the physical data model and the notional data model. The second sensory property determiner 1972E is adapted to determine a second sensory property that at least substantially corresponds to the first sensory property, as applicable to the notional data model. The second sensory property applier 1972F is adapted apply the second sensory property to the notional data model for purposes of output. The outputter 1972G is adapted to deliver sensory content representing at least a portion of the notional data model with the occlusion applied thereto to the see-through display 1974.

For certain embodiments, including but not limited to embodiments utilizing a virtual see-through display 1974, the outputter 1972G also may be adapted to deliver sensory content representing at least a portion of the physical data model.

Figure 20:
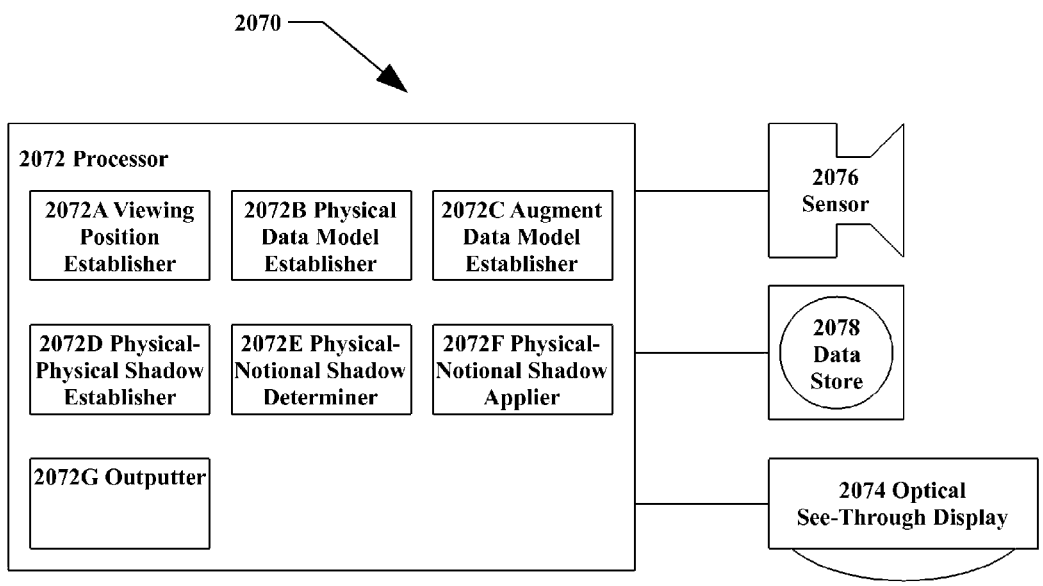
FIG. 20 shows an example apparatus for integrating shadowing, in schematic form.

Now with regard to FIG. 20, another example apparatus 2070 is presented therein. The arrangement in FIG. 20 is at least somewhat similar to that in FIG. 19, but is specific to the visual sense, and more so to integrating shadows from physical light sources from a physical data model to a notional data model.

The apparatus 2070 includes a processor 2072, the processor 2072 being adapted to execute executable instructions. A see-through display 2074 is in communication with the processor 2072. In addition, the example apparatus in FIG. 18 includes a sensor 2076 in communication with the processor, and a data store 2078 in communication with the processor.

The example apparatus 2070 in FIG. 20 also includes several data entities 2072A through 2072G, disposed on the processor 2072. The viewing position establisher 2072A is adapted to establish a viewing position. The physical data model establisher 2072B is adapted to establish a physical data model representing at least a portion of a visual appearance of at least one physical entity. The notional data model establisher 2072C is adapted to establish a notional data model representing at least a portion of at least one notional entity. The physical-physical shadow establisher 2072D is adapted to establish shadows of physical entities as cast from physical light sources. The physical-notional shadow determiner 2072E is adapted to determine shadows for notional entities as cast from physical light sources, at least substantially corresponding with the physical-physical shadows. The physical-notional shadow applier 2072F is adapted to apply the physical-notional shadows to the notional data model for purposes of output. The physical-notional shadow outputter 2072G is adapted to deliver to the see-through display 2074 sensory content representing at least a portion of the notional data model with the physical-notional shadows applied thereto (and for certain embodiments also being adapted to deliver sensory content representing at least a portion of the physical data model).

Figure 21:
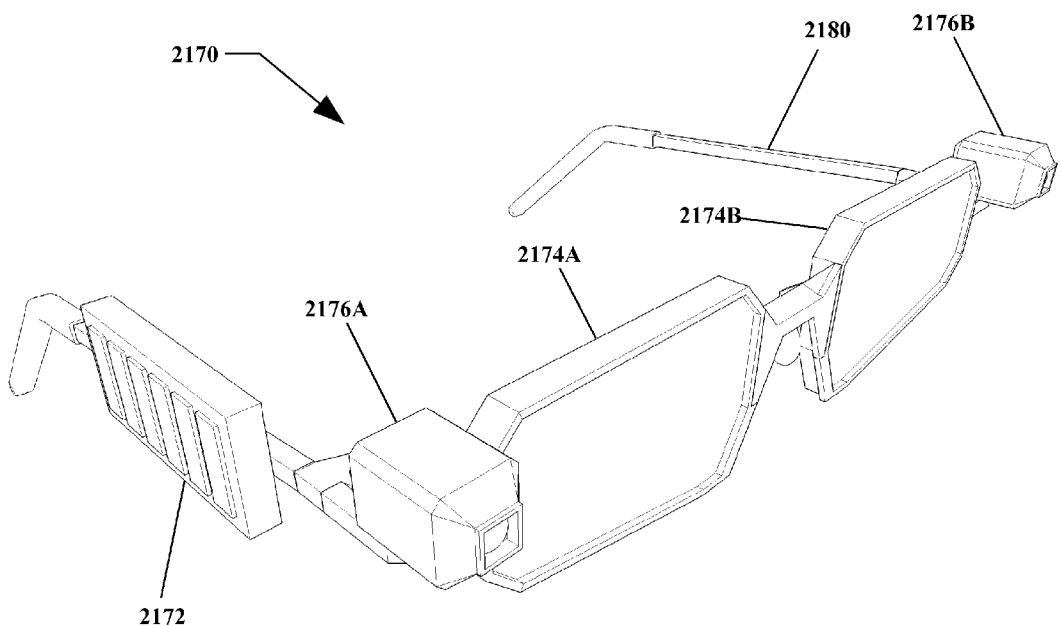
FIG. 21 shows an example apparatus for integrating a sensory property in perspective view, in the form of a head mounted display.

Now with reference to FIG. 21, embodiments may take many forms, and/or may be incorporated into many devices. One example of an apparatus 2170 is shown in FIG. 21, in perspective view.

As shown, the apparatus 2170 includes a processor 2172. Although not visible in perspective view, the processor 2172 may have disposed thereon one or more data entities, such as a reference position establisher, physical data model establisher, notional data model establisher, first sensory property establisher, second sensory property determiner, sensory property applier, outputter, etc., for example as comparable to those shown and described previously with regard to FIG. 19.

In addition, the example apparatus 2170 includes a body 2180, the body 2180 being in the form of a pair of glasses so as to be wearable e.g. as a head mounted display. The processor 2170 is disposed on the body 2180. Also disposed on the body 180 are first and second see-through displays 2174A and 2174B, and first and second sensors 2176A and 2176B. In the example as shown, the see-through displays 2174A and 2174B are disposed on the body 2180 such that when the body 2180 is worn the displays 2174A and 2174B would be arranged in front of, facing, and proximate the eyes of a wearer, for example so as to display stereo visual information to that wearer. Similarly, the sensors 2176A and 2176B are shown disposed on the body 2180 such that when the body 2180 is worn the sensors 2176A and 2176B would be arranged in left and right positions proximate and facing substantially outward from the wearer's eyes, for example so as to capture stereo visual information at least substantially comparable to that received by the wearer's eyes.

However, the arrangement shown in FIG. 21 is an example only, and not all embodiments necessarily will have all elements shown therein or in the configuration shown therein.

Figure 22:
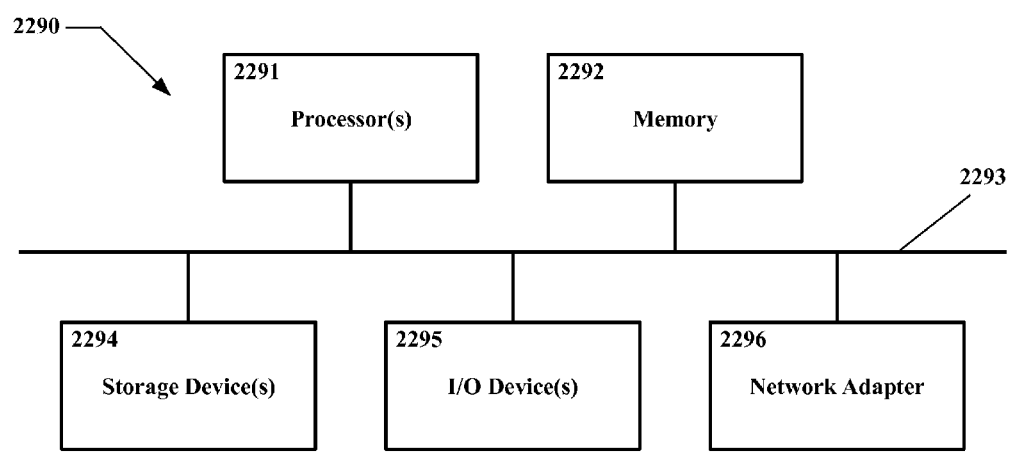
FIG. 22 shows a block diagram of a processing system that may implement integration operations.

FIG. 22 is a block diagram of an apparatus that may perform various operations, and store various information generated and/or used by such operations, according to an embodiment of the disclosed technique. The apparatus may represent any computer or processing system described herein. The processing system 2290 is a hardware device on which any of the other entities, components, or services depicted in the examples of FIG. 1 through FIG. 21 and FIG. 23 through FIG. 35 (and any other components described in this specification) may be implemented. The processing system 2290 includes one or more processors 2291 and memory 2292 coupled to an interconnect 2293. The interconnect 2293 is shown in FIG. 22 as an abstraction that represents any one or more separate physical buses, point to point connections, or both connected by appropriate bridges, adapters, or controllers. The interconnect 2293, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 2291 is/are the central processing unit of the processing system 2290 and, thus, control the overall operation of the processing system 2290. In certain embodiments, the processor(s) 2291 accomplish this by executing software or firmware stored in memory 2292. The processor(s) 2291 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 2292 is or includes the main memory of the processing system 2290. The memory 2292 represents any form of random access memory (RAM), read-only memory (ROM), flash memory, or the like, or a combination of such devices. In use, the memory 2292 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

The network adapter 2294, a storage device(s) 2295, and I/O device(s) 2296, are also connected to the processor(s) 2291 through the interconnect 2293 The network adapter 2294 provides the processing system 2290 with the ability to communicate with remote devices over a network and may be, for example, an Ethernet adapter or Fibre Channel adapter. The network adapter 2294 may also provide the processing system 2290 with the ability to communicate with other computers within the cluster. In some embodiments, the processing system 2290 may use more than one network adapter to deal with the communications within and outside of the cluster separately.

The I/O device(s) 2296 can include, for example, a keyboard, a mouse or other pointing device, disk drives, printers, a scanner, and other input and/or output devices, including a display device. The I/O device(s) 2296 also may include, for example, cameras and/or other imagers adapted to accept visual input including but not limited to postures and/or gestures. The display device may include, for example, a cathode ray tube (CRT), liquid crystal display (LCD), or some other applicable known or convenient display device. The display device may take various forms, including but not limited to stereo displays suited for use in near-eye applications such as head mounted displays or other wearable devices.

The code stored in memory 2292 may be implemented as software and/or firmware to program the processor(s) 2291 to carry out actions described herein. In certain embodiments, such software or firmware may be initially provided to the processing system 2290 by downloading from a remote system through the processing system 2290 (e.g., via network adapter 2294).

The techniques herein may be implemented by, for example, programmable circuitry (e.g. one or more microprocessors) programmed with software and/or firmware, or entirely in special-purpose hardwired (non-programmable) circuitry, or in a combination of such forms. Special-purpose hardwired circuitry may be in the form of, for example, one or more AISCs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

A machine-accessible storage medium or a storage device(s) 2295 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, may include, for example, programmable circuitry programmed with specific software and/or firmware, special-purpose hardwired circuitry, or a combination thereof.

Now with reference to FIG. 23 through FIG. 31B collectively, a particular instance of data integration is illustrated and described as an example application of certain embodiments. The instance described with regard to FIG. 23 through FIG. 31B relates to identifying shadows from physical objects cast from physical light sources, and applying corresponding notional shadows onto notional objects. The example in FIG. 23 through FIG. 31B is described in terms of a hand as a physical object, a virtual/augment data tablet as a notional object, and a flat surface such as a table or counter upon which the shadow of the hand may be cast from a physical lamp as a light source. However, these are examples only, provided for clarity, and are not limiting.

Figure 23:
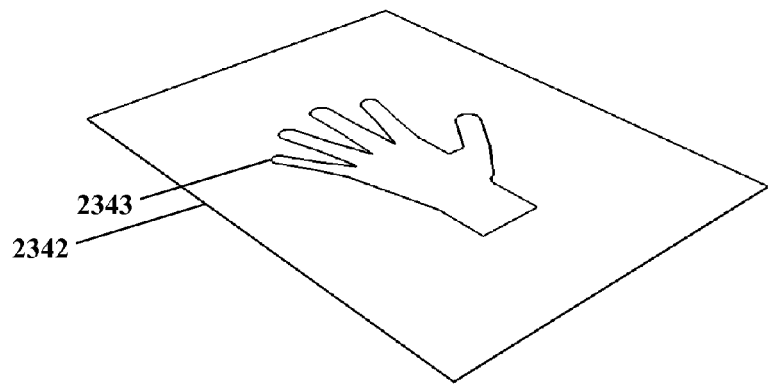
FIG. 23 shows an example arrangement of a feature of unknown nature disposed on a physical surface, in perspective view.

Referring specifically to FIG. 23, a surface 2342 such as a table, a counter, a white board, etc. is shown. A feature 2343 also is visible on the surface 2342; the feature 2343 is in the shape of a hand with fingers extended and partially spread. In some instances, such a feature 2343 may be a shadow, for example a shadow cast by a human hand. However, a feature 2343 in the shape of a hand is not necessarily a shadow; a hand-shape also may be drawn onto a surface, sketched onto a sheet of paper placed on a table, applied as an adhesive label (e.g. to indicate "place your hand here", etc.), and so forth. More generally speaking, a given visible feature 2343 may be a shadow, but may be something else instead, such as some form of visible marking.

Figure 24:
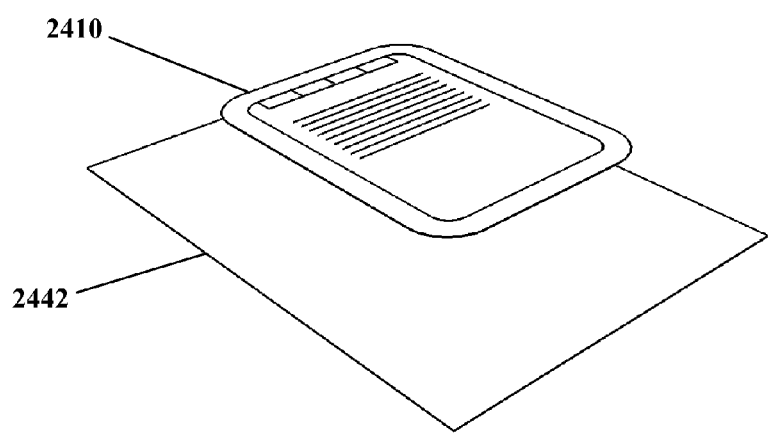
FIG. 24 shows an example arrangement of an augmented reality tablet disposed above a physical surface, in perspective view.

A distinction between shadows and markings may be significant, as explained now. With reference to FIG. 24, a similar surface 2442 to that shown in FIG. 23 is visible. A virtual/augment tablet 2410 (an example of a notional entity) is also visible, some distance above the surface 2442. No hand-shaped feature is shown in FIG. 24, but examples of such are presented in FIG. 25 and FIG. 26, for different types of hand-shaped features.

Figure 25:
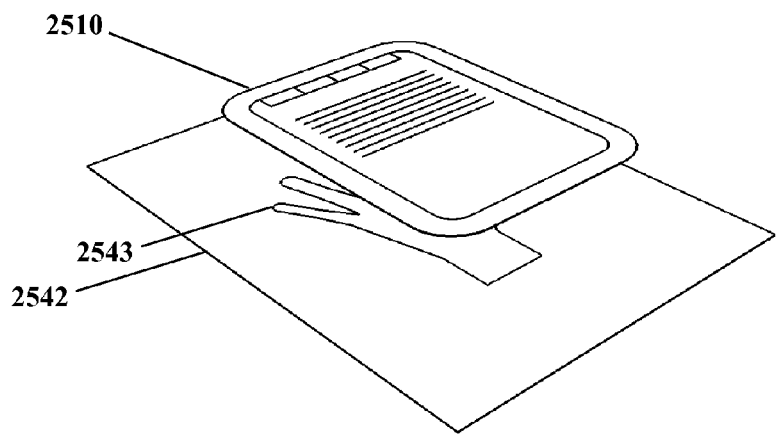
FIG. 25 shows an example arrangement of an augmented reality tablet disposed above a physical surface having an unknown feature thereon, in perspective view.

In FIG. 25, a surface 2542 and virtual/augment tablet 2510 are visible. In addition, a hand-shaped feature 2543 is shown disposed on the surface 2542. The virtual/augment tablet 2510 occludes the hand-shaped feature 2543. Such behavior is as may be expected of a physical tablet interacting with a hand-shaped marking. That is, if the hand-shaped feature 2543 is a marking, such as a drawing, a label, a discoloration, some other surface feature, etc., then if a real-world tablet were held above the hand-shaped feature 2543, that real-world tablet would cover some or all of the hand-shaped feature 2543.

Figure 26:
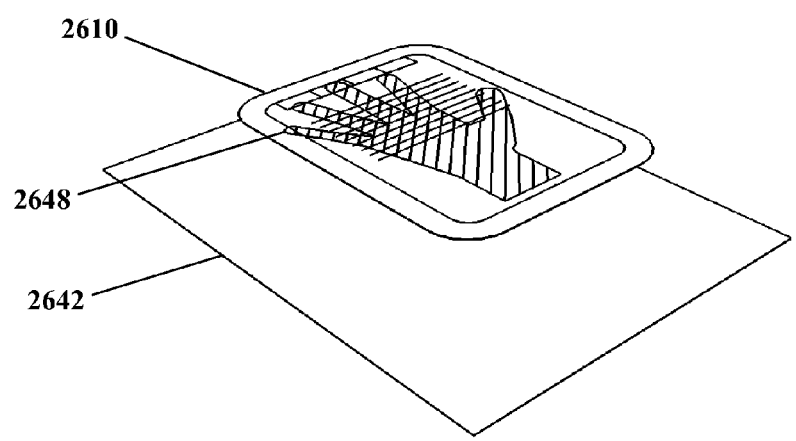
FIG. 26 shows an example arrangement of an augmented reality tablet disposed above a physical surface, with a shadow on the tablet, in perspective view.

By contrast, in FIG. 26 a surface 2642 and a virtual/augment tablet 2610 again are visible. However, a hand-shaped shadow 2648 is shown disposed not on the surface 2642 but on the virtual/augment tablet 2610. Such behavior is as may be expected of a physical tablet interacting with a projected shadow. That is, if a hand-shaped feature on a surface 2642 is a shadow projected onto that surface 2642, and a physical tablet were placed on or above the surface 2642, then some or all of a hand-shaped shadow 2648 would appear on the tablet.

FIG. 25 and FIG. 26 thus illustrate two different phenomena that may result, depending on whether a feature on a surface is a marking on the surface (as in FIG. 25) or is a shadow projected onto the surface (as in FIG. 26). Typically for physical environments, surface markings are covered by (e.g. occluded by) overlying objects, while projected shadows cover overlying objects.

In order to integrate notional entities with physical entities to provide an appearance that both notional and physical entities are "present", following the same rules of reality, etc., it may be useful to produce similar effects for a virtual/augment tablet as may be expected for a physical tablet. That is, for a virtual/augment tablet disposed above a physical surface, a projected physical shadow should cover that virtual/augment tablet, while a marking on the surface should be covered by the virtual/augment tablet.

Figure 27:
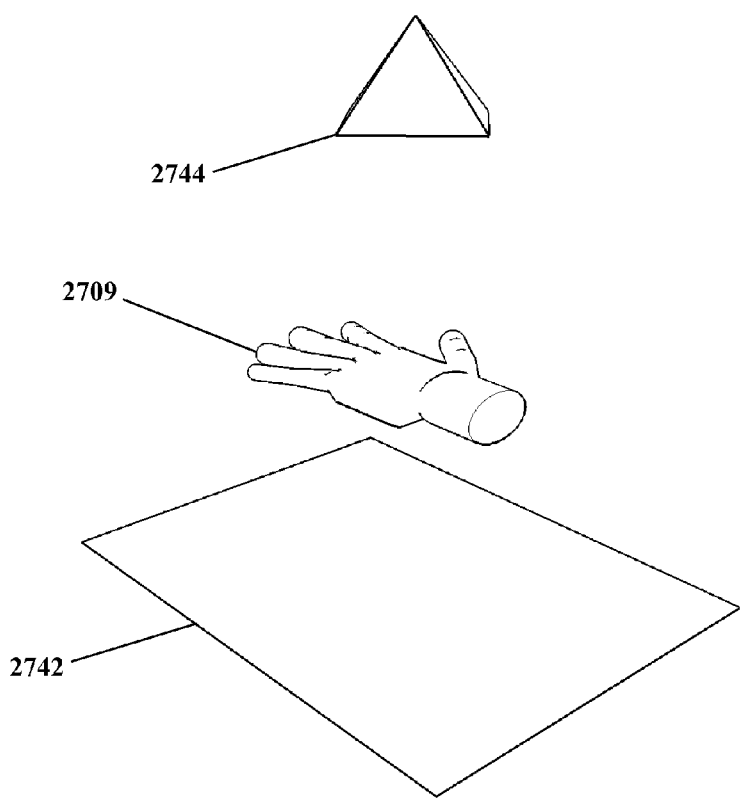
FIG. 27 shows an example arrangement of solids data for a physical light, physical hand, and physical surface, in perspective view.
Figure 28:
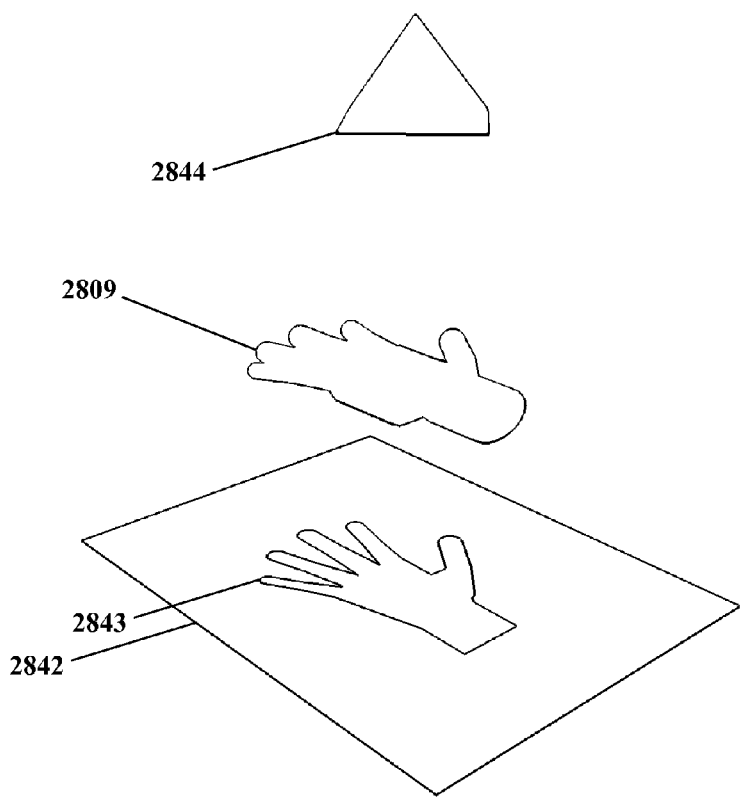
FIG. 28 shows an example arrangement of surfaces data for a physical light, physical hand, physical surface, and unknown feature disposed on the surface, in perspective view.

One approach for enabling such integration with certain embodiments may be understood from FIG. 27 and FIG. 28.

In FIG. 27, a view of a physical environment is shown that is at least somewhat similar to the arrangements in FIG. 23 through FIG. 26, except that the view shown reflects only volumetric or "solid" objects. A surface 2742 is shown, such as a table or counter. A human hand (e.g. a physical entity) 2709 is shown disposed some distance above the surface 2742. A light source 2744 in the form of a lamp is shown above the hand 2709, such that light from the lamp 2744 may project a shadow of the hand 2709 onto the surface 2742. However, no shadow is visible in FIG. 27; a shadow, not being volumetric, typically is not visible in volumetric or solids data.

Data such as that illustrated in FIG. 27 may be obtained for example from a depth camera, which may be adapted to determine the depths to various objects, surfaces, etc., thus potentially determining the size, position, arrangement, shape, etc. of such entities but typically not determining surface information. Thus, a depth camera image of a physical environment may reveal the surface 2742, the hand 2709, and the lamp 2744 as shown in FIG. 27, but may not reveal whether a hand-shaped feature is present on the surface 2742, regardless of whether such a feature is a shadow, a surface marking, etc. Similarly, while such a depth camera image may reveal the physical form of a lamp 2744, that depth camera image may not reveal whether illumination is being produced, the direction, color, or spread of light, whether light is striking the hand 2709 or other entities, etc.

Again in FIG. 28, a view of a physical environment is shown that is at least somewhat similar to the arrangement in FIG. 27, except that the view shown reflects only surface data. That is, color, brightness, etc. may be present, but depth and volumetric data may not be present (at least not directly). Thus in FIG. 28, contours are not visible; in practice contours might be visible as variations in color, shade, etc., but for simplicity coloring and shading are not shown in FIG. 28. A surface 2842 is shown, with a human hand 2809 disposed some distance above the surface 2842 and a light source 2844 above the hand 2809. A feature 2843 in the shape of a hand is also shown on the surface 2842; such a feature 2843 may be visible as being darker than the remainder of the surface 2842, being a different color than the remainder of the surface 2842, etc. The feature 2843 may be a shadow, or the feature 2843 may be surface mark; either may be possible given the arrangement in FIG. 28.

However, it is noted that surface data such as that in FIG. 28 may include additional information that may help to determine whether the feature 2843 is a surface mark or a shadow (or some combination of both, or even some other entity). For example, although color and shading are omitted from FIG. 28 as noted, in practice a surfaces image such as that in FIG. 28 may indicate through color, shading, or other features whether the lamp 2844 is lit, how bright that lamp 2844 is (if lit), the color, direction, focus, etc. of light from the lamp 2844, etc. This may include color or brightness data at or near the lamp 2844 itself, but also may include color or brightness data on the hand 2809, on the surface 2842, or on other aspects of the environment (if present). For example, if the hand 2809 is brighter on top than on the bottom (or on side but not the other, etc.), this may suggest the presence of an active light source above the hand 2809 (or to one side, etc.). Similarly, a bright circle or "halo" on the surface 2842 as of impinging light, or a bright reflection of a light on the surface 2842 (if the surface is reflective), may suggest the presence, direction, etc. of an active light source.

Although considering volumetric data alone or surface data alone may not reveal whether a given feature is a shadow, consideration of both volumetric and surfaces data may be sufficient. For example, if light sources and objects that may cast shadows from those light sources may be identified, then a determination may be made as to whether a shadow could and/or should be present on some surface. This may in turn be taken as evidence that a given feature is or is not a shadow; if a physical object of suitable size, shape, and position is disposed relative to a surface and a light source as to produce a shadow, and the feature in question matches the shadow that would be so produced, it may be concluded that the feature is indeed a shadow. Conversely, if a physical environment is such that a feature does not appear to correspond with any shadows that should be present, it may be concluded that the feature is not a shadow.

Other factors also may be considered. For example, shadows typically may be darker than their surroundings. That is, a shadow of a hand on a gray counter top may be a darker shade of gray than the surrounding area, but typically will not be a brighter shade of gray. As another example, for typical "white" lighting in common indoor use shadows generally are not colored differently from their surroundings. That is, a green marking on a white surface may, in at least some circumstances, be concluded to be something other than a shadow (a marking, a reflection, a "hot spot" from a light source such as a laser pointer, etc.).

Figure 29A:
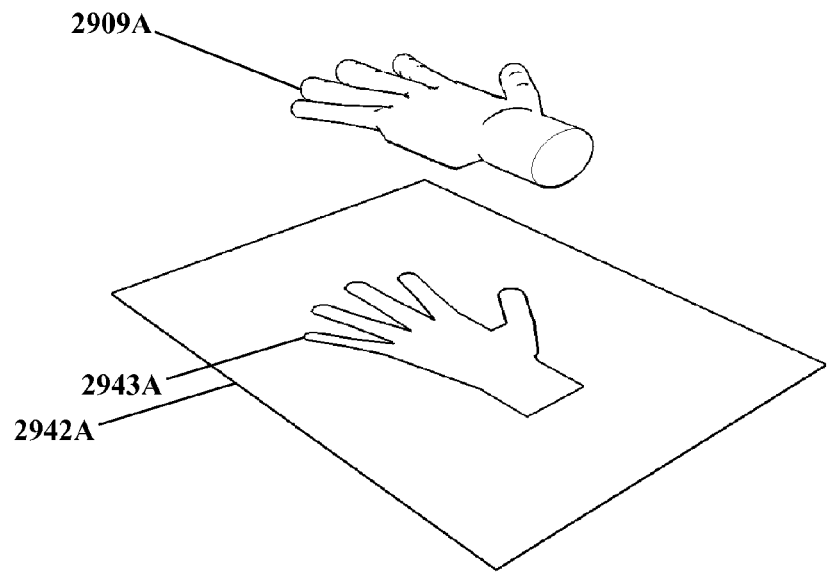
FIG. 29A and FIG. 29B show example arrangements illustrating an implicit light source.
Figure 29B:
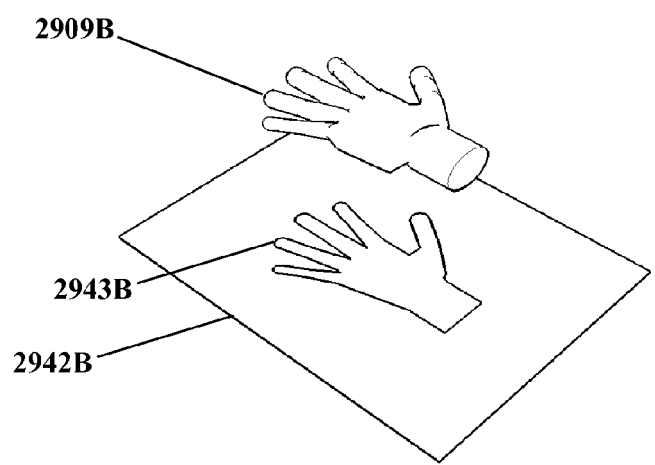

With reference to FIG. 29A and FIG. 29B, it is noted that it is not necessary that light sources be explicitly present in an environment or an image thereof in order to be considered. That is, in the arrangements in FIG. 27 and FIG. 28 the lamp 2744/2844 is visibly present. However, in FIG. 29A a similar view is shown, with a surface 2942A, a hand-shaped feature 2943A, and a hand 2909A. No light source is explicitly present; if only entities that are explicitly present in FIG. 29A are considered, then it may be concluded that the feature 2943A is not a shadow because no suitable light source exists to cast such a shadow.

However, as noted previously light may be determined through consideration of color, brightness, etc., and thus a light source may be determined to be implicitly present even if not explicitly visible. For example, if the hand 2909A is brighter on top than on the bottom, then a light source may be concluded to be present above the hand.

Referring now to FIG. 29B, an arrangement similar to that in FIG. 29A but pulled back and from a slightly different perspective is shown. Again the surface 2942B, hand-shaped feature 2943B, and hand 2909B are shown, but as may be seen in FIG. 29B a light source 2944B also is present. Even if such a light source is not visibly present in a given view of or data set for an environment (as in FIG. 29A), the light source 2944B may be determined to be implicitly present. As noted a light source 2944B may be inferred to be present because of color or brightness aspects of a surfaces image. Reflections of a light source and/or other factors also may be considered.

In addition, if a light source 2944B was previously determined to be present, for example having been visible in some previous view of the environment, then that light source 2944B may be considered as being implicitly present even if not in view at a particular moment. Likewise, if one or more shadows are known to be present, were previously identified, etc., then the presence, location, etc. of a light source 2944B may be inferred from those other shadows.

Such an arrangement may be referred to as "persistence". That is, if a light source has been imaged, inferred, etc. at some previous time, the existence of the light source may be noted and/or retained for future consideration. As a more concrete example, if a lamp were identified in one image based on color or brightness, then features such as the position, orientation, brightness, color, etc. of that lamp may be stored as data within a processor, or recorded in a data store. That data describing the lamp may be considered in the future, even if the most recent images or other data do not explicitly show the presence of that particular lamp.

For instance, if a user wearing a head mounted display with a color camera thereon were to turn away from such a lamp, the lamp may cease to be present within the color camera's field of view, but the lamp may still be considered when addressing shadowing, etc. Even if the color camera and/or the user cannot see the lamp at a given time, that lamp still may affect shadows that the camera and/or the user can see. Thus, some or all information regarding some or all light sources may be retained as persistent information, usable for later consideration of shadows (or other phenomena).

No specific time or circumstance limit will necessarily apply to persistent light source data. In certain embodiments, it may be useful to retain light source data as persistent for several minutes or for some other duration, for example on the expectation that a user may not rapidly move out of the effective range of a light source. In other embodiments, it may be useful to retain or discard persistent light source data based on the position of a device, sensor, user, etc., as determined for example through GPS or other avenues. In still other embodiments, light source data may be persistent indefinitely, for example being stored for individual locations such as a user's desk at their place of work, various rooms in their home, their automobile, etc. In such instance, light sources may be anticipated to remain at least somewhat consistent over time, e.g. the location of built-in light fixtures may be essentially permanent, while even floor lamps and similar may remain at or near a single position for long periods. Such persistent light source data may be useful for example in enhancing integration of data sets (e.g. because the positions and other properties of light sources in a given location frequently visited by the user may be well-defined with high accuracy and/or precision), may reduce computational requirements (if some or all light sources are already characterized, then determining light sources "on the fly" may be avoided), etc.

In more colloquial terms, just because a light source is not currently visible does not necessarily mean that no light sources are present. Embodiments may consider light sources that are not directly visible, but for which evidence exists, or which are otherwise considered likely to be present (e.g. overhead lighting may be assumed in interior office spaces, the sun may be assumed present and in a particular position based on GPS data and local time, etc.).

In addition, physical entities whether implicit or explicit also may be considered as persistent, in similar fashion to persistent light sources as noted above. More broadly, solids data, surfaces data, physical models, notional models, etc. may, for certain embodiments, be held persistent in whole or in part.

As an aside, it is noted that it may not be required for all embodiments to necessarily determine certain features, for example light sources. Given some other approach for determining whether an unknown feature is a shadow, a surface image, an imaging error, etc., it may not be necessary to determine whether light sources are present, where those light sources are, etc. As a more concrete example, it may be suitable in certain embodiments to distinguish shadows from other features based on darkness, color, sharpness/blurriness of edges, etc., or through algorithms that determine (either based on concrete factors or through abstract analysis) whether a feature likely is or likely is not a shadow. Other approaches also may be equally suitable.

Thus, although particular example descriptions are provided to indicate approaches for identifying shadows and thus enabling integration of shadows among physical and notional data sets, the approaches described herein should not be considered as limiting, and other arrangements may be equally suitable.

Figure 30A:
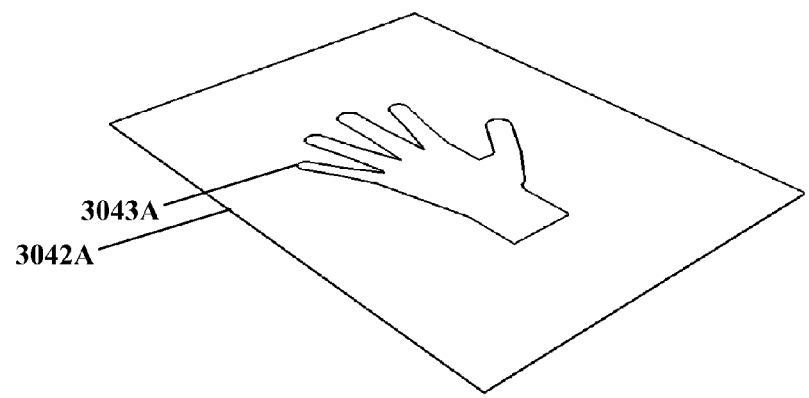
FIG. 30A and FIG. 30B show example arrangements illustrating an physical entity, in perspective view.
Figure 30B:
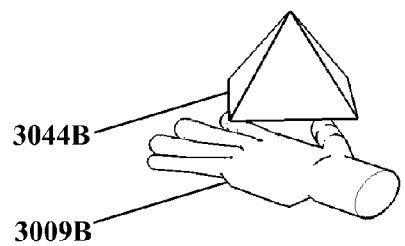
Figure 30B:
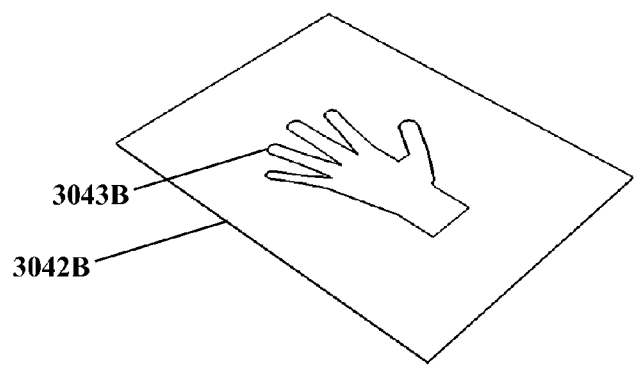

With regard to FIG. 30A and FIG. 30B, similarly objects casting shadows may be implicit rather than explicit. In FIG. 30A a surface 3042A and a hand-shaped feature 3043A are shown. No light source is explicitly present, nor a hand; if only entities that are explicitly present in FIG. 30A are considered, then it may be concluded that the feature 3043A is not a shadow because no suitable light source exists to cast such a shadow and no suitable object exists to produce such a shadow.

However, as with light sources physical objects may be determined as being implicitly present, even if not explicitly visible. For example, if the environment is being viewed from a head-mounted display, then it may be anticipated as likely that a user's hands may be present nearby, and (e.g. based on anatomical limitations) that the user's hands may be limited to a range of possible positions, orientations, etc.

With reference to FIG. 30B, an arrangement similar to that in FIG. 30A but pulled back and from a slightly different perspective is shown. Again the surface 3042B and hand-shaped feature 3043B are shown, but as may be seen in FIG. 30B a light source 3044B and a hand 3009B also are present. As with light sources, hands and/or other physical objects may be determined to be implicitly present, even if not necessarily immediately detected. The presence of a user, body parts thereof, an embodiment of apparatus itself, other objects, etc. may be assumed to exist, for example. Objects previously detected may be considered to still be present, objects may be predicted as being likely to be present, etc.

Figure 31A:
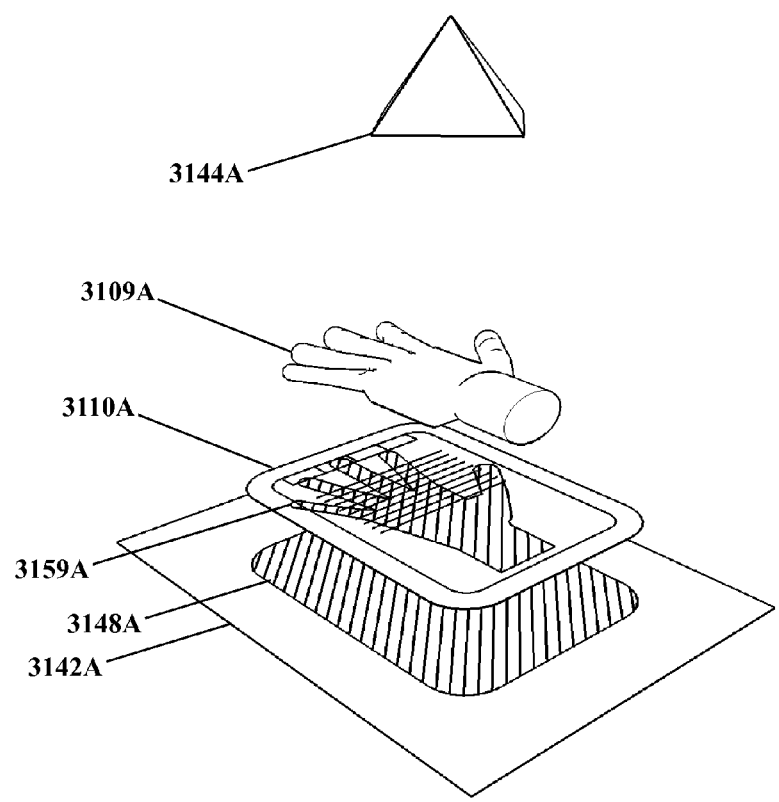
FIG. 31A and FIG. 31B show example arrangements of shadow application and shadow correction, in perspective view.
Figure 31B:
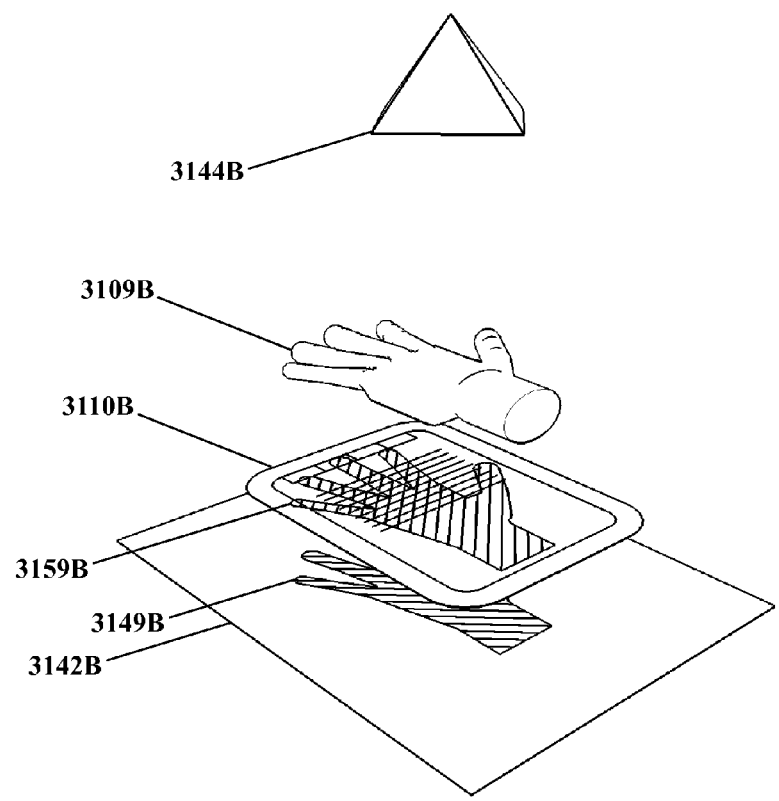

Now with reference to FIG. 31A and FIG. 31B, as noted it may be useful to determine whether a given feature is a shadow or a surface feature, for example so as to adjust the appearance of notional entities to correspond with behavior expected for physical entities. That is, a virtual/augment shadow may be added to a virtual/augment tablet if a physical shadow is concluded to be present, where a virtual/augment tablet would instead occlude a physical surface marking.

However, embodiments are not necessarily limited only to replicating detected phenomena.

In FIG. 31A, a surface 3142A is shown with a virtual/augment tablet 3110A disposed above, and a hand 3109A disposed above the virtual/augment tablet 3110A. A light source 3144A is in turn disposed above the hand 3109A. A hand-shaped virtual/augment shadow 3159A is shown projected onto the virtual/augment tablet 3110A, so as to correspond with what may be expected for a physical tablet; that is, the virtual/augment tablet 3110A is made to look "more real" by exhibiting a shadow of the hand 3109A thereon.

The shadow 3159A is a notional entity, but is made to appear as though cast by the physical light source 3144A from the physical hand 3109A onto the virtual/augment tablet 3110A. To recall terminology from previous examples, the shadow 3159A may be referred to as a "physical-physical-notional" entity: physical light, physical object, notional surface. More colloquially, the shadow 3159 is a notional shadow that mimics a shadow as may be cast by a physical light from a physical object, falling on a notional surface.

However, as may be seen a tablet-shaped virtual/augment shadow 3148A also is present. This corresponds to a shadow as may be cast by the physical light 3144A from the virtual/augment tablet 3110A, falling on the physical surface 3142A.

Considering only physical factors, a hand-shaped shadow cast by the physical light 3144A from the physical hand 3109A onto the physical surface 3142A may be expected. However, if a physical tablet is present, then that hand-shaped shadow may be covered by a shadow in the shape of that physical tablet. Thus the virtual/augment shadow 3148A represents in some sense a shadow correction: although the expected shadow 3158A on the virtual/augment tablet 3110A is already considered, a further shadow 3148A may be added to further integrate the virtual/augment tablet with the physical environment.

To again recall previous terminology, the shadow correction 3148A may be referred to as a "physical-notional-physical" entity: physical light, notional object, physical surface.

With reference to FIG. 31B, shadow correction is not limited only to positive effects such as adding further shadows. For certain embodiments, it may be useful to counter-act existing shadows, for example by brightening or "bleaching" a shadow with a notional object (e.g. a brightening "mask" in the shape of the shadow in question).

In FIG. 31B, a surface 3142B, virtual/augment tablet 3110B, hand 3109B, light source 3144B, and hand-shaped virtual/augment shadow 3159B are shown. However, no tablet-shaped virtual/augment shadow 3148A is shown. Instead, a shadow correction in the form of a "counter shadow" 3149B is present. The counter shadow 3149B is a virtual/augment entity that brightens or "bleaches" the shadow that is cast by the physical hand 3109B; as a result the shadow of the physical hand is made less noticeable, possibly even invisible. The shadow correction 3149B thus may be considered a sort of "negative shadow".

To again recall previous terminology, the shadow correction 3149B may be referred to as a "physical-notional-physical" entity: physical light, notional object, physical surface, though in some sense the shadow correction 3149B is an inverse physical-notional-physical entity, removing or diminishing a feature (a visible shadow) rather than adding one. However, such negative shadows or other inverse entities are not prohibited.

It is noted that the term "shadow correction" is descriptive, but should not be considered limiting. A "shadow correction" is a correction insofar as further altering the appearance of a mixed physical and virtual/augment environment to either more closely approximate a fully-physical environment, or at least avoid incongruity thereof. That is, adding a virtual/augment shadow of the virtual/augment tablet on the physical surface as cast by the physical light may be considered to more closely approximate a fully integrated environment: a "real" tablet would cast a shadow, thus the virtual/augment tablet is made to appear to cast a shadow.

However, as noted full integration is not necessarily required. In "bleaching" a hand shadow with a virtual/augment shadow correction, the appearance of a hand shadow "where it shouldn't be" may be avoided. Though the lack of a shadow of a virtual/augment tablet may not be entirely realistic, the presence of a hand shadow may be more distracting and/or otherwise incongruous to a viewer than the absence of shadow for the tablet.

Figure 32A:
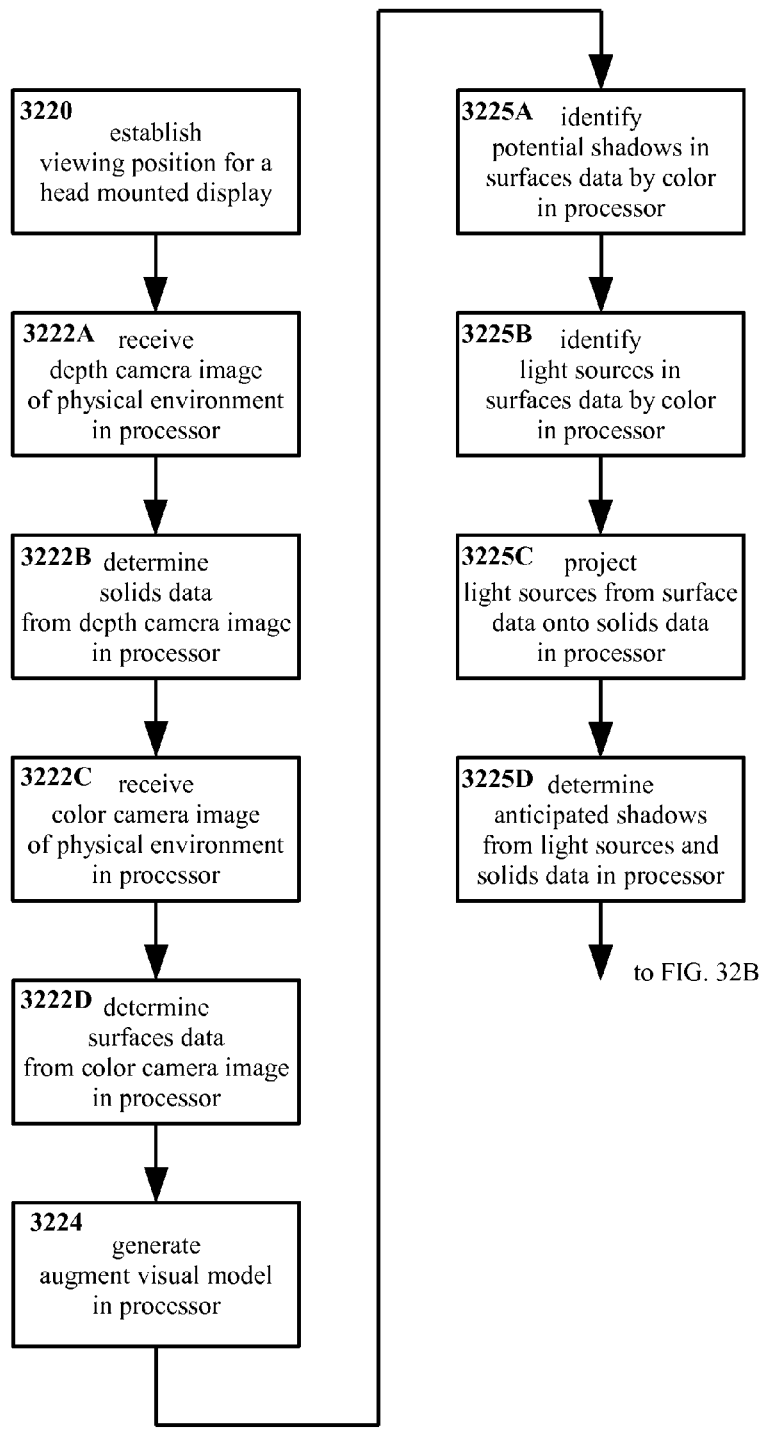
FIG. 32A and FIG. 32B show an example method for integrating occlusion and/or shadowing from a physical data model to a notional data model, in flow-chart form.
Figure 32B:
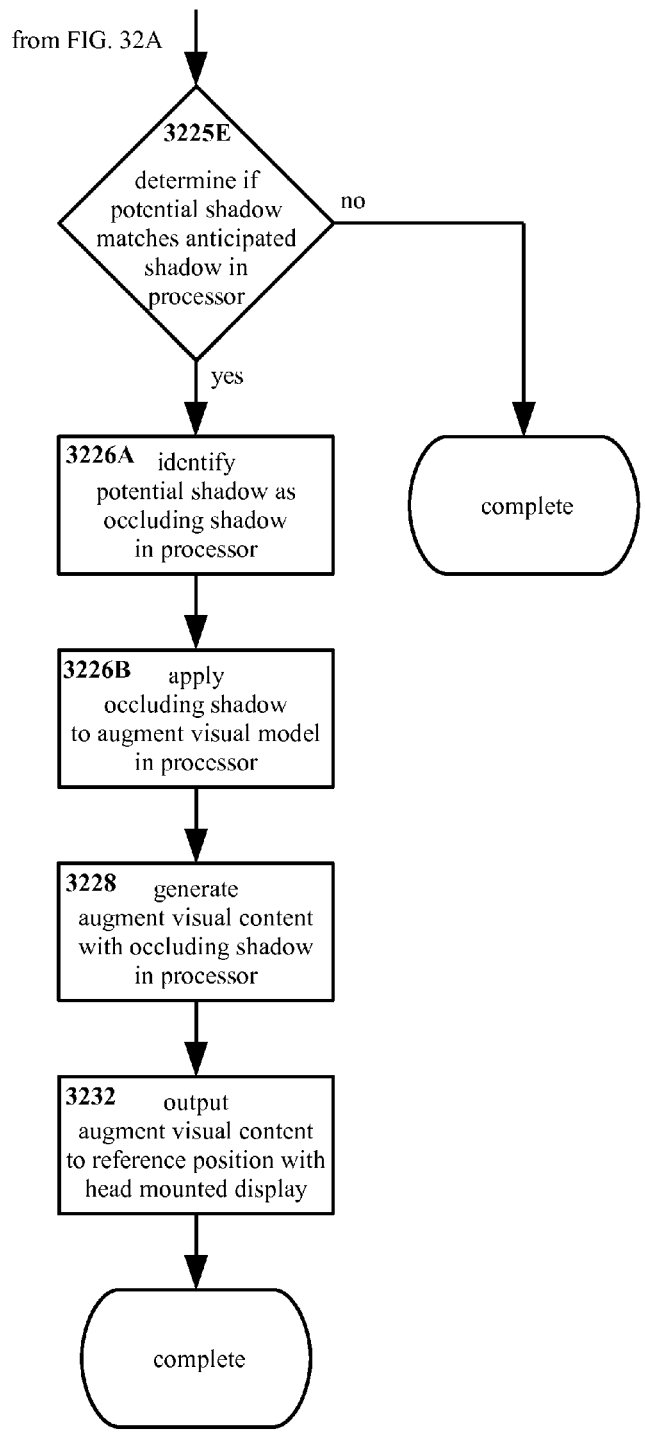

Now with reference to FIG. 32A and FIG. 32B, therein an example method for integrating physical and notional content is shown. The method in FIG. 32A and FIG. 32B specifically addresses identifying shadows in a physical environment and integrating suitable corresponding notional shadows, and in particular to carrying out such tasks with a head mounted display having a processor therein. The arrangement shown in FIG. 32A and FIG. 32B bears some overall similarity to the method shown in FIG. 15, though this should not be considered limiting (nor is the arrangement in FIG. 15 itself limiting), but rather an example only. In particular, embodiments are not limited only to integrating shadow, nor to the approach shown when integrating shadows, nor to the use of head mounted displays.

In FIG. 32A, a viewing position is established 3220 for a head mounted display. The reference position serves as a baseline for integrating content. In practice such a viewing position may include multiple related positions, for example the position of the display with respect to the viewer's eyes, the position of the display with respect to a physical environment, a nominal viewing position within a virtual/augmented reality environment, some combination thereof, etc. Likewise, for a head mounted display having stereo output capability, there may be two (or more) viewing positions, e.g. left and right stereo viewing positions. However for simplicity the viewing position is referred to herein as singular.

A depth camera image of a physical environment is received 3222A in the processor of the head mounted display. Typically though not necessarily this may be obtained through the use of a depth camera such as a digital time-of-flight camera disposed on the head mounted display, capturing a spatial map of some part of the physical environment. The depth image includes position information, and thus volumetric information regarding the environment, but typically does not include surface information such as color, brightness, etc.

Use of a depth camera is an example only. Other approaches may include but are not limited to use of a stereo camera, a plenoptic camera, a discrete time-of-flight sensor, an ultrasonic sensor, and a millimeter wave sensor. Other arrangements may be equally suitable.

Solids data is determined from the depth image 3222B in the processor. Solids data constitutes a model of the physical environment, with regard to size, shape, position, etc. Solids data also may be considered to be volumetric data. Alternately, solids data may be considered to be an aspect off a more comprehensive physical model, for example a physical model that combines both solids data and surfaces data (described below). Step 3222B may be, but is not required to be, inherent in the receipt of the depth image 3222A. That is, the depth image itself may be received in such form as to serve without further processing as solids data. However, even so further modification may be made by the processor, for example removing sensor noise from the depth image, combining the received depth image with additional information, etc., so as to produce (or expand) the solids data.

A color camera image of the physical environment is received 3222C in the processor of the head mounted display. Typically though not necessarily this may be obtained through the use of a color camera such as a digital RGB camera disposed on the head mounted display, capturing an image of some part of the physical environment. (Typically the color camera image will have a field of view similar or identical to the field of view of the depth camera image, though this is not required.) The color camera image includes surface information, such as color, brightness, etc., but may not include depth or other direct volumetric or 3D positional information.

Use of a color image camera is an example only. Other approaches may include but are not limited to use of a grayscale camera, a black-and-white camera, a digital camera, and an infrared camera. Other arrangements may be equally suitable.

Surfaces data is determined from the color camera image 3222D in the processor. Surfaces data constitutes a model of the physical environment, with regard to brightness, color, etc. Alternately, surfaces data may be considered to be an aspect off a more comprehensive physical model, for example a physical model that combines both solids data and surfaces data. Step 3222D may be, but is not required to be, inherent in the receipt of the color camera image 3222C. That is, the color camera image itself may be received in such form as to serve without further processing as surfaces data. However, even so further modification may be made by the processor.

Collectively, steps 3222A through 3222D may be considered at least somewhat analogous to step 1522 in FIG. 15, though this similarity may not be exact and should not be considered limiting.

Continuing in FIG. 32A, an augment visual model, i.e. information regarding the existence, appearance, position, etc. of augmented reality entities, is generated 3224 in the processor.

Potential shadows are identified 3225A in the surfaces data based on color in the processor. The term "color" as applied here (and likewise to step 3225B) should be understood to include not only shade but also brightness/darkness, so that a feature in the surfaces data may be identified as a potential shadow based on whether that feature is darker than whatever surrounds that feature, etc. Identification of potential shadows may be simple, e.g. some arbitrary difference in color/brightness, or may be more complex. For example shadow identification may address color distributions that consider the sharpness/fuzziness of outlines, minimum and maximum differences in color (since shadows typically are not completely black, objects that are too dark may be ignored), smoothness or roughness of edges of color variations, etc.

The notion of a "potential shadow" refers to further consideration as to whether a feature is, indeed, a shadow and should be treated as such. Potential shadows are not necessarily automatically assumed to be actual shadows (though this is not excluded), but typically are candidates for evaluation.

Light sources are identified 3225B in the surfaces data based on color in the processor. For example, a region of the surfaces data exhibiting high brightness, or even off-scale brightness (e.g. having saturated the color camera at that point), may be considered to be a light source. As with potential shadow identification 3225A, light source identification 3225B may be simple, such as a minimum brightness threshold, or complex. For example, patterns of color/brightness may be sought that represent illumination of an object, rather than necessarily seeking the light source proper (as noted previously, light sources may be implicit and not explicitly visible within a set of surface data), reflections may be identified, haloing on surfaces or apparent beams due to dust suspended in air, etc. may be considered, and so forth.

Light sources identified in step 3225B are projected from the surfaces data onto/into the solids data 3225C in the processor. That is, based on signatures of color/brightness in the surfaces data that indicate the presence of a light source, the light source is then located within the solids data. This may be a simple geometric projection, e.g. the x-y position in surfaces data identified as a light source may be projected outward through the solids data until reaching some solid feature, and designating that solid feature as a light source. However, again projection 3225C is not limited only to such direct approaches, and may be more complex. For example, light sources identified within the surfaces data may be projected into the solids data based not only on position but also on the shape of objects or features within the solids data. More colloquially, some solid object may be identified as a light based in whole or in part on whether that object is shaped like a known light. Other approaches also may be suitable.

Anticipated shadows are determined 3225D from light sources and solids data in the processor. That is, based on the locations, directions, etc. of light sources in 3D space (as projected in step 3225C), and the sizes, positions, etc. of intervening objects in 3D space (within the solids data), it is determined at least approximately where, how large, and what shape of shadows should result from such light sources and intervening objects. Typically though not necessarily this may be accomplished through ray-tracing.

Now with reference to FIG. 32B, a determination is made 3225E in the processor as to whether a given potential shadow matches with an anticipated shadow. That is, does a feature that was identified as possibly being a shadow (in step 3225A) fit any of the shadows that were determined should exist given the known light sources and intervening objects (determined in step 3225D)? An absolute match is not necessarily required (though absolute matches are not excluded). Some degree of "misfit" may be suitable, for example to accommodate limited data, sensor noise, limited processing power, inaccuracy in solids and/or surfaces data, etc.

If a given potential shadow does not match any anticipated shadow—if the determination 3225E is negative—then the method is complete, at least insofar as that potential shadow is concerned. The arrangement in FIG. 32A and FIG. 32B may in some sense be considered a filtering approach: features are identified as possibly being shadows, and then either are found to match with predicted shadows and treated as in fact being shadows, or are found not to match and are ignored. However, this is an example only, and other approaches may be suitable.

If a given potential shadow does match an anticipated shadow—if the determination 3225E is positive—then the method continues with step 3226A.

Collectively, steps 3225A through 3225E may be considered at least somewhat analogous to step 1525 in FIG. 15, though this similarity may not be exact and should not be considered limiting.

Continuing in FIG. 32B, for a given potential shadow that matches an anticipated shadow, that potential shadow is identified 3226A as an occluding shadow in the processor. Typically though not necessarily such identification may be handled by "tagging" the potential shadow, the region of the surfaces data exhibiting the potential shadow, etc. so as to indicate that the potential shadow has been verified and is to be treated differently, i.e. as a "definite" shadow and not merely a potential shadow.

The occluding shadow is (or potentially multiple occluding shadows are) then applied 3226B to the augment visual model in the processor. That is, where previously the potential shadow and later the occluding shadow were part of the surfaces data reflective of the physical environment, now the occluding shadow is added to the augment visual model as a visible feature of the augmented reality environment. Again, this may be handled by "tagging", e.g. by identifying whatever data represents the occluding shadow as now also being part of the augment visual model. However, other approaches, including but not limited to copying the occluding shadow into the augment visual model, also may be suitable.

Augment visual content s generated 3228 with the occluding shadow(s) applied thereto, in the processor. That is, some image, render, etc. of the augment visual model is produced so as to be suitable for output.

The augment visual content is outputted 3232 to the reference position with the head mounted display. Thus, for example a virtual/augment shadow such as 3159A in FIG. 31A may be integrated with a virtual/augment tablet 3110A as also shown in FIG. 31A, presenting an appearance that a physical light and a physical hand are casting a shadow onto an augmented reality entity. In such manner, shadowing may be partially or fully integrated for an augmented reality and a physical reality, e.g. producing the virtual/augment shadow 3159A in FIG. 31A. However, this is an example only, and other arrangements may be equally suitable.

Figure 33A:
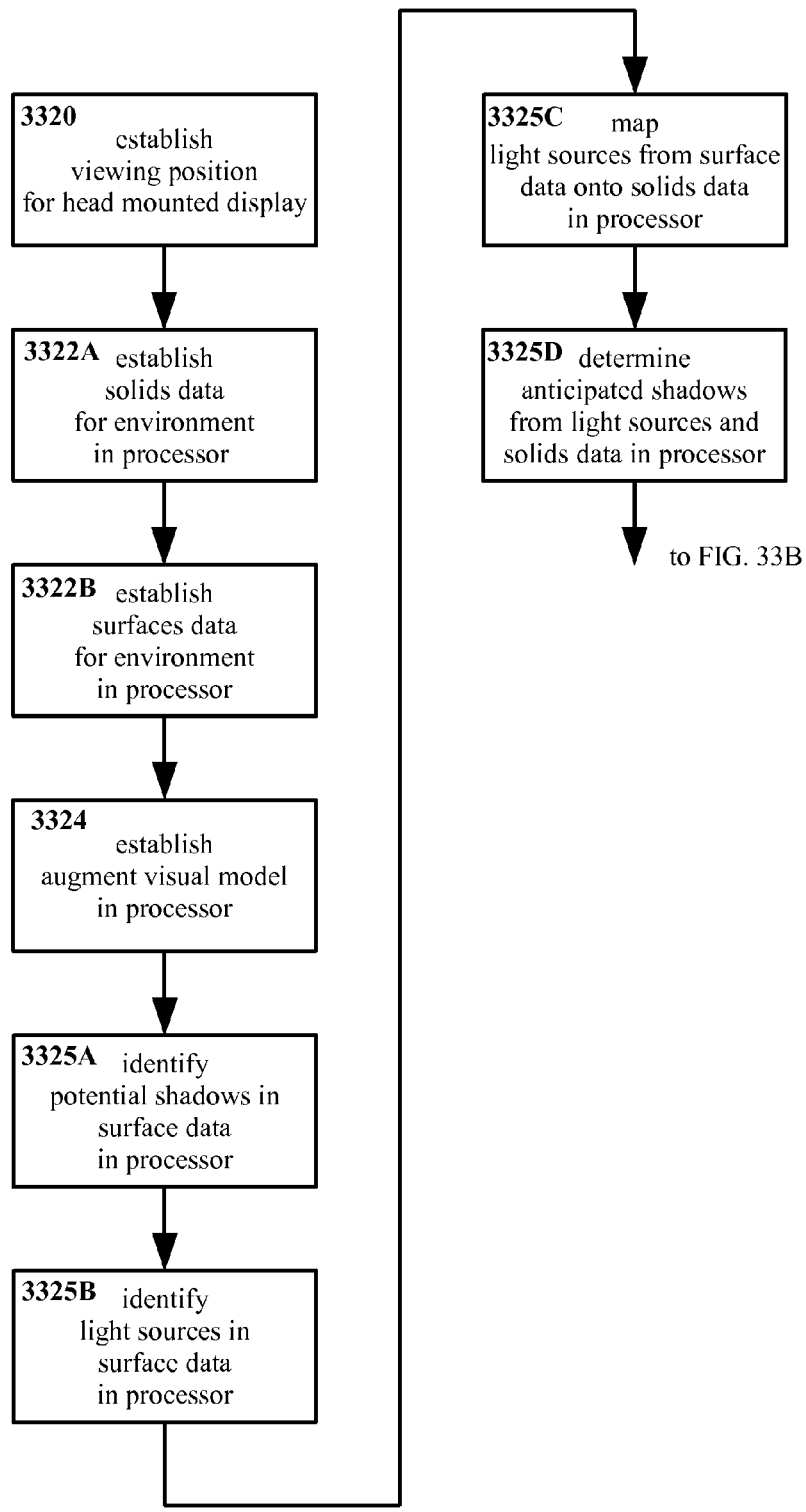
FIG. 33A and FIG. 33B show another example method for integrating occlusion and/or shadowing from a physical data model to a notional data model, in flow-chart form.
Figure 33B:
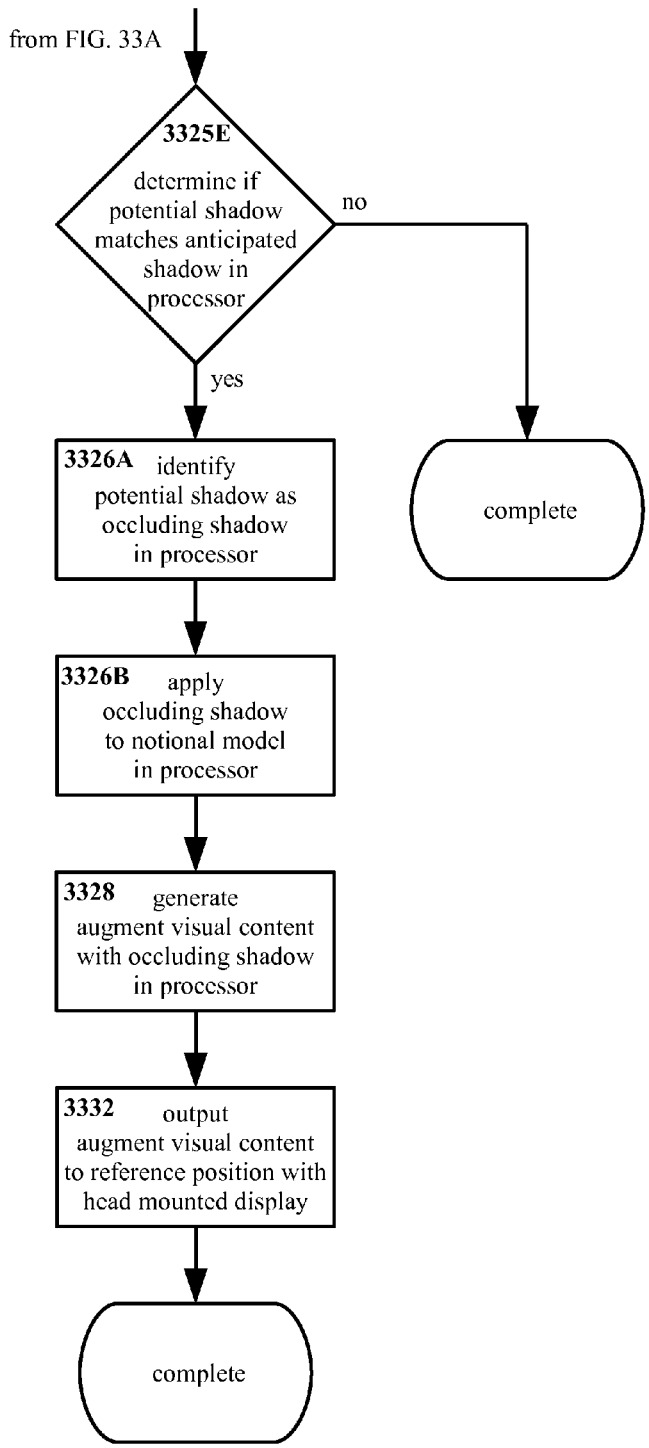

Now with reference to FIG. 33A and FIG. 33B, a somewhat more generalized method than that in FIG. 32A and FIG. 32B is shown, so as to present examples of certain options and/or variations, though still with regard to shadowing in somewhat similar fashion to that shown in FIG. 32A and FIG. 32B.

In FIG. 33A, a viewing position is established 3220 for a head mounted display.

Solids data is established 3322A for an environment in a processor, and surfaces data is established in the processor. In the previous example of FIG. 32A solids data was determined from a depth image that was obtained of the environment. and surfaces data was determined from a color camera image that was obtained of the environment; while such approaches may be suitable for certain embodiments, embodiments are not limited only thereto. Other approaches for establishing solids data may be equally suitable, including but not limited to determining solids data and/or surfaces data from other sources (e.g. stereo imagery in addition to/instead of a depth camera image for solids data, etc.), reading solids data from a data store such as a hard drive or solid state drive, or receiving solids data from some external source (e.g. through wired or wireless communication).

An augment virtual model is established 3324 in the processor.

Potential shadows are identified 3225A in the surfaces data with the processor, and light sources also are identified 3225B in the surfaces data with the processor. In the previous example of FIG. 32A potential shadows and light sources were identified by color; while such approaches may be suitable for certain embodiments, embodiments are not limited only thereto. Other approaches for identifying potential shadows and/or light sources data may be equally suitable, including but not limited to determining solids data and/or surfaces data other than by color (e.g. from shape, through mathematical analysis, through abstract learning algorithms, etc.), reading data regarding potential shadows and/or light sources from a data store such as a hard drive or solid state drive, or receiving data regarding potential shadows and/or light sources from some external source.

Light sources are mapped 3225C from surface data onto solids data in the processor. In the previous example of FIG. 32A light sources were projected into the solids data from the surfaces data; while such approaches may be suitable for certain embodiments, embodiments are not limited only thereto. Other approaches for locating in the solids data positions for light sources that are identifiable within the surface data may be equally suitable, including but not limited to mapping approaches other than projection, reading data regarding light source location from a data store such as a hard drive or solid state drive, or receiving data regarding light source locations from some external source.

Still with reference to FIG. 33A anticipated shadows are determined 3325D based on the light sources and solids data, and then moving on to FIG. 33B a determination is made 3325E as to whether one or more potential shadows matches the anticipated shadows. Potential shadows that match an anticipated shadow are identified 3326A as occluding shadows, and occluding shadows are applied 3326B to the augment model in the processor. Augment visual content is generated 3328 including the occluding shadows, and is outputted 3332 to the reference position with the head mounted display.

Figure 34A:
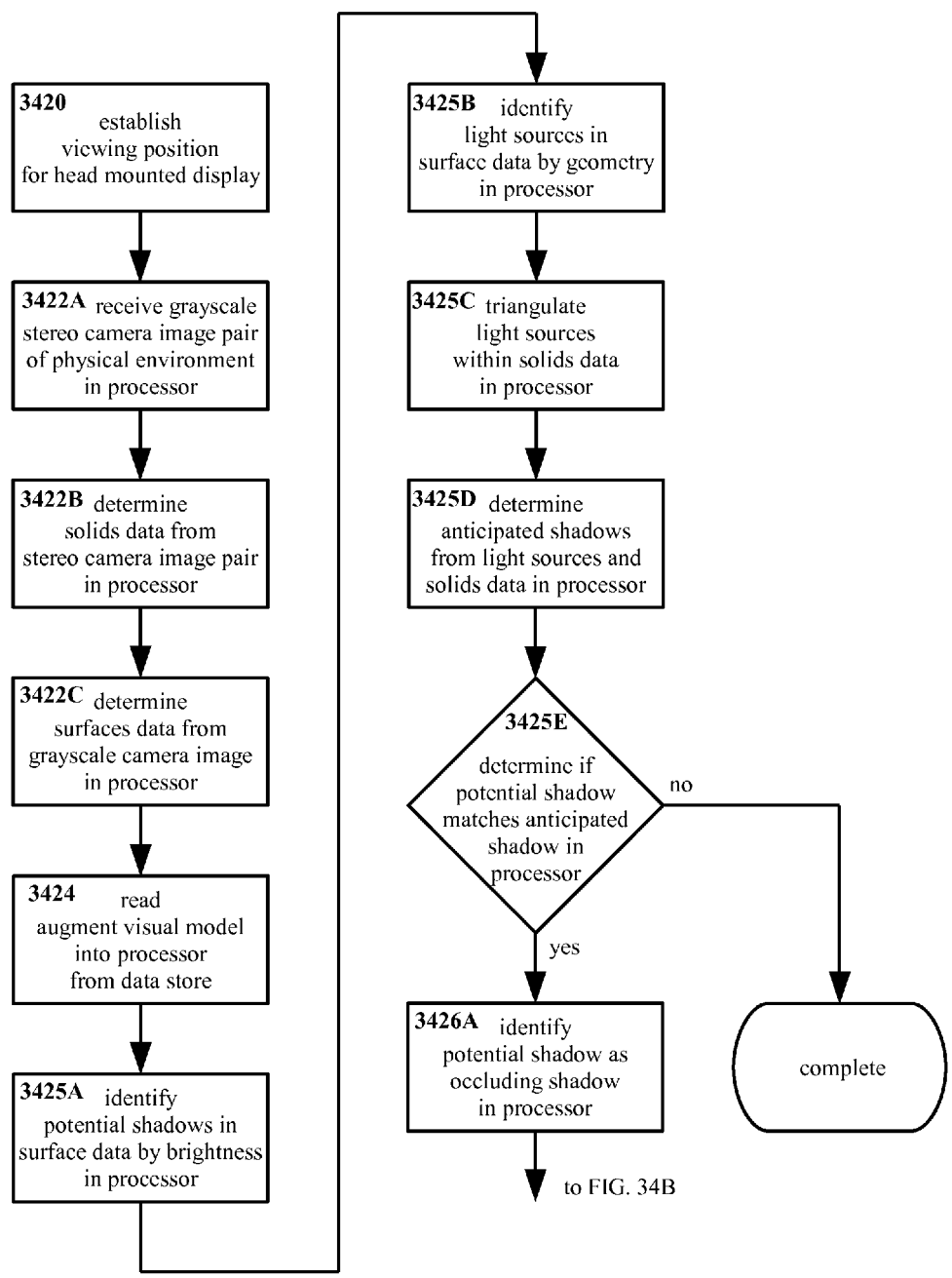
FIG. 34A and FIG. 34B show an example method for integrating occlusion, shadowing, and/or shadow correction from a physical data model to a notional data model, in flow-chart form.
Figure 34B:
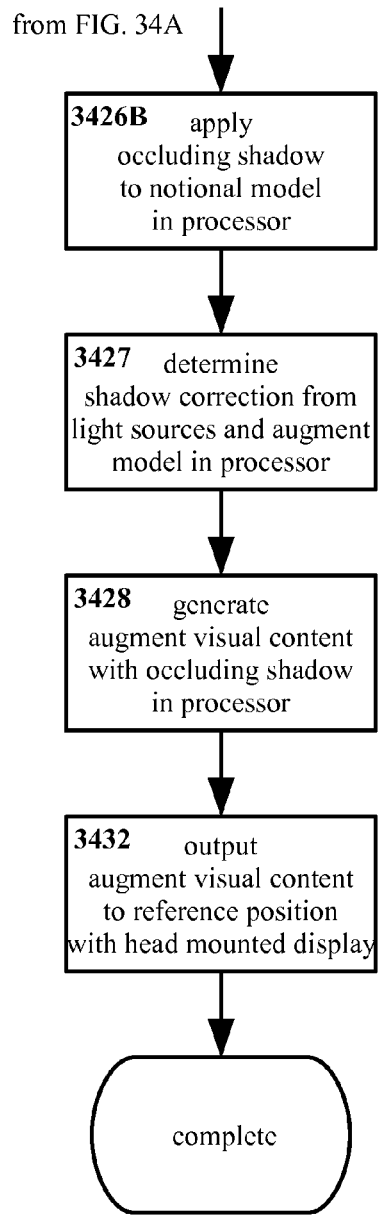

Now with reference to FIG. 34A and FIG. 34B, as noted previously many varying embodiments may be suitable. FIG. 34A and FIG. 34B show an arrangement that may be somewhat similar overall with FIG. 32A and FIG. 32B, but that shows different details. Embodiments are not limited only to the particulars in FIG. 32A and FIG. 32B or in FIG. 34A and FIG. 34B, however, and the arrangements shown therein are examples only.

In FIG. 34A, a viewing position for a head mounted display is established 3420. A pair of grayscale stereo camera images are received 3422A in a processor of the head mounted display, and solids data are determined 3422B in the processor from the stereo image pair. Surfaces data also are determined 3442C from one or both of the grayscale stereo images. Where in the example of FIG. 32A and FIG. 32B solids data and surfaces data each were determined from a distinct image/input, namely a depth image for solids data and a color image for surfaces data, as shown in FIG. 34A the use of distinct or independent sources is not required. For certain embodiments it may be suitable to acquire both solids data and surfaces data from a single source, for example a pair of stereo images as shown.

An augment visual model is read 3424 into the processor from a data store such as a hard drive or solid state drive. As noted previously, embodiments are not limited with regard to how an augment visual model is established, nor necessarily to what model is established (e.g. visual, auditory, etc., augmented reality, virtual reality, etc.).

Potential shadows are identified 3425A in the surfaces data based on geometry, with the processor. That is, features are identified as possibly being shadows based on the size, shape, position, etc. of those features. Light sources are identified 3425B in the surfaces data according to brightness, with the processor. Although in certain previous examples potential shadows and light sources have been identified similarly (e.g. both based on color), as may be seen through comparing steps 3425A and 3425B it is not required that potential shadows and light sources are identified through the same or similar approaches, i.e. in FIG. 34A potential shadows are addressed through geometry while light sources or addressed based on image brightness.

Still with reference to FIG. 34A, light sources are triangulated 3425C within the solids data in the processor. In the example of FIG. 34A the solids data is established through consideration of two stereo images, light sources may be determined by brightness in one or both images, and positions of those light sources in three dimensional space determined through triangulation. As noted, embodiments are not limited to determining light position in the solids data through projection from the surfaces data, nor even necessarily through consideration of the surfaces data at all.

Anticipated shadows are determined 3425D in the processor from light sources and solids data. Moving on to FIG. 34B a determination is made 3425D as to whether one or more potential shadows matches the anticipated shadows. Potential shadows that match an anticipated shadow are identified 3426A as occluding shadows, and occluding shadows are applied 3426B to the augment model in the processor.

A shadow correction is determined 3427 in the processor from the light sources and the augment model. For example, to refer to FIG. 31A a shadow that may be expected to be cast the augment tablet therein may be determined, based on the position of the light source therein and the shape and size of the tablet. However, such an approach is an example only; determining a counter-shadow for a physical hand as in FIG. 31B may not require consideration of an augment model but may require or at least benefit from consideration of the solids model, since both the light source and the object casting the shadow (in FIG. 31B, a hand) are physical, as is the surface onto which the shadow is cast. Other arrangements also may be suitable.

Augment visual content is generated 3428 including the occluding shadows, and is outputted 3432 to the reference position with the head mounted display.

Figure 35:
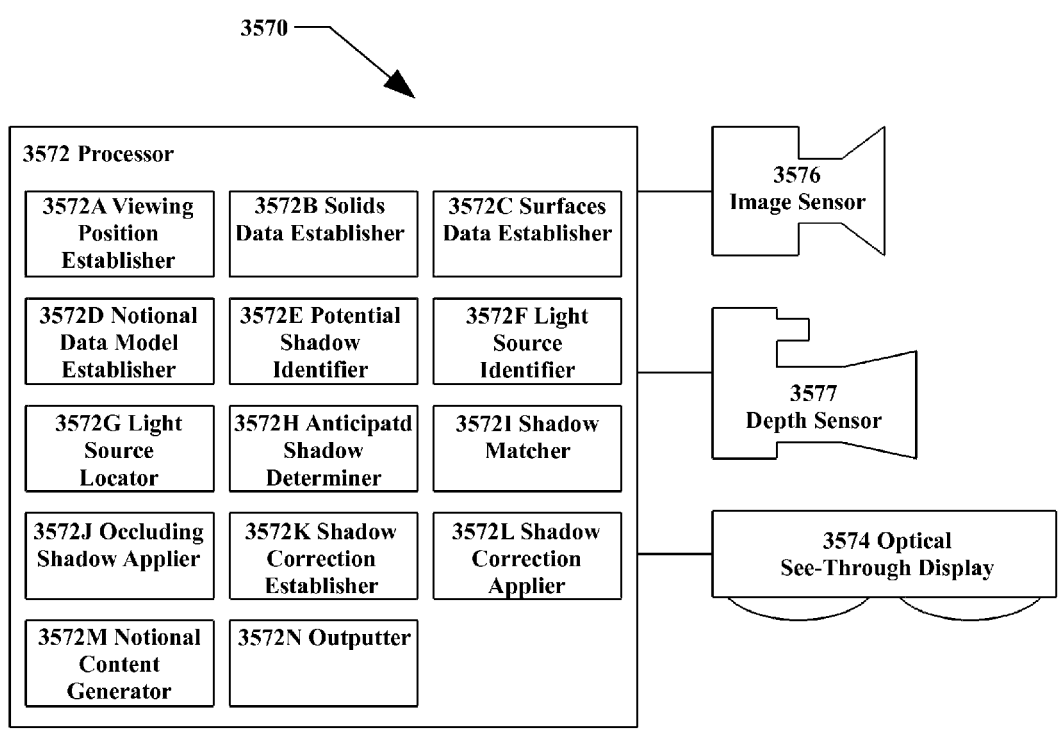
FIG. 35 shows

Now with reference to FIG. 35, an example embodiment of an apparatus is shown, at least approximately corresponding with certain examples as in FIG. 32A through FIG. 34B. The apparatus 3570 includes a processor 3572, an image sensor (which may include but is not limited to a color camera) in communication with the processor 3570, a depth sensor 3577 (which may include but is not limited to a depth camera) in communication with the processor 3570, and an optical see-through display 3574 (including but not limited to a stereo head mounted display) in communication with the processor 3570.

A number of data entities 3572A through 3572N are shown disposed on the processor 3572, as follows. The data entities 3572A through 3572N may include executable instructions instantiated on the processor, non-executable data, some combination thereof, etc., and other arrangements may be equally suitable.

A viewing position establisher 3572A is instantiated on the processor 3572, and is adapted to establish a viewing position. A solids data establisher 3572B is instantiated on the processor 3572, and is adapted to establish solids data, e.g. from one or more readings received from the depth sensor 3577. A surfaces data establisher 3572C is instantiated on the processor 3572, and is adapted to establish surfaces data, e.g. from one or more images received from the image sensor 3576. A notional data model establisher 3572D is instantiated on the processor 3572, and is adapted to establish a notional model, such as a virtual reality and/or augmented reality model.

A potential shadow identifier 3572E is instantiated on the processor 3572, and is adapted to identify one or more potential shadows, for example by color, brightness, geometry, etc. in surfaces data. A light source identifier 3572F is instantiated on the processor 3572, and is adapted to identify one or more light sources, for example by color, brightness, etc. in surfaces data. A light source locator 3572G is instantiated on the processor 3572, and is adapted to locate light sources within solids data, e.g. by projecting light sources from surfaces data into solids data.

An anticipated shadow determiner 3572H is instantiated on the processor 3572, and is adapted to determine anticipated size, shape, position, darkness, color, etc., of shadows anticipated to exist, for example based on light sources and a solids model. A shadow matcher 3572I is instantiated on the processor 3572, and is adapted to match potential shadows against anticipated shadows to determine whether a match exists, and to identify matching potential shadows as occluding shadows.

An occluding shadow applier 3572J is instantiated on the processor 3572, and is adapted to apply occluding shadows to the notional data model. A shadow correction establisher 3572K is instantiated on the processor 3572, and is adapted to establish one or more shadow corrections for the notional data model. A shadow correction applier 3572L is instantiated on the processor 3572, and is adapted to apply shadow corrections to the notional data model.

A notional content generator 3572M is instantiated on the processor 3572, and is adapted to generate content reflecting the notional data model, suitable for output. An outputter 3572N is instantiated on the processor 3572, and is adapted to output notional content, for example to a head mounted display or other display.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method, comprising:
capturing an image representative of a real-world environment;
defining, by a processor, a reference point in the image;
determining a first set of data representative of an object in the image at the reference point;
determining a second set of data representative of a surface of the object;
identifying a first subset of data in the second set of data representative a potential shadow on the surface of the object, wherein the potential shadow indicates a shadow may be located on at least a portion of the surface of the object based on a feature of the second set of data;
identifying a second subset of data in the second set of data representative of a light source in the image based on the second set of data;
determining an anticipated shadow on the surface of the object from the light source, wherein the anticipated shadow is a shadow that may be located on the surface of the object based on an illumination pattern of the light source;
generating notional sensory content to augment the image of the real-world environment at the reference point; and
determining that the potential shadow matches the anticipated shadow; and
in response to the potential shadow matching the anticipated shadow, applying the potential shadow onto the notional sensory content.

2. The method of claim 1, wherein determining the first set of data comprises:
obtaining, by a depth sensor, a depth measurement of the real-world environment;
communicating the depth measurement to the processor; and
determining, by the processor, the first set of data from the depth measurement.

3. The method of claim 2, wherein the depth sensor comprises at least one of a depth camera, a stereo camera, a plenoptic camera, a time-of-flight sensor, an ultrasonic sensor, or a millimeter wave sensor.

4. The method of claim 1, wherein determining the second set of data comprises:
Obtaining, by an image sensor, the image;
communicating the image to the processor; and
determining, by the processor, the second set of data from the image.

5. The method of claim 4, wherein the image sensor comprises at least one of a color camera, a grayscale camera, a black-and-white camera, a digital camera, or an infrared camera.

6. The method of claim 1, wherein the light source is explicit in the second set of data.

7. The method of claim 1, wherein the light source is implicit in the second set of data.

8. The method of claim 1, wherein the second subset of data is explicit in the first set of data.

9. The method of claim 1, wherein the second subset of data is implicit in the first set of data.

10. The method of claim 1, wherein at least a portion of the second set of data is persistent.

11. The method of claim 1, wherein at least a portion of the first set of data is persistent.

12. The method of claim 1, wherein the feature of the second set of data is a color feature of the object or a structure feature of the object.

13. The method of claim 1, further comprising identifying the potential shadow using an algorithm applied to the second set of data.

14. The method of claim 1, comprising: identifying the light source from at least one of a color feature of the object or a structure feature of the object.

15. The method of claim 1, comprising identifying the light source by an algorithm applied to the second set of data.

16. A method, comprising:
capturing an image representative of a real-world environment;
defining, by a processor, a viewing position for a user;
determining, by a digital time-of-flight depth camera, a digital depth image of real-world environment;
determining, by the processor, a first set of data representative of an object in real-world environment;
receiving, from a digital color camera, a digital color image of the real-world environment;
determining, by the processor, a second set of data representative of a surface of the object;
identifying a first subset of data in the second set of data representative a potential shadow on the surface of the object, wherein the potential shadow indicates a shadow may be located on at least a portion of the surface of the object based on a feature of the second set of data;
identifying a second subset of data in the second set of data representative of a light source in the image based on the second set of data;

determining an anticipated shadow on the surface of the object from the light source, wherein the anticipated shadow is a shadow that may be located on the surface of the object based on an illumination pattern of the light source;

generating, by the processor, augmented reality graphical content to augment the image of the real-world environment at a point of view;

determining that the potential shadow matches the anticipated shadow; and in response to the potential shadow matching the anticipated shadow, applying the potential shadow onto the augmented reality graphical content.

17. An apparatus, comprising:
a processor;
a see-through display coupled to the processor;
a reference position establisher comprising executable instructions instantiated on the processor, the reference position establisher being adapted to establish a reference point in an image representative of a real-world environment;
a solids data establisher comprising executable instructions instantiated on the processor, the solids data establisher being adapted to determine a first set of data representative of an object at the reference point;
a surfaces data establisher comprising executable instructions instantiated on the processor, the surfaces data establisher being adapted to determine a second set of data representative of a surface of the object;
a potential shadow identifier comprising executable instructions instantiated on the processor, the potential shadow identifier being adapted to identify a first subset of data in the second set of data representative a potential shadow on the surface of the object, wherein the potential shadow indicates a shadow may be located on at least a portion of the surface of the object based on a feature of the second set of data;
a light source locator comprising executable instructions instantiated on the processor, the light source locator being adapted to identifying a second subset of data in the second set of data representative of a light source in the image based on the second set of data;
an anticipated shadow determiner comprising executable instructions instantiated on the processor, the anticipated shadow determiner being adapted to determine an anticipated shadow on the surface of the object from the light source, wherein the anticipated shadow is a shadow that may be located on the surface of the object based on an illumination pattern of the light source;
a shadow matcher comprising executable instructions instantiated on the processor, the shadow matcher being adapted to determine that the potential shadow matches the anticipated shadow; and
a notional content generator comprising executable instructions instantiated on the processor, the notional content generator being adapted to:
generate notional content; and
in response to the potential shadow matching the anticipated shadow, apply the potential shadow onto the notional content.

18. The apparatus of claim 17, comprising:
a depth sensor in communication with the processor, the depth sensor being adapted to obtain at a depth measurement of the real-world environment; and
wherein the solids data establisher is adapted to determine the first set of data from the depth measurement.

19. The apparatus of claim 18, wherein the depth sensor comprises at least one of a depth camera, a stereo camera, a plenoptic camera, a time-of-flight sensor, an ultrasonic sensor, or a millimeter wave sensor.

20. The apparatus of claim 17, comprising an image sensor in communication with the processor, the image sensor being adapted to obtain the image of the real-world environment, wherein the surfaces data establisher is adapted to determine the second set of data from the image.

21. The apparatus of claim 20, wherein the image sensor comprises at least one of a color camera, a grayscale camera, a black-and-white camera, a digital camera, or an infrared camera.

22. The apparatus of claim 17, wherein the processor and the see-through display are disposed on a head mounted display.

23. The apparatus of claim 17, comprising:
a shadow correction applier comprising executable instructions instantiated on the processor, the shadow correction applier being adapted to apply a shadow correction for the potential shadow, wherein the notional content generator is adapted to generate notional content representing at least a portion of the shadow correction applied to the notional content.

24. An apparatus, comprising:
means for establishing a reference point in an image representative of a real-world environment;
means for establishing a first set of data representative of an object in the image at the reference point;
means for establishing a second set of data representative of the object in the image at the reference point;
means for identifying a first subset of data in the second set of data representative a potential shadow on a surface of the object, wherein the potential shadow indicates a shadow may be located on at least a portion of the surface of the object based on a feature of the second set of data;
means for identifying a second subset of data in the second set of data representative of a light source in the image based on the second set of data;
means for determining an anticipated shadow on the surface of the object from the light source, wherein the anticipated shadow is a shadow that may be located on the surface of the object based on an illumination pattern of the light source;
means for generating notional sensory content to augment the image of the real-world environment at the reference point;
means for determining that the potential shadow matches the anticipated shadow; and
in response to the potential shadow matching the anticipated shadow, ft means for applying the potential shadow onto the notional sensory content.

* * * * *